United States Patent [19]
El-Khoury et al.

[11] Patent Number: 5,383,825
[45] Date of Patent: Jan. 24, 1995

[54] ELECTRONIC SHIFT CONTROLLER FOR A MULTIPLE RATIO AUTOMOTIVE TRANSMISSION

[75] Inventors: Joseph E. El-Khoury, Novi; Frank W. Timte, Canton, both of Mich.; Gerard P. Kuchta, Ingrave, England; Edmond R. League, Moselstr, Germany

[73] Assignee: Ford Motor Company, Dearborn, Mich.

[21] Appl. No.: 66,847

[22] Filed: May 25, 1993

[51] Int. Cl.⁶ .............................. F16H 61/08
[52] U.S. Cl. .................. 477/149; 477/146; 477/147
[58] Field of Search ............... 477/149, 147, 146, 145

[56] References Cited

U.S. PATENT DOCUMENTS

| | | | |
|---|---|---|---|
| 4,476,747 | 10/1984 | Kawamoto | 477/147 |
| 4,674,364 | 6/1987 | Shindo et al. | 477/147 |
| 4,727,773 | 3/1988 | Sumiya et al. | 477/149 |
| 4,796,490 | 1/1989 | Butts et al. | 477/149 |
| 4,805,750 | 2/1989 | Nitz | 192/3.58 |
| 4,875,391 | 10/1989 | Leising et al. | 74/866 |
| 4,938,097 | 7/1990 | Pierce | 475/72 |
| 4,989,477 | 2/1991 | Hunter et al. | 477/149 |
| 5,029,087 | 7/1991 | Cowan et al. | 364/424.1 |
| 5,029,494 | 7/1991 | Lentz et al. | 477/149 |
| 5,038,636 | 8/1991 | Vukovich et al. | 477/149 |
| 5,086,670 | 2/1992 | Nitz et al. | 74/866 |
| 5,092,199 | 3/1992 | Goto et al. | 477/149 |
| 5,111,717 | 5/1992 | Takeuchi et al. | 477/149 |
| 5,113,343 | 5/1992 | Hunter et al. | 477/149 |
| 5,150,297 | 9/1992 | Daubenmier et al. | 364/424.1 |
| 5,157,608 | 10/1992 | Sankpal et al. | 364/424.1 |

OTHER PUBLICATIONS

"The All-Adaptive Controls For The Chrysler Ultradrive Transaxle", by Maurice B. Leising et al, Chrysler Motors Corporation Article No. 890529, pp. 45–53.

*Primary Examiner*—Dirk Wright
*Attorney, Agent, or Firm*—Roger L. May; Frank G. McKenzie

[57] ABSTRACT

An automatic transmission mechanism having multiple ratio gearing and clutch and brake elements operated by fluid pressure operated servos for changing speed ratio in the transmission and a controller for actuating and releasing the clutches and brakes in response to operating demands determined by sensed variables such as vehicle speed, engine torque, manual valve position, transmission turbine speed, and engine temperature, and means for achieving improved control of a synchronous downshift event by electronically regulating the exhaust pressure from an off-going friction element of the clutch and brake structure, thus controlling the torque-carrying capacity of that off-going element during the downshift interval.

12 Claims, 39 Drawing Sheets

| GEAR | RC | CC | FC | DC | L/R | 2/4 | OWC 2 DR | OWC 2 C | OWC 1 DR | OWC 1 C | RATIO | COAST BRAKING |
|---|---|---|---|---|---|---|---|---|---|---|---|---|
| M-1st |  | X | X |  | X |  | X | - | X | - | 2.889 | YES |
| M-2nd |  | X | X |  |  | X | X | - | OR | OR | 1.571 | YES |
| M-3rd |  | X | X | X |  |  | X | - | OR | OR | 1.000 | YES |
| 1st |  |  | X |  |  |  | X | OR | X | OR | 2.889 | NO |
| 2nd |  |  | X |  |  | X | X | OR | OR | OR | 1.571 | NO |
| 3rd |  |  | X | X |  |  | X | OR | OR | OR | 1.000 | NO |
| 4th |  |  | X | X |  | X | O | OR | OR | OR | .689 | YES |
| REV | X |  |  |  | X |  | - | - | - | - | 2.310 | YES |

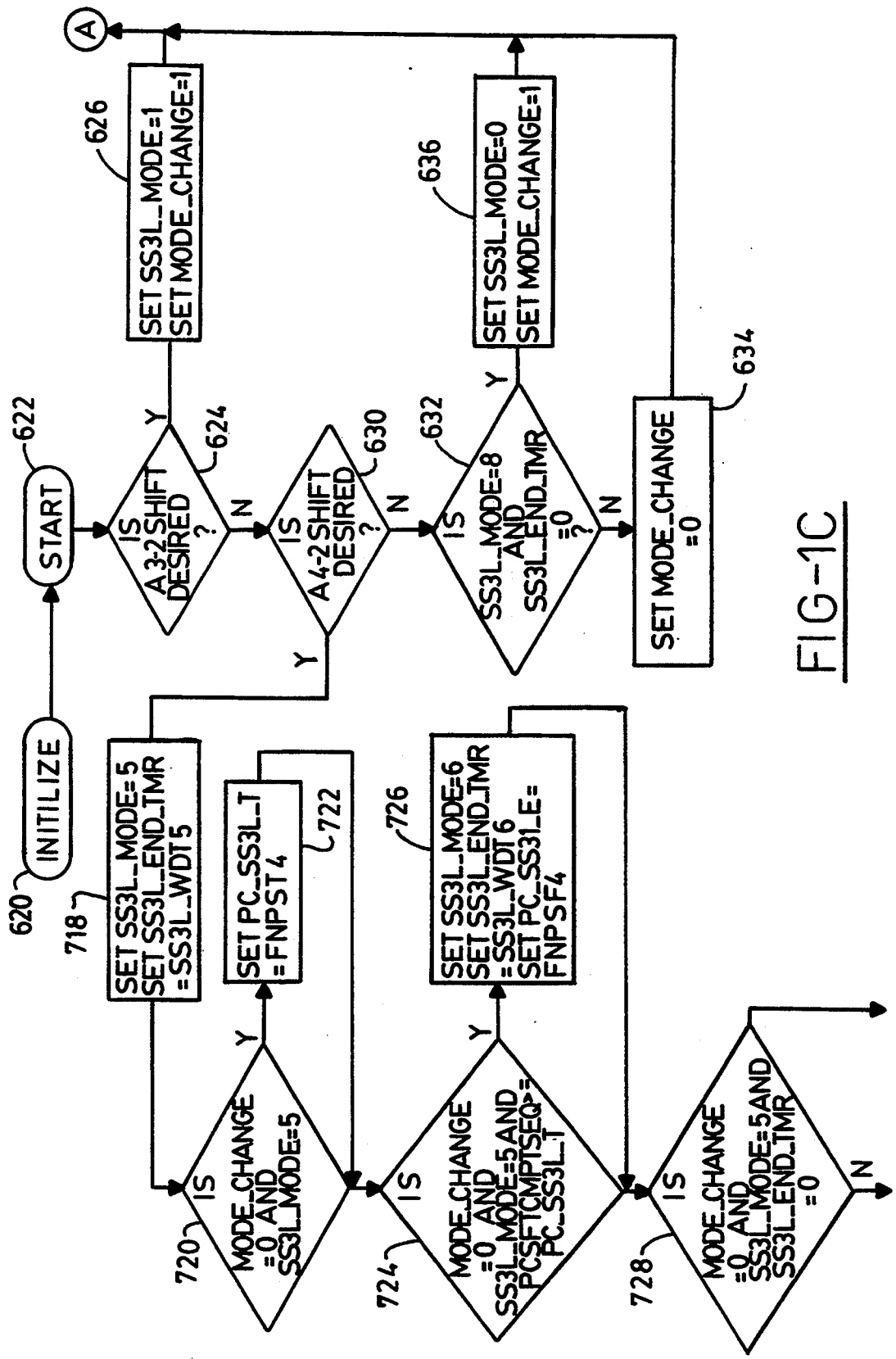

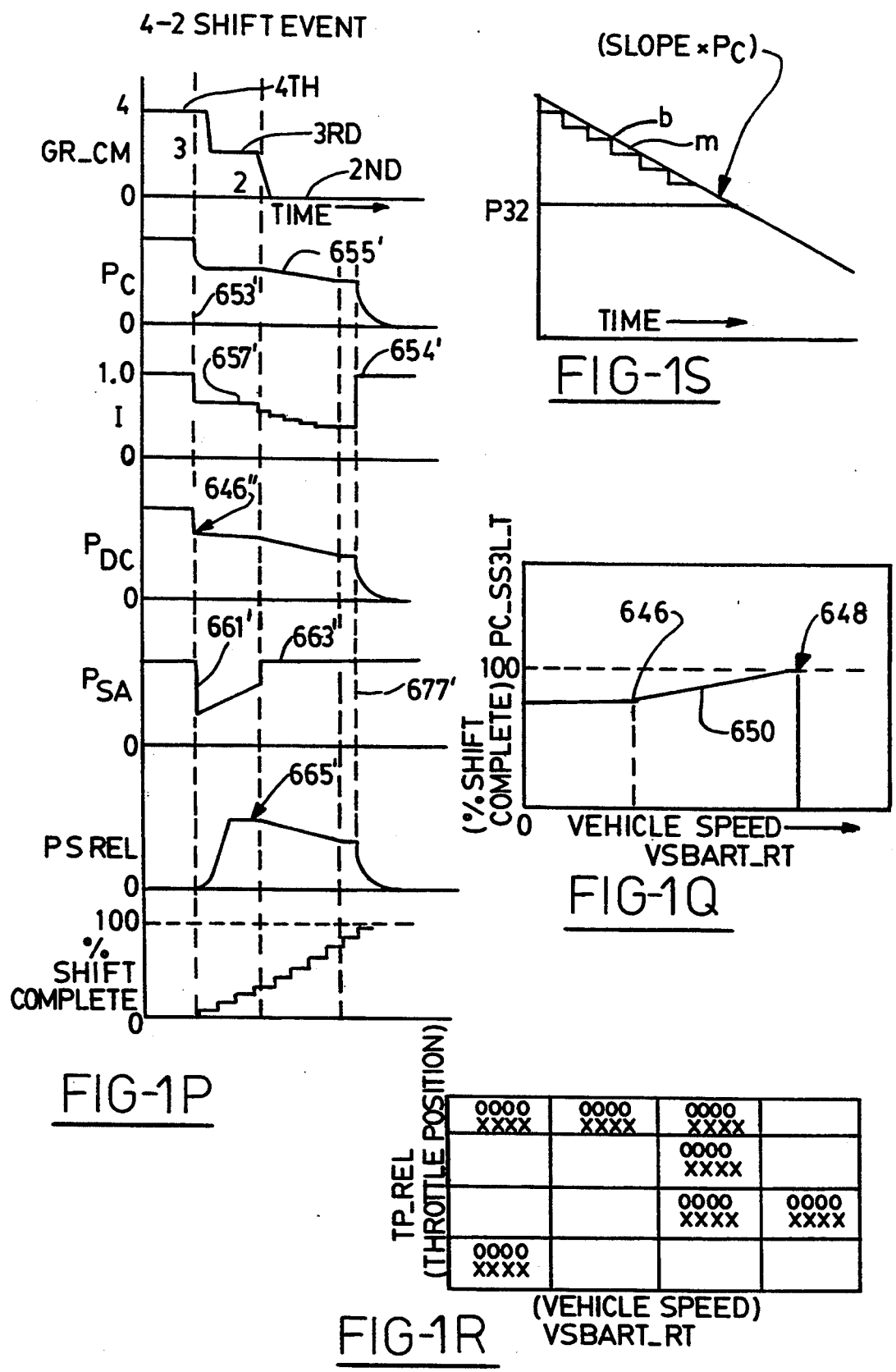

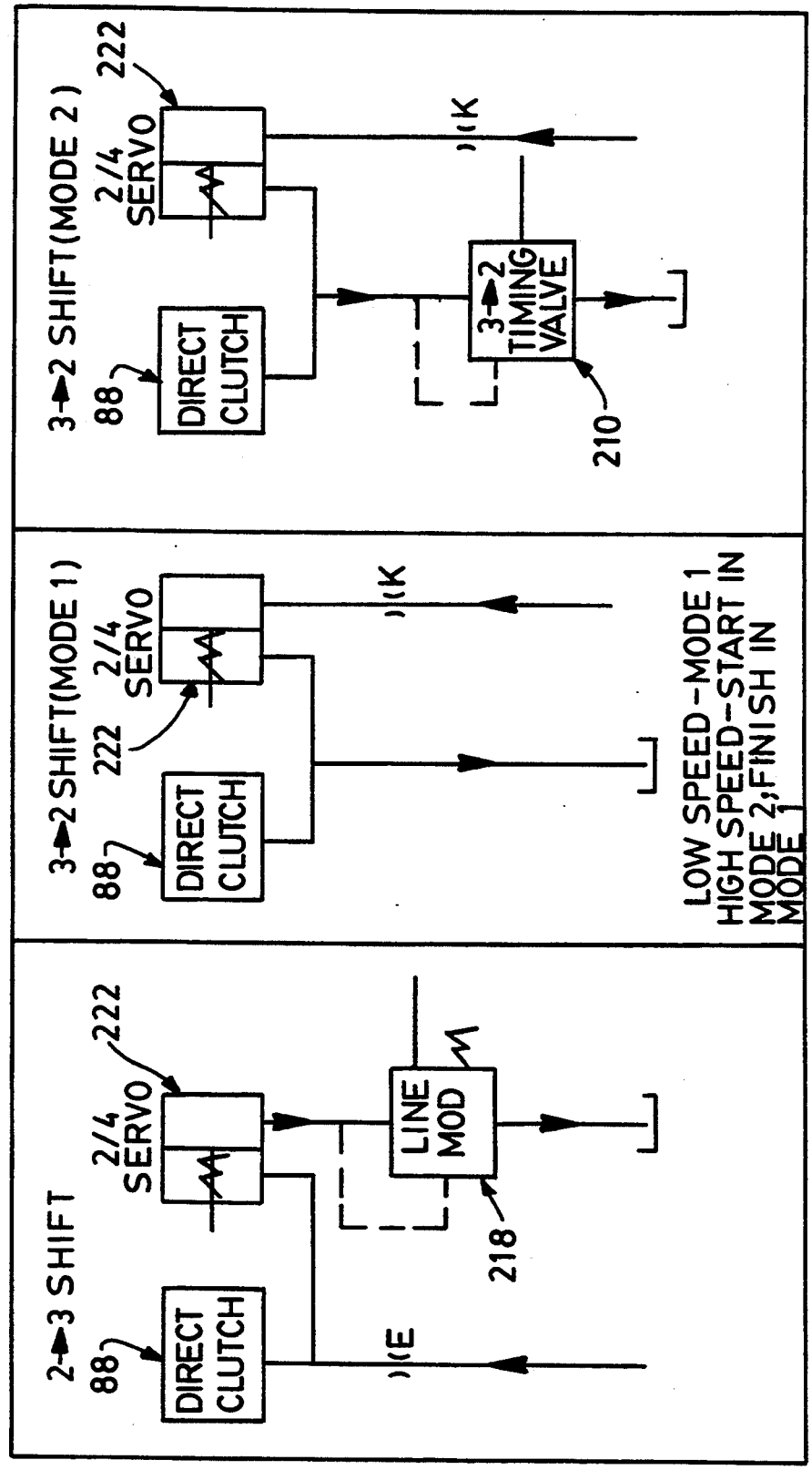

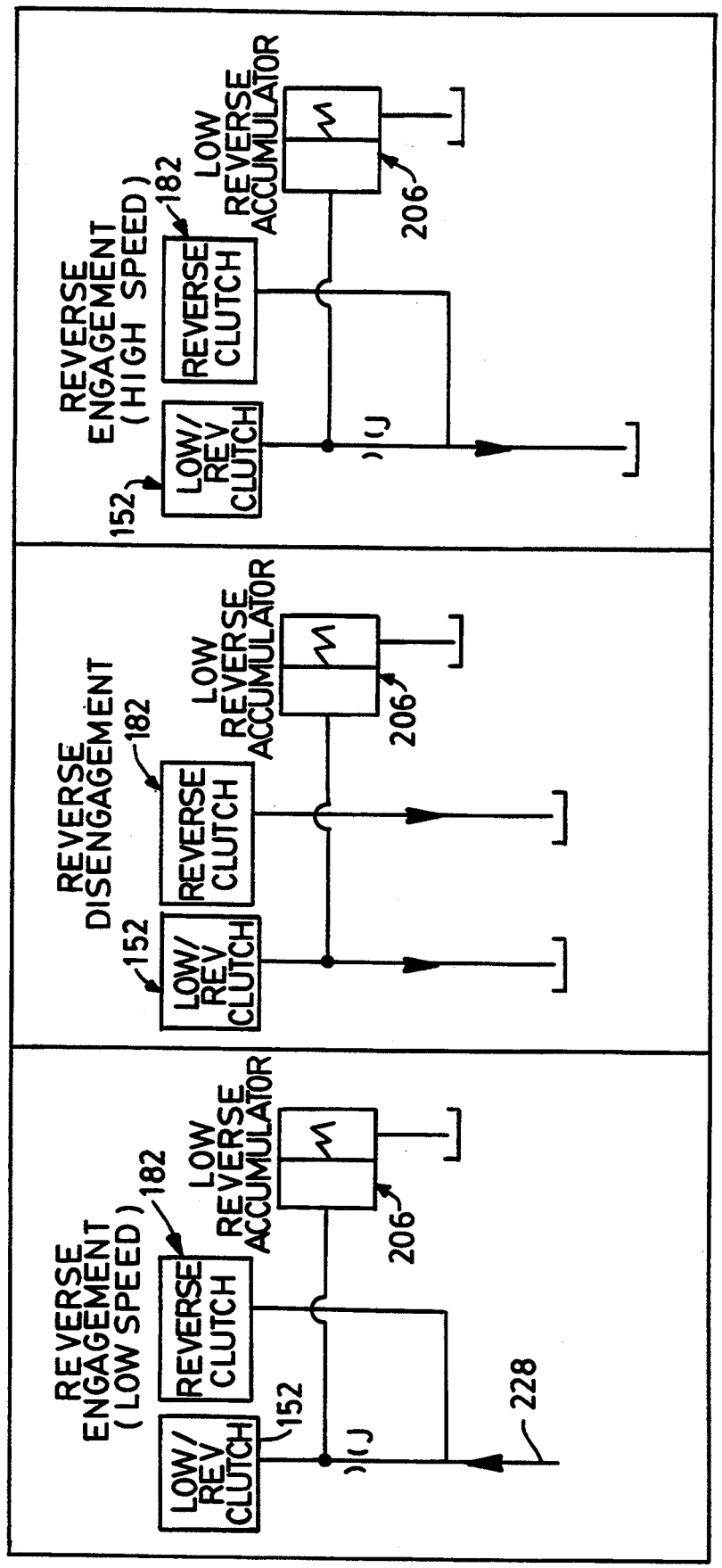

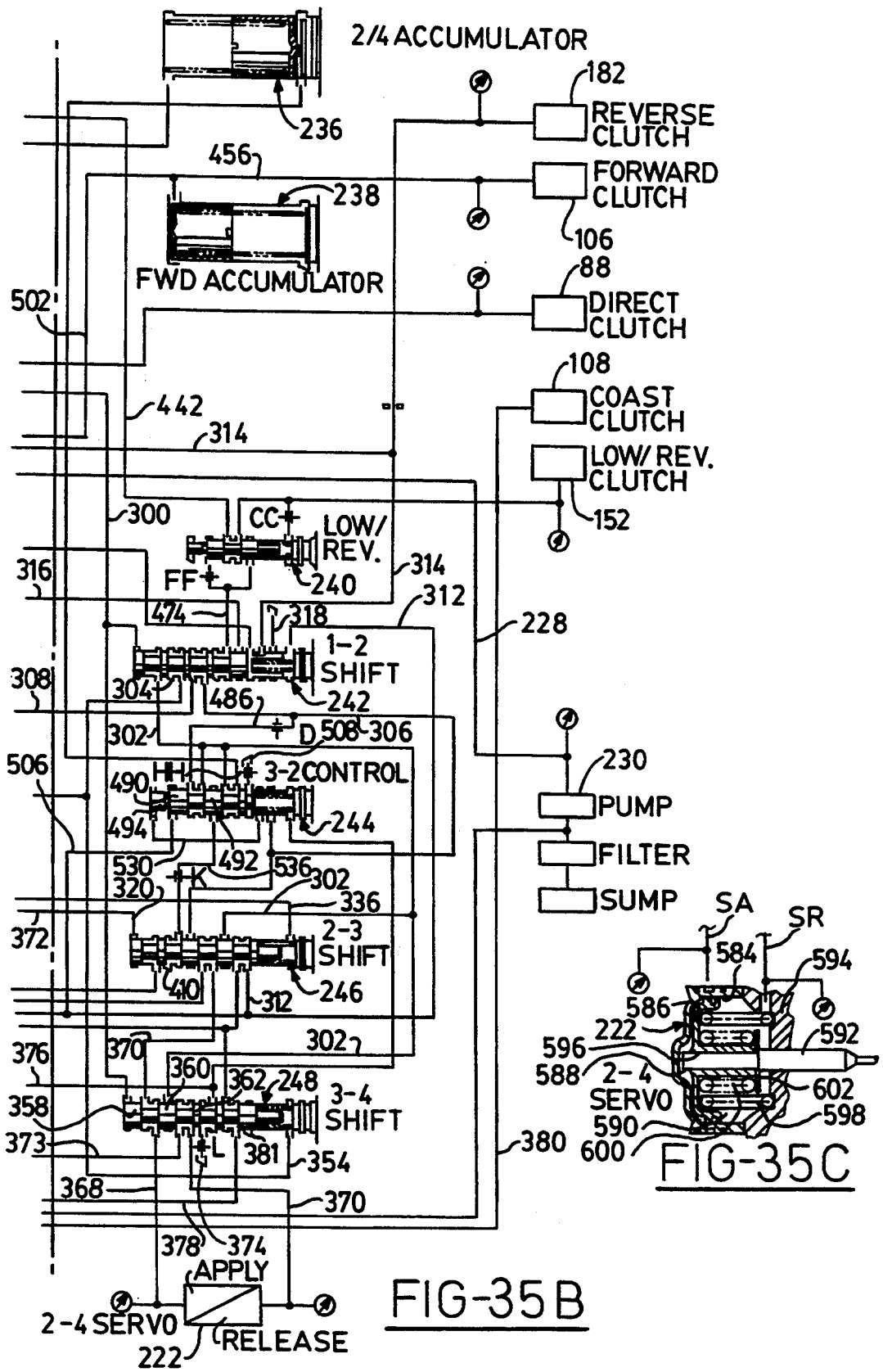

ELECTRONIC SHIFT CONTROLLER FOR A MULTIPLE RATIO AUTOMOTIVE TRANSMISSION

TECHNICAL FIELD

A multiple ratio transmission mechanism for use with an automotive vehicle having an internal combustion engine and fluid pressure operated clutches and brakes for establishing speed ratios determined by the powertrain operating requirements.

BACKGROUND OF THE INVENTION

Our invention relates to a transmission control system of the kind shown in copending patent application Ser. No. 08/066,826, filed May 25, 1993, by Frank W. Timte and Ralph C. Bolz. That copending patent application, which is entitled "AUTOMATIC TRANSMISSION CONTROL SYSTEM", is assigned to the assignee of our invention.

Transmission gearing mechanism capable of being controlled by the control system of our invention may be seen by referring to U.S. Pat. No. 4,938,097.

Our invention includes features that are common to the control system described in U.S. Pat. No. 5,157,608, issued to B. G. Sankpal, J. A. Daubenmier, L. J. Kurdziel, J. F. Carnago, W. Lewis, Jr., and R. S. Williams. The '608 patent also is assigned to the assignee of our invention.

Each of the transmission structures disclosed in the reference patents and in the copending patent application mentioned above has four-speed ratio transmission gearing in which the high speed ratio is an overdrive. Each describes also gearing having a single reverse ratio. When a shift is made from the third ratio, which is a direct-drive ratio, to the next underdrive ratio, which is the second speed ratio, it is necessary to disengage a clutch and to engage a brake in synchronous fashion.

Both the clutch and the brake are friction elements. Each is operated by a fluid pressure operated servo. Thus, the downshift event requires a synchronous disengagement of a clutch and engagement of a brake. Because of differences in temperature and in friction coefficient due to wear, and because inertia forces differ depending on the speed at which a 3-2 downshift occurs, calibration of the 3-2 downshift to achieve optimum smoothness presents a design challenge. Even if the downshift can be properly calibrated for a given set of operating conditions, that calibration may not be appropriate at a later time when operating conditions are dissimilar.

BRIEF DESCRIPTION OF THE INVENTION

The improved valve system of our invention overcomes shift quality concerns of the kind described in the background discussion above. It is capable of providing better control of a synchronous downshift event, both a 4-2 downshift and a 3-2 downshift. Electronically regulating the exhaust pressure of the off-going friction element, according to our invention, will appropriately control the torque-carrying capacity of that element during a downshift, thus improving the timing of the shift synchronization and achieving maximum shift smoothness.

A downshift from the direct ratio to the second ratio requires disengagement of a direct-drive clutch and the engagement of a second and fourth ratio brake. The second and fourth ratio brake is actuated and released by a double-acting fluid pressure operated servo with a pressure apply chamber and a pressure release chamber. The servo is applied when servo pressure is admitted by the valve system to the apply pressure chamber. At that time, the piston of the double-acting servo displaces fluid from the release pressure chamber of the servo so that the latter acts as an accumulator.

Our invention makes it possible to regulate the control of the exhaust of the pressure from the direct drive clutch. The control includes a 3-2 timing valve that modulates the pressure released from the direct-drive clutch, the degree of the modulating action being determined by a variable force solenoid valve that is under the control of the processor. The fluid that is displaced from the clutch is in parallel flow relationship with respect to the fluid displaced from the release side of the second and overdrive ratio servo.

The powertrain controller is programmed to control a variable force solenoid valve by monitoring the input and the output parameters of the system such as engine speed, turbine speed, vehicle speed, and throttle position, thereby enabling the system to adjust the shift event timing and feel. Based upon these powertrain signals, the microprocessor determines the pressure level at which the variable force solenoid controls the exhaust pressure of the 2-4 servo.

The electronic control strategy in the microprocessor memory sets the starting and ending regulated pressures. Intermediate pressures during the shift are determined as a function of the fractional amount of the gear ratio change completed beginning from the instant the gear ratio change begins until completion of the gear ratio change. Ramping of the variable force solenoid output pressure effectively regulates exhaust pressure of the off-going friction element, thereby providing a means for controlling the friction element carrying capacity during the course of the shift event.

The ability of the processor to control the torque-carrying capacity of the off-going friction element in a synchronous downshift provides the transmission calibrator with the means for controlling shift synchronization.

The microprocessor establishes a so-called throttle valve pressure (TV pressure). One of the regulating solenoid valves mentioned above is a line pressure variable force solenoid valve (VFS) which is under the control of the processor. That valve develops the TV pressure which acts on the main regulator valve to modulate the main line pressure used to apply, release and hold the various clutches and brakes.

The TV pressure is calculated by determining the static TV capacity or TV_STAT. This is the throttle valve pressure that is required to hold the weakest friction element due to combustion torque (TQ_NET) and inertia torque (TQ_IALPHA) during a shift. TQ_NET is the net engine torque delivered to the torque converter. TQ_IALPHA is the torque that results from a transmission upshift or downshift. It takes into account the inertia forces due to a change in speed of the rotating transmission masses.

TQ_IALPHA is zero when the shift is not taking place. The sum of the combustion torque and the inertia torque is multiplied by the torque converter ratio to determine the total torque the transmission must deliver (TQ_STAT_CAP). This in turn determines the static TV capacity requirement, as set forth in the following equation:

$$TQ\_STAT\_CAP = (TQ\_NET + TQ\_IAL-PHA) \times TR_{TC}, \text{ and}$$

$$TV\_STAT = (TQ\_STAT\_CAP \times SLOPE) + Y\ INTERCEPT,$$

where SLOPE is the linear relationship of the minimum amount of TV pressure required to hold an element at a given torque input. The Y INTERCEPT is the offset of the line slope indicating the force of the clutch return spring that must be overcome before positive torque capacity of the clutch occurs.

Dynamic TV pressure is the TV pressure required to obtain acceptable shift feel. Dynamic TV pressure allows for an increase in line pressure needed to hold torque capacity during a shift. Additional TV pressure is provided on quick "tip-in" shifts to counteract the lag time of the processor in updating the engine torque output and for the lag time of the hydraulic variable force solenoid TV system.

Further information regarding pressure control in a transmission of this kind may be seen by referring to U.S. Pat. No. 5,157,608, mentioned above.

The invention includes a special 3-2 control module (SS3L), which determines the output of the variable force 3-2 control solenoid valve based on a 3-state register (SS3L—OUT). When verifying a 3-2 downshift or when a 4-2 downshift is commanded, the pressure is modulated from a starting value to an end pressure as a function of percent shift complete (PCSFTCMPTSEQ). This is the function that controls the rate of the servo pressure release, which regulates the release also of the direct drive clutch. The state of the register SSL—OUT is determined by the "determine shift solenoid state" module of the control system, the details of which can be learned by referring to the previously described '608 patent.

The three states of the three-stage register SS3L— OUT are SS3L—OUT=0, SS3L—OUT=1, AND SS3L—OUT =2. The first state is the SS3L—OUT pressure at a minimum value for coast braking. The second state is in place when the SS3L—OUT pressure is in mid-range for no-coast braking. The third state is in place when the SS3L—OUT output pressure is controlling the release of the 2-4 band servo.

As will be described subsequently with respect to FIGS. 1C through 1K, a register called SS3L—MODE, which is an eight-state register, controls the 3-2 control coast clutch solenoid during a 3-2 shift or a 4-2 shift. The states are mode 0 through mode 7 which, respectively, are used as follows:

(a) not commanding or verifying a 3-2 or a 4-2 shift;
(b) verifying a 3-2 shift and raising the line pressure;
(c) commanding a 3-2 shift and holding the line pressure high;
(d) start to ramp down the line pressure;
(e) holding the pressure until the end of the shift;
(f) commanding a 4-2 shift and raising the line pressure;
(g) starting to ramp down the pressure; and
(h) holding the line pressure until the end of the shift.

The ramp starting pressure and the ramp ending pressure are functions of speed and throttle position. Other variables for controlling the shift are timers SS3L—EN-D—D3 and SS3L—END—D4, which are used to hold the pressure in modes 4 and 7 after the ramping ends.

In controlling the pressure, the processor modulates the hydraulic pressure, as directed by a pressure control strategy that regulates a look-up of engine torque from a table and causes a variation of pressure to contain the static torque capacity requirement of the transmission.

Normal shift scheduling is determined by a shift strategy having features that are similar to the strategy described in U.S. Pat. No. 5,150,297, issued Sep. 22, 1992, to J. A. Daubenmier, P. A. Baltusis, R. T. Cowan, J. E. El-Khoury and R. S. Williams. The '297 patent is assigned to the assignee of the present invention.

The shift strategy determines the appropriate gear as dictated by the vehicle operating conditions. It confirms the gear that is needed and sets the shift solenoids to produce that ratio. Two on-off, normally closed solenoids control the shift valves.

The shifts are based on functions of vehicle speed and throttle position stored in memory. Separate functions are provided for upshifting to each gear and for downshifting to each gear. After a shift is initiated, the gear ratio is monitored until the completion of the shift.

The control system of our invention also controls the bypass clutch for the torque converter. The bypass clutch strategy has features that are common to the strategy and the hydraulic circuit described in pending U.S. application Ser. No. 926,627, filed Aug. 10, 1992, by A. S. Leonard, K. G. Wallega, D. M. Garrett, T. L. Greene, J. A. Daubenmier, B. J. Palansky, and L. H. Buch. It includes features common also to the bypass clutch described in U.S. Pat. No. 5,029,087, issued Jul. 2, 1991 to R. T. Cowan et al. The '627 patent application and the '087 patent also are assigned to the assignee of the present invention.

BRIEF DESCRIPTION OF THE DRAWINGS

FIGS. 1C through 1K are schematic flow diagram representations of the control strategy for controlling electronically a synchronous downshift from the third ratio to the second ratio in the transmission of FIG. 1A.

FIG. 1P shows the relationship between time and the variables illustrated in FIG. 1M during a 4-2 shift event. It is similar to the 3-2 shift curves of FIG. 1M but is illustrative instead to a 4-2 shift.

FIG. 1Q is a graph showing the relationship between vehicle speed and the percent shift complete, stored in memory, which is used during the 3-2 downshift.

FIG. 1R is a table showing the end pressure and the starting pressure during a ramp-down of pressure on the direct clutch an servo release when a 3-2 downshift occurs.

FIG. 1S is a graph showing the clutch and servo release pressure variations and the functional relationship between that pressure and time during a 3-2 shift.

FIGS. 30A, 30B and 30C show the hydraulic shift feel logic for a 2-3 shift, a 3-2 shift (low speed mode) and a 3-2 shift (high speed mode), respectively.

FIGS. 34A, 34B and 34C show the shift feel logic for reverse engagement at low speed, reverse disengagement and reverse engagement at high speed, respectively.

FIGS. 35A and 35B, taken together, show the overall valve arrangement which is illustrated in the previous figures.

FIG. 35C is a cross-sectional schematic view of the 2-4 brake servo shown in block diagram form in FIG. 35B.

PARTICULAR DESCRIPTION OF THE INVENTION

Torque Flow Elements

Figure 25:
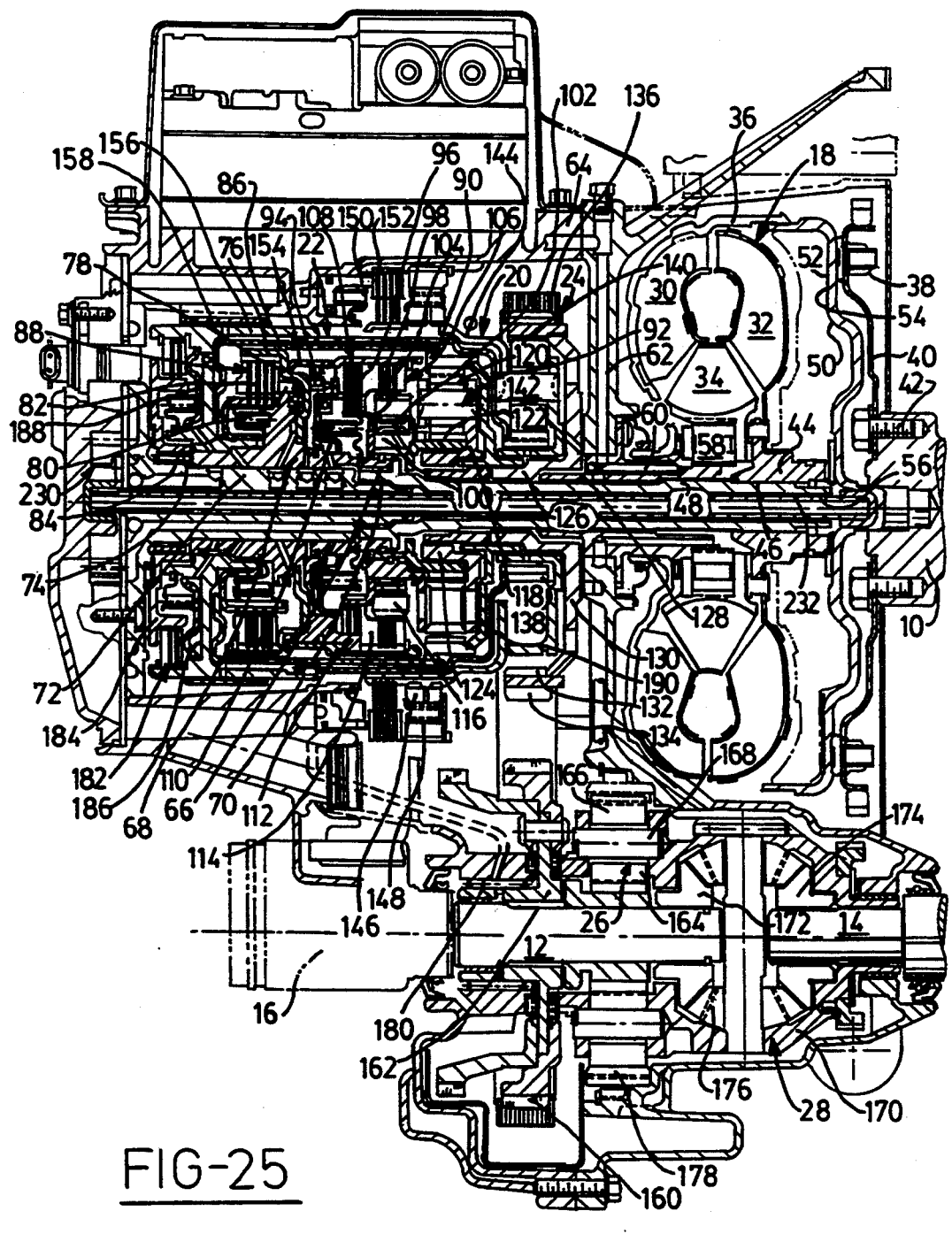
FIG. 25 is a cross-sectional view of the transmission mechanism illustrated in schematic form in FIG. 1A.

In FIG. 25, numeral 10 designates the crankshaft of an internal combustion engine in the automotive vehicle driveline. Numeral 12 and numeral 14 designate torque output shafts that in turn are connected to axle half shafts by means of universal joints, one of which is shown at 16 in FIG. 25. The half shafts are connected to vehicle traction wheels.

The principal components of the assembly of FIG. 25 are hydrokinetic torque converter 18, multiple ratio gearing 20, clutch and brake structure 22 for controlling the ratio changes in the gearing 20, torque transfer drive 24, final drive gear assembly 26 and differential and axle assembly 28. The structure of FIG. 25 will be described only generally since reference may be made to the previously mentioned patent of Stanley L. Pierce, U.S. Pat.

No. 4,938,097, for a particular description of the transmission gearing.

The hydrokinetic torque converter 18 includes a bladed impeller 30, a bladed turbine 32 and a bladed stator 34. These elements are arranged in toroidal fluid flow relationship in a conventional manner. Impeller 30 comprises an impeller shell 36 that is connected drivably at 38 to a drive plate 40. Crankshaft 10 is connected by bolts 42 to the hub of 10 the drive plate 40.

Turbine 32 includes a turbine hub 44, which is splined at 46 to turbine sleeve shaft 48. A torque converter bypass clutch plate 50 is located within the impeller shell 36 adjacent turbine 32. It carries friction member 52, which is adapted to frictionally engage annular surface 54 on the interior of the impeller shell 36. The hub of bypass clutch plate 50 is splined to the turbine hub 44.

The bypass clutch plate 50 cooperates with the radial wall of the impeller shell 36 to define a bypass clutch control pressure cavity, which communicates with annular bypass control pressure passage 56 formed in the turbine sleeve shaft 48. When the pressure in the toroidal circuit within the impeller shell 36 exceeds the pressure in the bypass clutch control pressure cavity, the bypass clutch becomes engaged thereby connecting the impeller 30 and the turbine 32 to establish a mechanical torque flow path.

Stator 34 is mounted on a one-way brake 58, which is comprised of an inner race splined to a stationary sleeve shaft 60 forming a part of radial stator support wall 62. Wall 62 forms a part of the transmission housing, generally identified by reference numeral 64.

Turbine sleeve shaft 48 is splined at 66 to clutch and brake sleeve shaft 68. The left end of the turbine shaft 48 is journalled at 70 to an inboard end of stationary support sleeve 72, which forms a part of the housing 64. The left end of the clutch and brake sleeve shaft 68 is journalled at 74 on the sleeve 72.

A clutch drum 76 is connected by radial clutch member 78 to the sleeve shaft 68. It defines an annular cylinder that receives direct clutch piston 80. Direct clutch discs 82 carried by the drum 76 cooperate with clutch discs carried by clutch member 84, which in turn is connected to torque transfer drum 86. Thus, when the direct clutch piston is pressurized, the discs of the direct clutch, identified generally by reference character 88, become engaged thereby connecting the sleeve 68 and the turbine shaft 48 to the member 86. The right end of the member 86 is connected to ring gear 90 of a first simple planetary gear unit 92, which forms a part of the gearing 20.

The drum 76, the sleeve 68 and the radial member 78 cooperate to define a forward clutch cylinder that receives a forward clutch piston 94. Coast clutch friction discs 96 are carried by drum 76. Cooperating coast clutch discs are carried by clutch member 98, which is secured to the inner race 100 of an overrunning coupling 102. The outer race of the coupling 102 carries forward clutch discs 104, which register with forward clutch discs carried by the drum 76.

The forward clutch is identified generally by reference numeral 106, and the coast clutch is identified generally by reference numeral 108. When the piston 94 is pressurized, the forward clutch discs 104 become frictionally engaged, thereby establishing a driving connection between the outer race of the overrunning coupling 102 and the clutch drum 76. The piston 94 defines a cylinder in which is received a coast clutch piston 110. The piston 110, when it is pressurized, acts on the friction discs 96, thereby establishing a mechanical frictional drive connection between the inner race 100 and the clutch drum 76.

The clutch drum carries separator plates that register with the friction discs 104, and extension 112 on the piston 110 extends through apertures in the separator plates so that when the forward clutch is pressurized, the piston 94 will exert a clutch engaging force on pressure plate 114 which applies the forward clutch and establishes a frictional driving connection between clutch drum 76 and the outer race 116 of overrunning coupling 102.

The planetary gear unit 92 includes a carrier 118 which supports pinions 120. The pinions 120 mesh with ring gear 90 and sun gear 122. Sun gear 172 is journalled on the hub 124 of the carrier 118, which is connected by a spline to the inner race 100 of the coupling 102.

Carrier 118 is splined to sleeve shaft 126, which is journalled on bearing support 128 formed on the housing 64. A radial drive plate 130 formed integrally with the sleeve 126 carries ring gear 132. The outer periphery of ring gear 132 is formed with sprocket teeth 134 over which is trained a drive chain 136. Ring gear 132 and sun gear 138 mesh with pinions 140 journalled on the carrier 142. Drive member 144 connects the carrier 142 to the inner race 146 of an overrunning brake 148. The outer race of the overrunning brake 148 is fixed to the housing 64.

The housing defines an annular cylinder which receives annular brake piston 150. Friction discs are carried by the member 144. These register with separator plates carried by the housing 64. The separator plates and the disc define a low and reverse friction brake 152, which is arranged in parallel disposition with respect to the overrunning brake 148.

Sun gear 138 is connected by a torque transfer member 154 to brake drum 156, which is surrounded by 2-4 brake band 158. The 2-4 brake band is applied and released by a fluid pressure operated servo which will be described subsequently with reference to FIG. 35C. Ring gear 90 is connected to torque transfer member 86, thus connecting the clutch member 68 to the ring gear 90 when the direct clutch 88 is applied.

The final drive gear assembly 26 comprises a driven gear 160, which is connected to ring gear 132 by the drive chain 136. Gear 160 has a hub 162 which is connected directly to sun gear 164 of the final drive gear assembly 26. Planetary pinions 166 of the gear assembly 26 are journalled on carrier 168, which is connected drivably to differential carrier 170 of the differential assembly 28. A first side gear 172 of the differential assembly 28 is splined to axle half shaft 12 and a companion side gear 174 is splined to the other axle half shaft 14. Carrier 170 journals differential pinions 176 which engage drivably the side gears 172 and 174. Pinions 166 engage ring gear 178 which is fixed to the housing and which acts as a reaction point. Torque is delivered to the sun gear 164 from the driven gear hub 162. The latter being journalled by bearing 180 on the transmission housing.

A reverse clutch shown generally at 182, and separator plates are splined to brake drum 156. These register with friction discs carried by clutch member 84, which is splined to the clutch sleeve 68. The brake drum defines a clutch cylinder 186, which receives reverse clutch piston 188. When pressure is admitted to cylinder 186, piston 188 engages the reverse clutch 182, thereby drivably connecting clutch sleeve member 68 with the brake drum 156.

Figures 1A, 26:
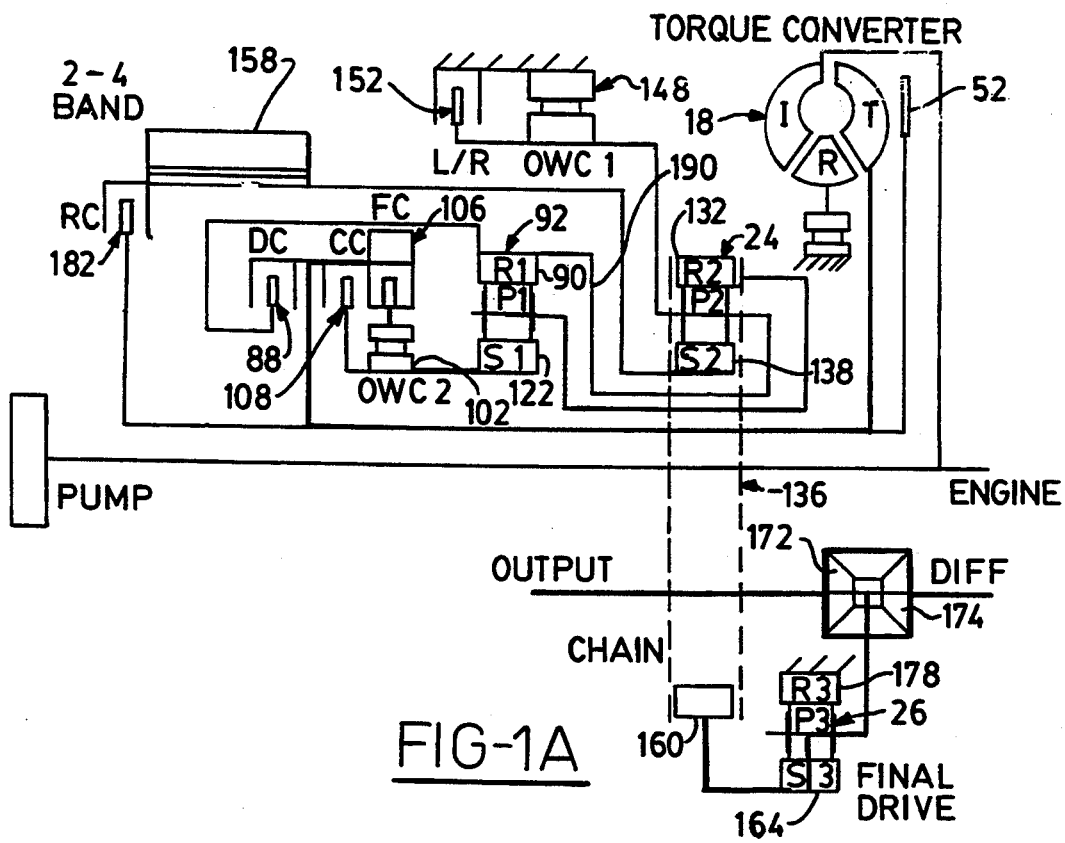
FIG. 1A is a schematic representation of a power transmission mechanism capable of embodying the improved control system of our invention.
FIG. 26 is a chart showing the clutch and brake engagement and release pattern for establishing each of four forward drive ratios and a reverse ratio in the transmission of FIG. 1A and 25.

The transmission mechanism illustrated in FIG. 25 is capable of providing four forward driving ratios and a single reverse ratio as the clutches and brakes are applied and released. This can best be described with reference to the schematic diagram of FIG. 1A and with reference to the chart of FIG. 26. In FIG. 1A, the clutches and brakes that are designated by reference numerals in FIG. 25 are identified FIG. 1A by the symbols "RC" for the reverse clutch 182, "CC" for the coast clutch 108, "FC" for the forward clutch 106, "DC" for the direct clutch 88, "L/R" for the low and reverse brake 152, "2/4" for the 2-4 band 158, "OWC2" for the overrunning coupling 102, and "OWC1" for the overrunning brake 148.

To establish first ratio operation, it merely is necessary to engage the forward clutch FC. Engine torque drives the impeller of the torque converter 18, thereby establishing a turbine torque which is distributed through the forward clutch FC and through the overrunning coupling OWC2 to the sun gear 122. The ring gear 90 is connected through the torque transfer member 190 to the carrier 142 of the gear unit 24, which is anchored to the housing by overrunning brake 148. Thus, the ring gear acts as a reaction member as torque is delivered through the forward clutch to the sun gear 122. The carrier for the gear unit 92 then is driven and carrier torque is transferred to ring gear 32 for the gear unit 24, which drives the driven gear 160. Torque then is transferred to the final drive sun gear 164 with the ring gear 178 acting as a reaction point. The carrier of the differential mechanism is driven, thus transferring torque to each side gear 172 and 174.

In the schematic drawing of FIG. 1A, the sun gear 122 and the ring gear 90 are identified by symbols S1 and R1, respectively. Similarly, sun gear 138 and ring gear 132 are identified by the symbols S2 and R2, respectively. The final drive sun gear 164 and final drive ring gear 178 carry the symbols S3 and R3, respectively.

If manual low operation is desired, coast braking can be achieved. This requires the engagement of the low and reverse brake L/R and the engagement of the coast clutch CC. This effectively bypasses the overrunning couplings OWC1 and OWC2, respectively, thereby permitting coast torque to be transferred from the axle half shafts to the engine.

Forward drive operation in the second ratio is obtained by keeping the forward clutch applied and by engaging the 2-4 brake band. The engagement of the 2-4 brake band anchors sun gear S2. Turbine torque then is delivered through the forward clutch FC and through the overrunning coupling OWC2 to the carrier for gear unit 92 and to the ring gear R2 for gear unit 24. With the ring gear R2 acting as a torque input gear element and with the sun gear S2 being anchored, the ring gear R1 drives the carrier for gear unit 24 in a forward direction since the coupling OWC1 is released and overruns. Thus, the overall ratio is increased relative to the low ratio.

If coast braking is desired during operation in the low ratio, coast clutch CC is applied, as well as the forward clutch FC and the 2-4 brake band. A torque flow path around the coupling OWC2 then is established by the coast clutch, thereby permitting reverse torque flow through the gear system.

Third ratio operation in the forward drive range is obtained by simultaneously engaging forward clutch FC and direct clutch DC. Both the L/R brake and the 2-4 brake are released. Thus, all of the elements of the gearing are locked together for rotation in unison as torque is delivered from the turbine shaft through the locked-up gearing to the ring gear R2.

As in the case of operation in the first and second ratios, coast braking is possible in third gear by engaging the coast clutch CC, thus bypassing the overrunning coupling OWC2 and permitting reverse torque flow through the gear system.

Fourth ratio operation, which is an overdrive ratio, is achieved by engaging simultaneously the forward clutch FC and the 2-4 brake band, as well as the direct drive clutch DC. Since both the clutches DC and FC are applied, the torque is distributed directly through the gear unit 92, causing torque flow to pass from the carrier of gear unit 92 to the ring gear R2. The carrier for gear unit 24 walks around anchored sun gear S2. Thus, the overall ratio is less than one.

Reverse drive is obtained by engaging the reverse clutch RC and the low and reverse brake L/R. Driven torque is delivered through the engaged clutch RC directly to the sun gear S2. The carrier for the gear unit 24 is anchored by the low and reverse brake, thereby causing the ring gear 132 to be driven in a reverse direction.

Control Valve System

Figure 35A:
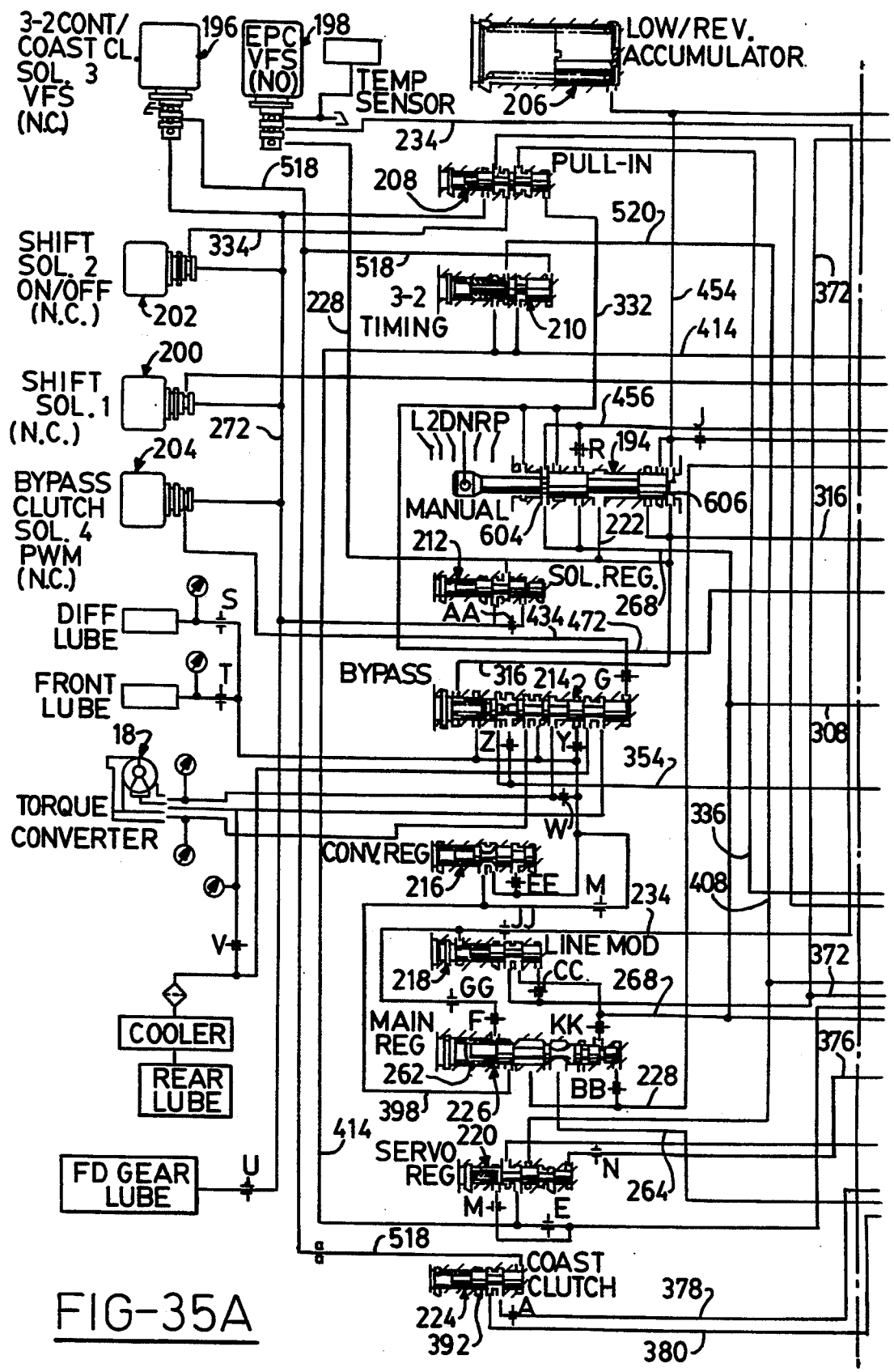

A schematic representation of the valve circuit for controlling the application and release of the clutches and brakes is illustrated in FIGS. 35A and 35B, taken together. The valve circuit consists of control pressure valve elements, a cooling circuit and a lubrication circuit, which are provided with fluid by a fixed displacement pump. The torque converter bypass clutch control shift scheduling and line pressure regulation are achieved electronically. The control includes a microprocessor that is integrated with the engine controls, thus making it possible to use a single processor for overall drive train control. The torque converter includes an electronically-controlled bypass clutch with a mechanical damper, as indicated in FIG. 1. The torque converter axial dimension for the toroidal circuit is 20 percent less than the radial dimension of the toroidal circuit, thus improving packaging efficiency.

The valve circuit includes a manual valve that has six shift quadrant positions; namely, park, reverse, neutral, drive, drive range 2 and low range 1. An overdrive cancel switch can be activated or deactivated to prevent automatic ratio changes to the fourth ratio. If the overdrive cancel switch is off, automatic 1-2-3-4 upshifts and downshifts can be obtained. Coast braking is available only in fourth ratio, as indicated in the schematic diagram of FIG. 25 and the chart of FIG. 26. If the overdrive cancel switch is on, only first, second and third ratio automatic upshifts and downshifts are available. Coast braking is provided only in second and third ratios, depending upon whether the coast clutch is on or off.

When the manual valve is in the 2 position, the second ratio is held, although an automatic 1-2 upshift and a 2-1 downshift can be provided if that is desired. The L position of the manual valve results in a discrete first range drive mode. Manual low pull-in by the vehicle operator will provide second gear operation above 25 miles per hour and first gear operation at speeds lower than 25 miles per hour. After the transmission settles in the first gear ratio, it will remain in the first gear ratio regardless of vehicle speed.

Normal shift scheduling is controlled by the microprocessor and by normally closed three-way solenoids under the control of the microprocessor. The solenoids serve to actuate on/off hydraulic shift valves. Nonsynchronous upshifts from first to second ratio and from the third to fourth ratio are cushioned by an accumulator, which is common to both shifts. Downshift pressure control for the synchronous 3-2 downshift is controlled by a variable force solenoid and a regulator valve. Electronic line pressure control is used to modulate capacity during shifts.

If there is an interruption in the power supply for the microprocessor, when the transmission is in condition for operation in the D range or the 2 range, the transmission will shift to third gear with an open converter. Coast braking also is obtained under those conditions. Second gear operation under these conditions with engine braking can occur by moving the manual lever to the L position.

The valve elements of the control system are shown in FIGS. 35A and 35B. These include the manual valve 194, which can be adjusted by the vehicle operator to any one of the six operating positions described earlier. Two variable force solenoid valves are shown at 196 and 198. Valve 198 is used to control line pressure. It produces a signal referred to in this description as TV pressure, and it distributes that pressure to the main regulator valve for adjusting the circuit pressure.

Variable force solenoid valve 196 has a dual function. The first of these is the control of the 3-2 downshift by regulating direct clutch exhaust pressure. The second function is the electronic control of the transmission coast braking as will be explained.

The circuit includes also three normally closed on/off solenoid valves; namely, shift solenoid 200 which establishes a signal for actuating the 1-2 shift valve, and second on/off solenoid valve 202 which develops a signal that controls the operation of the 2-3 shift valve. The third solenoid valve is a pulse with modulated bypass clutch control valve 204, which develops a signal that is applied to a bypass clutch solenoid valve.

Engagements from neutral to low and from neutral to reverse are controlled by a low reverse accumulator 206. A pull-in valve 208 is actuated by the manual valve 196 to achieve second ratio or low ratio operation in the event of a loss of control voltage.

Ratio changes between the third ratio and the second ratio are controlled by a 3-2 timing valve 210.

The solenoid valves are supplied with a regulated solenoid feed pressure by solenoid regulator valve 212.

The bypass clutch regulator valve 214, which is under the control of solenoid valve 204 as mentioned earlier, is used to control the pressure differential across the bypass clutch for the torque converter. The pressure in the converter is regulated by a converter regulator valve 216.

A line pressure modulator valve 218 provides shift feel pressure for all three upshifts. A servo release pressure regulator valve 220 controls the pressure on the release side of the 2-4 servo, indicated generally by reference character 222, which applies and releases the brake band 158.

The coast clutch CC is controlled by coast clutch valve 224. This valve is under the control of the 3-2 coast control solenoid valve 196, the latter regulating the supply pressure developed by the solenoid regulator valve 212 to produce a signal that is distributed to the coast clutch control valve.

Main regulator valve 226 is in fluid communication with line pressure passage 228. Pressure is supplied to line pressure passage 228 by pump 230 seen in the schematic drawing of FIG. 35B. Pump 230 also is shown generally in FIG. 1 at the left side of the housing 64. The pump 230 is a positive displacement pump, which is connected drivably by means of pump drive sleeve shaft 232 to the crank shaft 10, as seen in FIG. 1.

Main regulator valve 226 develops a circuit pressure for the clutches and the brake servo.

Main regulator valve 226 receives TV pressure from the variable force solenoid valve 198. TV pressure passage 234 connects variable force solenoid 198 with the main regulator 226. Main regulator 226 develops a circuit pressure that is proportional to the output signal in passage 234.

FIG. 35B shows the two accumulators. The first accumulator 236, which is labeled 2-4 accumulator, cushions the application of the 2-4 servo on both a 1-2 upshift and a 3-4 upshift. The second accumulator 238 is a forward clutch accumulator which cushions the application of the forward clutch 106 when the transmission is conditioned for a shift from neutral to forward drive. A low reverse valve 240 modulates the line pressure made available to low and reverse clutch 152 when the transmission is conditioned for operation of the manual low drive range. The 1-2 shift valve 242 controls ratio changes from the first to the second ratio. It assumes the low range position to condition the transmission for operation in low and is shifted to an upshift position when the transmission is conditioned for operation in the second, third and fourth forward drive ratios.

A 3-2 control valve 244 makes it possible for the transmission to be shifted from third to second without stroking the accumulator 236. It exhausts the accumulator when the transmission is shifted from third to second, which allows the accumulator to stroke and to be conditioned for a ratio change to the fourth ratio. At that time, the 3-2 control valve is stroked to interrupt the exhaust flow path for the accumulator 236.

The 3-2 control valve 244 makes it possible to use a common accumulator for both the 1-2 upshift and the 3-4 upshift.

The 3-2 control valve is stroked by the pressure that is made available to the direct clutch, which moves the valve to a position that will introduce a control orifice in the exhaust flow path for the accumulator 236. Provision is made for latching the valve in that position when the transmission returns to the second ratio.

The 2-3 shift valve 246 controls ratio changes between the second ratio and the third ratio in response to a signal developed by the shift solenoid 202. The shift solenoid 200 controls the shifting movement of the 1-2 shift valve. The same signal that is used to control movement of the 3-4 shift valve 248 controls also ratio changes between the third ratio and the fourth ratio. Thus, the same shift solenoid can be used for controlling both shift valves 242 and 248, thereby simplifying the circuit.

Figure 2:
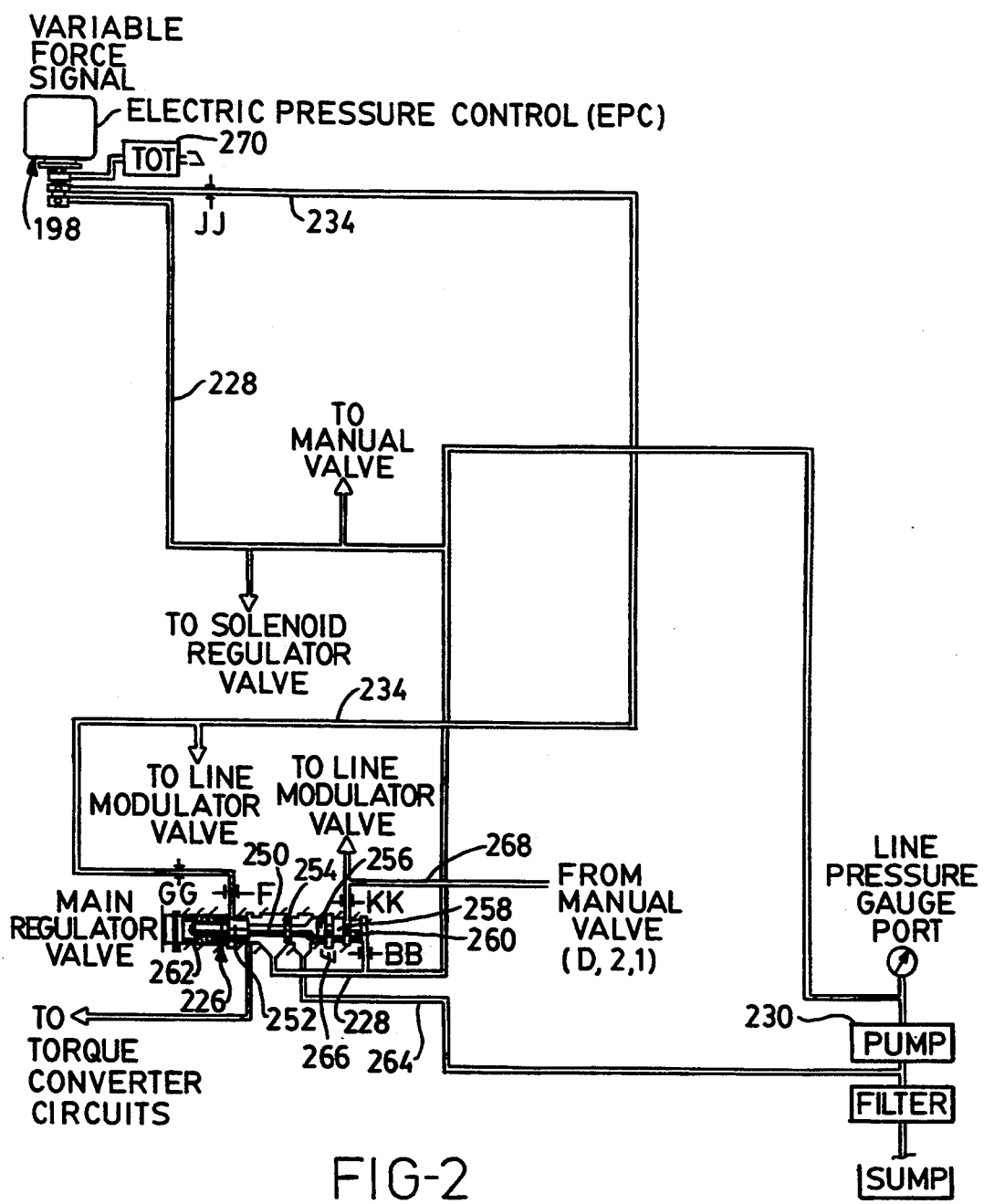
FIG. 2 is a partial assembly view of the control system showing the line pressure circuit for the transmission when it is operated in the drive range or in either the second or first manual range.

The line pressure circuit is shown in FIG. 2 isolated from the other elements for purposes of clarity. The electronic pressure control valve 198, as explained previously, communicates with line pressure passage 228 to establish a throttle pressure TV signal in passage 234. The line pressure is established by the main regulator valve which comprises a valve spool 250 with axially spaced valve lands 252, 254, 256. Spring 262 urges the valve spool 250 in the right-hand direction. This is opposed by the force of fluid pressure and line pressure line 228, which acts on the right end of the land 260. Return passage 264 communicates with the valve chamber for the valve spool 250 at a location between lands 252 and 254. It communicates with the return side of the pump 230.

Lands 256 and 258 have a differential diameter. The space between these lands communicates with exhaust port 266. Lands 250 and 260 also have a differential diameter defining a pressure area that is directed to a modulated line pressure developed by the line modulator valve 218, not shown on FIG. 2. The modulated line pressure is distributed to passage 268, which extends to the 2-3 shift valve and to the 3-4 shift valve.

Line pressure passage 228 also communicates with the solenoid regulator valve 212 which establishes a solenoid feed pressure, as will be explained subsequently. Line pressure passage 228 also feeds the manual valve 194, as will be explained subsequently.

Changes in the value of the TV pressure in passage 234 will result in a change in the regulated pressure in the line pressure passage 228. The microprocessor varies the current supplied to the solenoid valve 198. The fluid exhaust at the electronic pressure control valve 198 flows to transmission oil temperature sensor 270.

When the transmission is conditioned for automatic drive range D, the manual 2 position or the manual 1 position, fluid pressure in passage 268 causes the line pressure to operate in a lower pressure range because that pressure acts on the differential area of lands 258 and 260. When the transmission is operated in park, neutral or reverse, however, passage 268 is not pressurized. This results in a higher regulated line pressure that is maintained by the main regulator valve 226.

Figure 3:
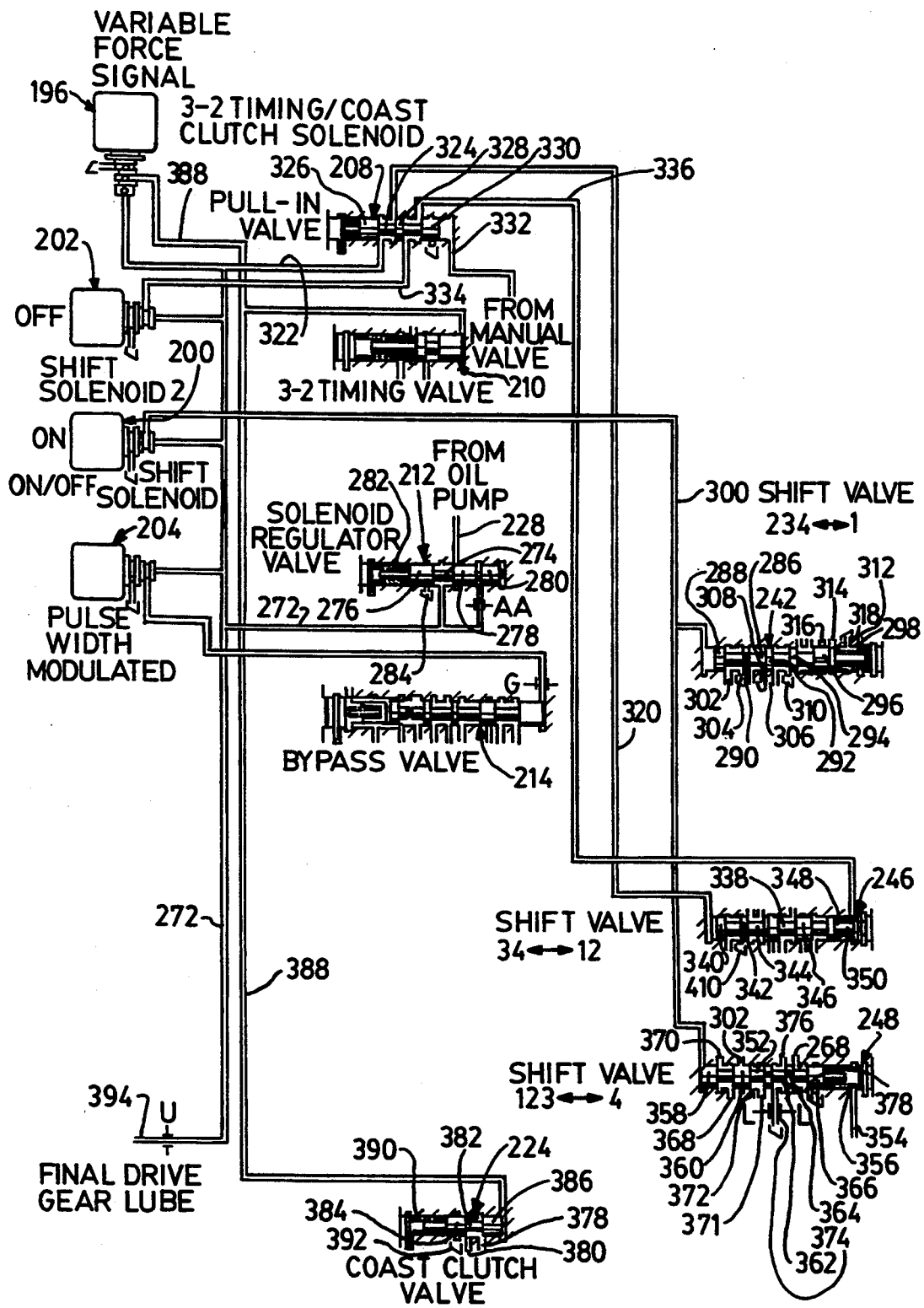
FIG. 3 is a partial assembly view of the valve system of our invention showing the solenoid circuit for manual low first gear operation.

In FIG. 3, we have shown the solenoid circuits for the transmission when the transmission is conditioned for first gear operation. The solenoids 200, 202 and 204 are fed with pressure through solenoid feed passage 272. Passage 272 communicates with the solenoid regulator valve 212, which comprises a valve spool 274 with three-space valve lands 276, 278 and 280. A valve spring 282 urges the valve spool 274 in the right-hand direction. Line pressure passage 228 communicates with the valve chamber for the valve spool 274 at a location between lands 276 and 278. Solenoid feed passage 272 is located between lands 276 and 278. The pressure in passage 272 acts on the feedback pressure area defined by lands 278 and 280. The magnitude of the pressure in passage 272 is determined by the calibration of the valve and the spring rate for the spring 282. Exhaust port 284 for the valve 212 is located adjacent land 276.

The regulated pressure in passage 272 is supplied to each of the four solenoid valves 196, 202, 200 and 204. The microprocessor controls the solenoid valves 200 and 202 for initiating movement of the shift valves to provide operation in the first, second, third and fourth ratios. The processor also controls the 3-2 timing coast clutch solenoid 196 and the torque converter solenoid valve 204. The bypass clutch valve 214 thus is able to function to apply and release the torque converter clutch, as well as to establish modulation of the torque converter clutch.

Ratio changes between the first and second ratios are achieved by the movement of the 1-2 shift valve 242, which comprises a valve spool 286 having valve lands 288, 290, 292, 294 and 296. The spool is urged in the left-hand direction by the valve spring 298. As explained previously, when a shift signal in signal passage 300 is developed by the shift solenoid valve 200 under the control of the processor. When the valve spool 286 is shifted to the right, lands 288 and 290 establish communication between passage 302 and exhaust port 304. Passage 302 is pressurized when the transmission is conditioned for operation in the second, third and fourth ratios. When the transmission is downshifted to the first ratio, passage 302 acts as an exhaust flow path for the 2-4 servo. Line pressure is distributed through passage 306 and through the 1-2 shift valve to passage 308 when the 1-2 shift valve is in the upshift position. Communication between passage 308 and 306 is controlled by lands 294 and 292.

When the 1-2 shift valve is downshifted, passage 306 is brought into communication with exhaust port 310.

As will be explained subsequently, line 308 is an exhaust flow line when the transmission is downshifted to the first ratio so that flow restricting orifice D is bypassed. On the other hand, orifice D is introduced into the pressure feed passage for the apply side of this 2-4 servo when the transmission is shifted to the second, third or fourth ratio. This is consistent with the objective of eliminating flow restricting orifices in the exhaust flow passages, although flow controlling orifices are utilized to establish controlled engagement in the pressure feed lines for the clutches and the servo.

Passage 312 communicates with the right side of the 1-2 shift valve 242. It is subjected to line pressure when the transmission is conditioned for operation in the third and fourth ratio, which causes the shift valve spool 286 to shift in the left-hand direction following a 2-3 upshift.

The shift valve spool also provides a flow path between reverse line pressure passage 314 and passage 316, the latter extending to the manual valve. When the valve spool 286 is shifted to the left, passage 316 is connected to passage 314, which causes the reverse clutch 182 to become applied. When the valve spool 286 is shifted to the right in response to the development of a signal in passage 300, the passage 314 is brought into communication with exhaust port 318, thereby exhausting the reverse clutch 182.

The 2-3 shift valve is moved in a right-hand direction as viewed in FIG. 3 when the signal passage 320 is pressurized. Passage 320 communicates with the solenoid feed passage 322 through the pull-in valve 208 when the pull-in valve is moved in a left-hand direction as indicated in FIG. 3. The pull-in valve includes a valve spool 324 with lands 326, 328 and 330. Passage 320 communicates with the feed passage 322 through the space provided by lands 326 and 328 when the valve spool 324 is in the position shown in FIG. 3. It assumes that position when passage 332 is pressurized. That occurs whenever the manual valve 194 is moved to the low range position.

Passage 334 is a signal passage that extends from the shift solenoid 202 when the transmission is conditioned for low range first gear operation, as indicated in FIG. 3. Passage 334 is not pressurized. It communicates with feed passage 336 through the space provided between lands 328 and 330, which extends through the right side of the 2-3 shift valve 246.

Shift valve 246 comprises a valve spool 338 situated in a 2-3 shift valve chamber. Spool 338 comprises lands 340, 342, 344, 346 and 348. It is urged in a left-hand direction by valve spring 350. Valve spool 338 is urged against the force of the valve spring when pressure is present in the signal passage 320 during first and second ratio operation.

The 3-4 shift valve 248 has a valve spool 352, which is urged in a left-hand direction by pressure acting on the right-hand end of the valve spool. Pressure is delivered to the 3-4 shift valve through line pressure passage 354, which is pressurized when the 1-2 shift valve is shifted in a right-hand direction. Passage 354 is connected to the line pressure feed passage 308 through the 1-2 shift valve when the 1-2 shift valve is moved to the low ratio position. A valve spring 356 acts on the valve spool 352 to urge it in a left-hand direction.

Valve spool 352 includes spaced valve lands 358, 360, 362, 364 and 366.

The servo apply pressure passage 368 for the apply side of the 2-4 servo communicates with the modulated line pressure passage 370 through the space provided by lands 358 and 360 when the valve spool 352 is positioned as shown. If the 2-3 shift valve is upshifted, passage 370 communicates with modulated line pressure passage 372 through the 2-3 shift valve. Passage 368 communicates with passage 302 through the space provided by lands 358 and 360 when the spool 352 is shifted in a right-hand direction by the pressure in signal passage 300. That occurs, however, only if the pressure in passage 354 during operation of the first ratio is exhausted.

The servo apply feed passage 368 communicates with passage 302 when the valve spool 352 is shifted in a right-hand direction. That causes the apply side of the 2-4 servo to become pressurized on a 3-4 upshift.

The release side of the 2-4 servo communicates through line 371 with direct clutch pressure passage 372 when the valve spool 352 is shifted to the position shown in FIG. 3.

When the valve spool 352 is shifted in a right-hand direction, the servo release passage 371 is exhausted through exhaust port 374.

Line pressure passage 268, which is pressurized during operation in the direct drive second ratio and first ratio operation, communicates with passage 376 when the shift valve spool 352 is moved in a right-hand direction. This occurs during fourth ratio operation. The presence of pressure in passage 376 will trigger the operation of the servo release valve 220 as will be explained subsequently, thereby allowing a direct connection between the direct clutch supply pressure passage and the exhaust port in the servo release valve. This again is consistent with the concept of providing unrestricted flow from the applied clutches and brake servo when the clutches and brake servo are released, although control orifices are introduced in the feed lines for the clutches and servo.

Passage 378, which is connected to the line pressure passage 268 through the 3-4 shift valve when the 3-4 shift valve is in a left-hand direction, is exhausted through exhaust port 381 when the 3-4 shift valve is shifted in a right-hand direction. Passage 378 extends through the coast clutch control valve 224. The coast clutch feed passage is shown at 380.

The coast clutch valve comprises a valve spool 382 having spaced lands 384 and 386. The right-hand side of the land 386 is subjected to a signal pressure in signal pressure passage 388. The 3-2 timing coast clutch solenoid valve 196 supplies a signal pressure to passage 388 under the control of the microprocessor when the value of the signal in passage 388 is zero, the valve spring 390 urges the valve spool 382 in a right-hand direction, thereby establishing communication between passages 380 and 378. If a signal is present in passage 388, passage 380 becomes connected to coast clutch valve exhaust port 392. Thus, engagement and release of the coast clutch valve is under the control of the microprocessor.

The final drive lubrication circuit, shown generally in FIG. 3 at 394, is supplied by the solenoid feed pressure passage 272. Orifice U is located in the feed passage 272, as indicated in FIG. 3, as well as in FIG. 35A.

Figure 4:
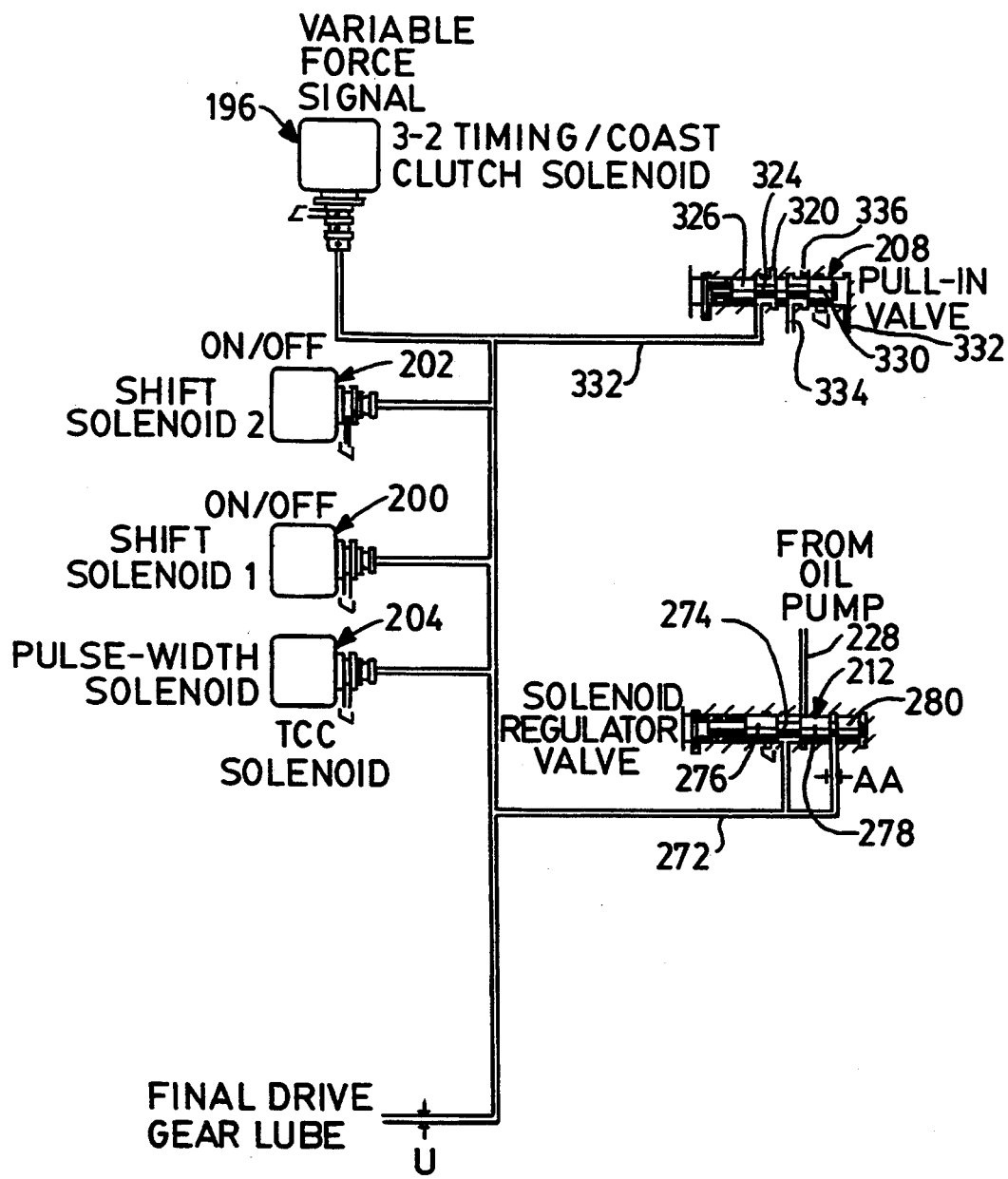
FIG. 4 is a partial valve diagram showing the solenoid feed and final drive gear lubrication circuit for manual low first gear operation.

FIG. 4 shows a solenoid feed circuit in the final drive gear lubrication circuit in isolation of the other valve elements. A solenoid feed pressure, as explained previously, is developed by the solenoid regulator valve 212, which modulates the line pressure in passage 228 to produce a desired feed pressure in passage 272.

The flow of fluid in the servo feed circuit to the pull-in valve 208 allows for operation in low range second gear operation. This may occur as the manual valve is moved to the "L" position, which causes the pull-in valve to shift in the left-hand direction, thereby conditioning the 2-3 shift valve and the 1-2 shift valve for operation in the first or second gear ratio position, even though the shift solenoids may not function.

Figure 5:
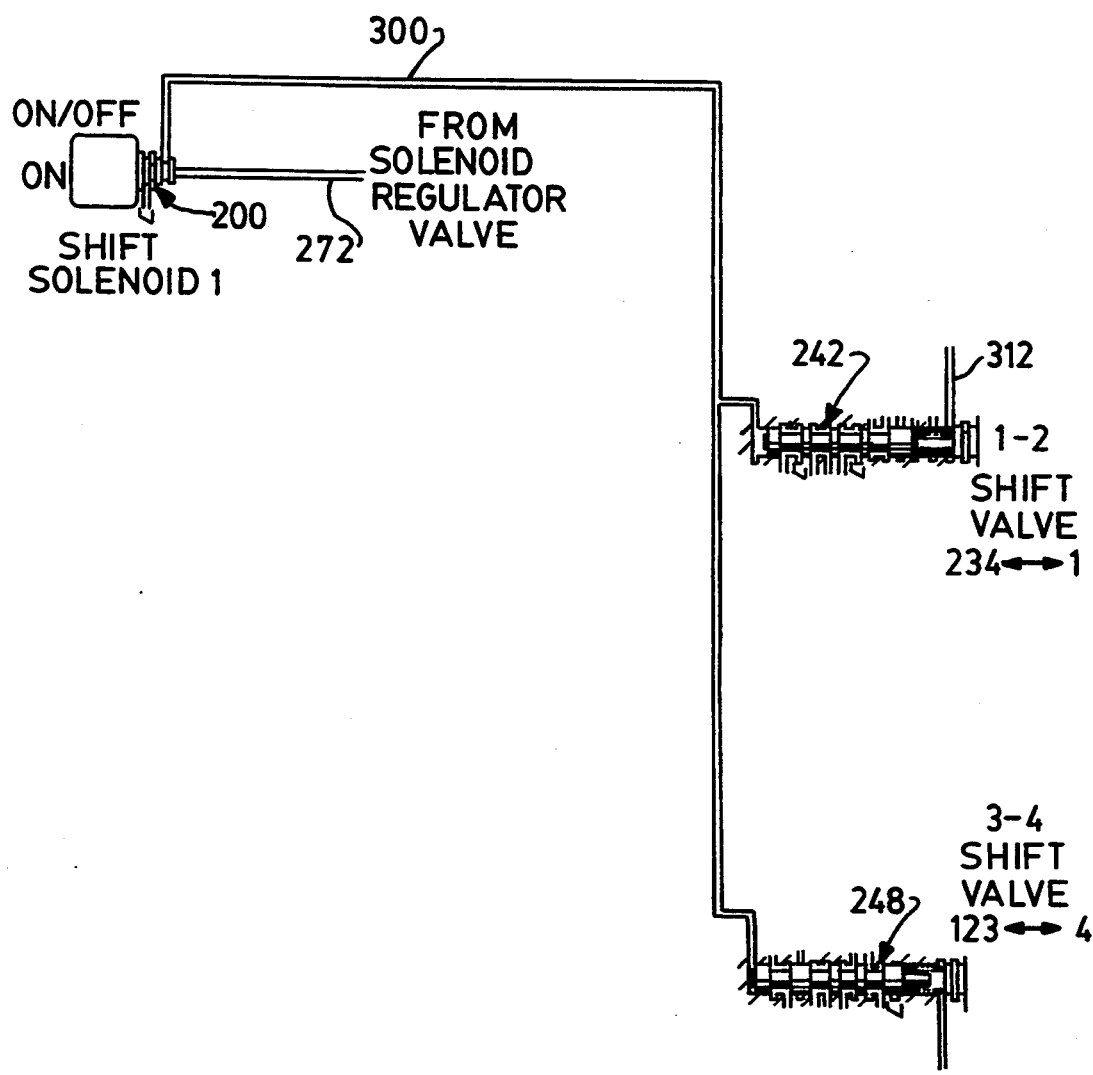
FIG. 5 is a partial valve diagram showing the shift solenoid that distributes signal pressure to the 1-2 shift valve and the 3-4 shift valve.

FIG. 5 shows a hydraulic circuit for the shift solenoid 200. It is shown in isolation of the other valve elements for purposes of clarity. Fluid in the servo feed circuit 272 is allowed to flow through the shift solenoid valve 200 causing a force on the 1-2 shift valve that shifts the 1-2 shift valve to the right. Although the 3-4 shift valve is loaded with the same pressure that exists in passage 300, movement of the 3-4 shift valve is prevented by line pressure acting on the right-hand side of the 3-4 shift valve as explained previously with reference to FIG. 3.

The shift solenoid valve 200 is on during operation in the "D" range, the "2" range and the low range first gear, as well as in the "D" range fourth gear. If the shift solenoid 200 is in the fourth gear, fluid under pressure in passage 300 moves the 3-4 shift valve but not the 1-2 shift valve. The reason for this is because pressure in passage 312, which communicates with the right-hand side of the 1-2 shift valve, prevents movement of the 1-2 shift valve to the right.

Figure 6:
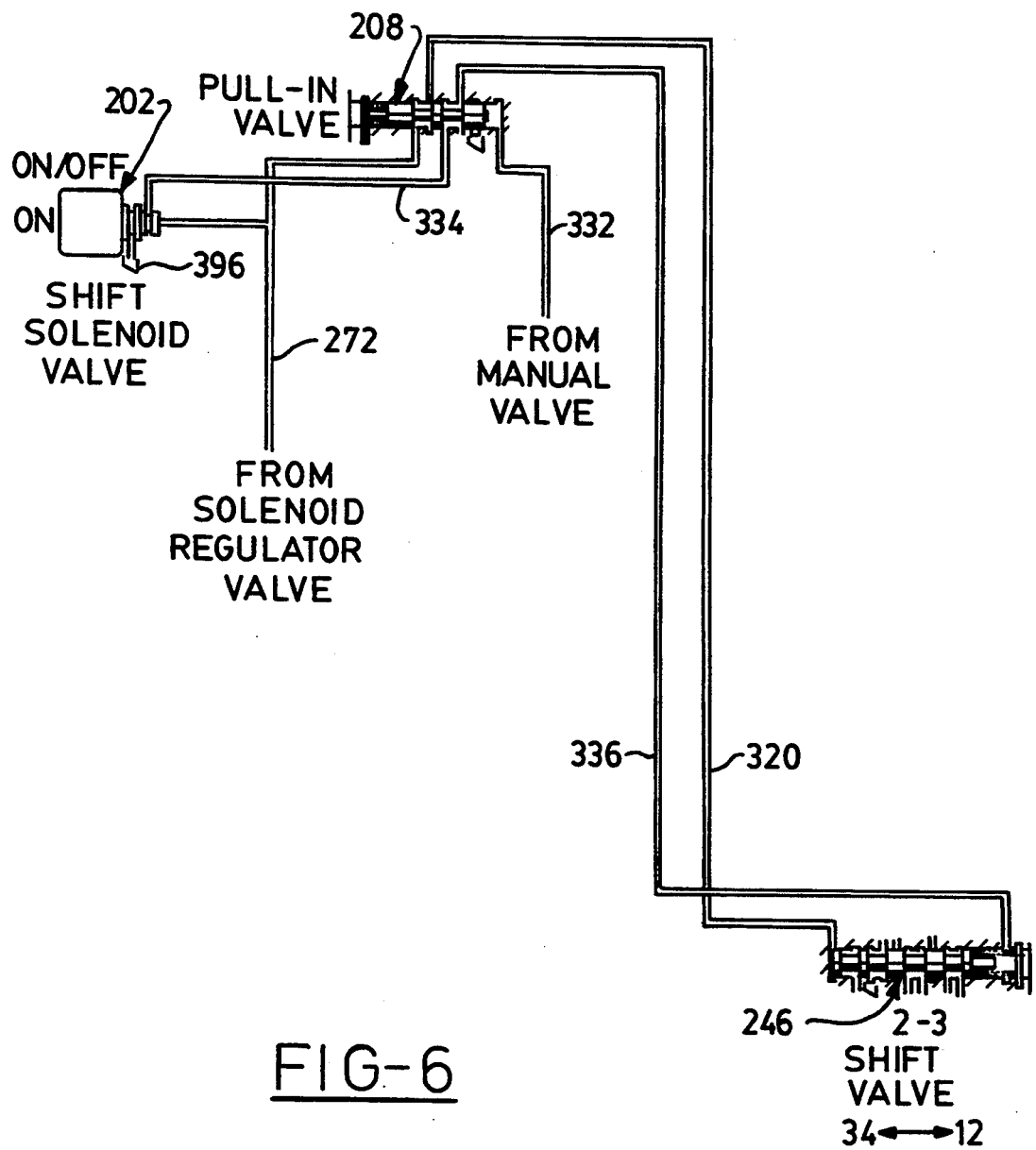
FIG. 6 is a partial valve diagram showing the shift solenoid circuit for low range third gear operation.

As seen in FIG. 6, when the shift solenoid 202 is on during operation in the low range, fluid under pressure in signal passage 334 is transferred through the pull-in valve 208 to the passage 336. This creates a pressure on the 2-3 shift valve that prevents the 2-3 shift valve from moving in a right-hand direction. If the shift solenoid 202 is off in the low range, passage 334 is connected to exhaust port 396 in the solenoid valve 202. The solenoid feed circuit then becomes connected to passage 320, which allows the 2-3 shift valve to be shifted in a right-hand direction, thus allowing first or second gear operation.

Figure 7:
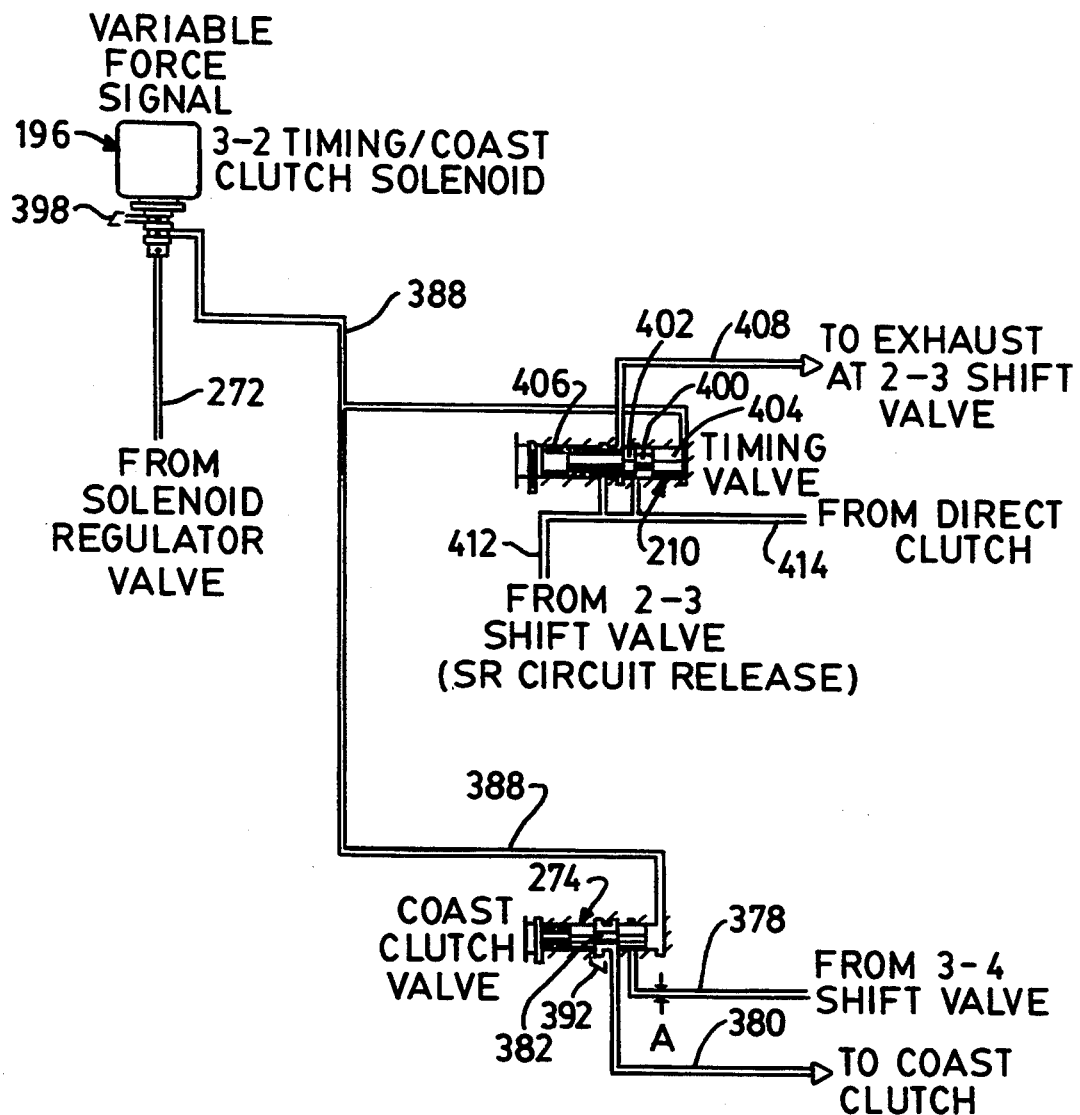
FIG. 7 is a partial valve diagram showing the 3-2 timing and coast clutch solenoid circuit during a 3-2 shifter at low speeds.

FIG. 7 shows the 3-2 timing valve and coast clutch solenoid hydraulic circuit in isolation of the other valve elements. As explained previously, the processor controls the current supplied to the 3-2 timing closed clutch solenoid valve 196. The valve 196 establishes a moderate signal pressure in passage 388. If the current supplied to the variable force solenoid is zero, the pressure in passage 388 will be exhausted through exhaust port 398 in the solenoid valve 196. This allows coast clutch valve 224 to shift in a right-hand direction, thereby connecting the line pressure passage 378 to the coast clutch supply pressure passage 380 through the coast clutch valve. Communication between passage 380 and exhaust port 392 in the coast clutch valve is interrupted. This applies to the coast clutch.

Control pressure in passage 388 will control the operation of the 3-2 timing valve 210. This valve comprises a valve spool 400 which has spaced lands 402 and 404. A valve spring 406 urges the valve spool 400 in a right-hand direction. Passage 408 communicates with the timing valve 210 adjacent the land 402. If the 2-3 shift valve is shifted to the first and second ratio position, passage 308 communicates with exhaust port 410 in the 2-3 shift valve, as shown in FIGS. 3 and 5B. Passage 412, shown in FIG. 7, is a direct clutch pressure passage which communicates directly with direct clutch 88 and with the release side of the 2-4 servo 222.

Passage 370, previously described, extends through the 3-4 shift valve when the 3-4 shift valve is in a left-hand position, through passage 373 and through the servo release valve 228 to the direct clutch passage 414. There are no flow restricting orifices in that exhaust flow path. The timing of the 3-2 shift then is controlled by the calibration of the 3-2 timing valve 210. The 3-2 timing valve provides a slow exhaust of the direct clutch circuit during a 3-2 shift as pressure is released from the direct clutch as well as from the release side of the 2-4 servo through the 2-3 shift valve. The same pressure that exists in passage 388 for effecting the timing of the release of pressure from the direct clutch on the release side of the 2-4 servo is applied to the right side of the coast clutch 224, which strokes the coast clutch valve spool 382 in a left-hand direction. This interrupts communication between passage 378 and passage 380. Further, passage 380 becomes connected to exhaust port 392 and the coast clutch valve 224. Thus, the coast clutch valve will not allow fluid pressure in passage 378 to enter the coast clutch circuit and the coast clutch is released.

Figure 8:
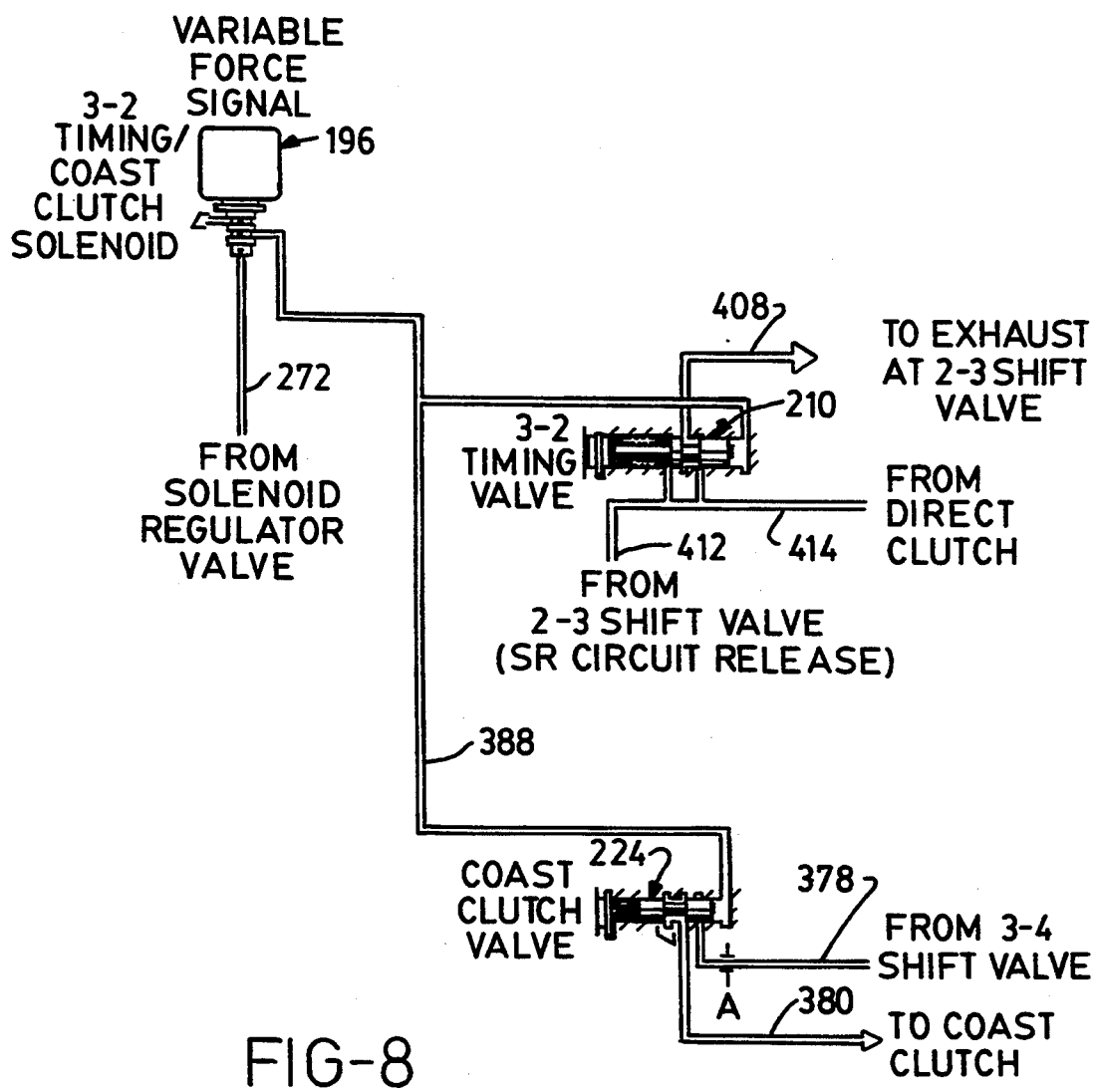
FIG. 8 is a partial valve diagram showing the 3-2 timing and coast clutch solenoid circuit during a 3-2 shift at high vehicle speeds.

FIG. 8 shows the condition of the 3-2 timing and coast clutch solenoid circuit when the pressure in passage 388 is higher as the result of an increased current supplied to the solenoid valve 196. Under these conditions, the flow restriction provided by the 3-2 timing valve 210 is reduced, and a fast exhaust is established from the direct clutch and servo release circuits during a 3-2 shift. Again, the coast clutch 224, as seen in FIG. 8, prevents the coast clutch from becoming applied as communication between passage 378 and 380 is interrupted.

Figure 9A:
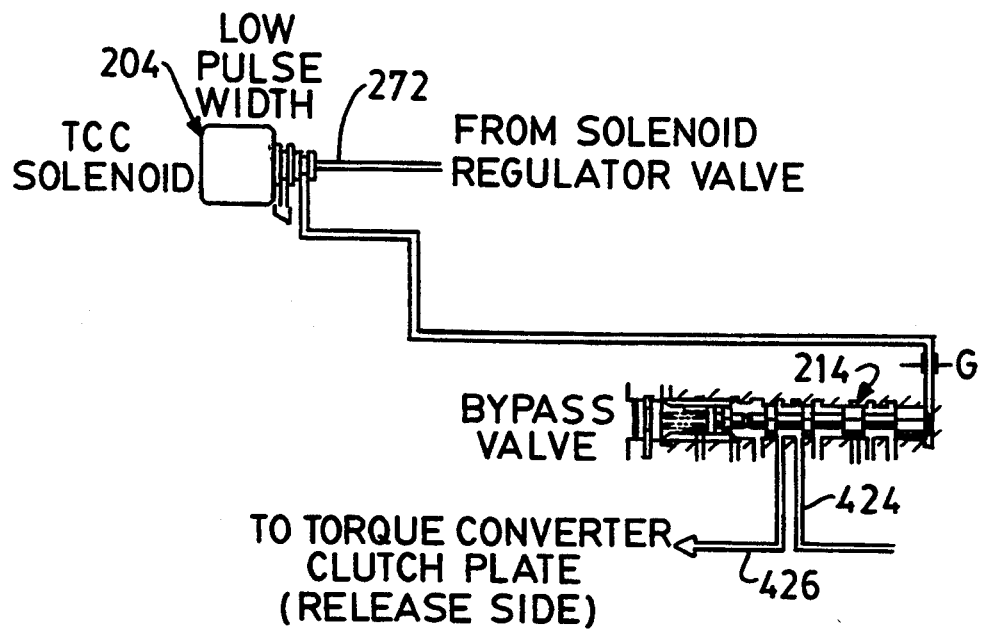
FIGS. 9A and 9B show partial valve diagrams of the torque converter clutch circuit with the clutch released and applied, respectively.
Figure 10:
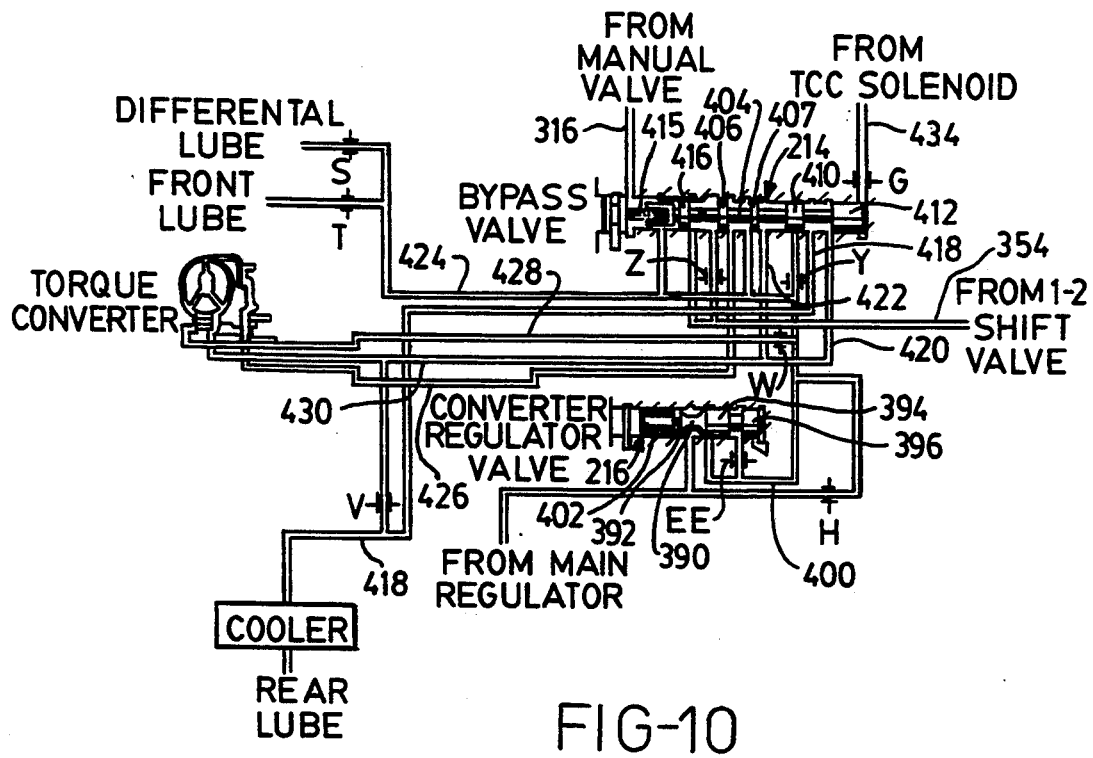
FIG. 10 is a partial valve diagram showing the torque converter lubrication circuit with the torque converter clutch released.

In FIGS. 10 and 9A, torque converter bypass valve 214 is shown in its operative position when the torque converter clutch is released. The torque converter bypass clutch 214 is supplied with regulated pressure from the converter regulator valve 216, which comprises a valve spool 390 with spaced lands 392, 394 and 396. Fluid pressure from the regulated line pressure passage 398 communicates with the valve 216 at a point intermediate the lands 392 and 394, and regulated pressure in passage 400 is distributed to the converter bypass valve 214. Lands 394 and 396 have a differential area that is exposed to the pressure in passage 400 across orifice E. Force produced by that differential pressure is opposed by valve spring 402.

Bypass valve 214 comprises a valve spool 404, which has spaced lands 406, 407, 410 and 412. Converter regulator output pressure in passage 400 communicates with valve 214 adjacent land 410 as the valve spool 404 is shifted in a left-hand direction against the opposing force of valve spring 415 acting on plunger 416. Communication between passage 400 and torque converter return passage 418 is controlled. Simultaneously, communication between passage 418 and torque converter turbine feed passage 420 is controlled by land 412.

Torque converter impeller feed passage 422 communicates with regulated converter pressure in passage 400. Communication between converter impeller feed passage 422 and the lubricant return passage 424 is controlled by land 407. Similarly, land 408 controls the degree of communication between passage 424 and the converter clutch feed passage 426.

When the torque converter clutch is released, the regulated pressure in passage 424 passes to converter bypass clutch feed passage 426, as indicated in FIG. 10. Converter impeller feed passage 428 communicates the regulated converter pressure passage 400 through orifice W. Since passage 424 is pressurized, fluid flows across the friction plates of the torque converter bypass clutch, into the torque converter turbine circuit 430 and then to the torque converter circuit 418, which extends from the rear lubrication circuit as indicated in FIG. 10.

The position of the valve spool 404 determines the fluid pressure in the passage 424, which enters the bypass clutch feed passage 426. Signal passage 434 extends to the bypass clutch solenoid valve 204. It delivers a signal pressure to the bypass clutch valve 214. As the signal developed by the bypass clutch solenoid valve 204, which is a pulse width modulated signal, changes, the pressure in the torque converter bypass clutch 426 will be changed accordingly.

During reverse drive operation, reverse line pressure passage 316 is pressurized. This causes the bypass clutch valve spool 404 to be shifted in a right-hand direction as reverse line pressure acts on the left side of the plunger 414. This results in a high bypass clutch pressure in passage 426, which in turn results in the release of the bypass clutch.

During operation of the transmission in the "D" second manual range and the first manual range, when the transmission is conditioned for first-gear operation, fluid under pressure in passage 354 is delivered to the bypass valve 214 and acts on the left side of the land 406 to urge the spool 404 in a right-hand direction, thereby preventing the application of the torque converter clutch.

Figure 9B:
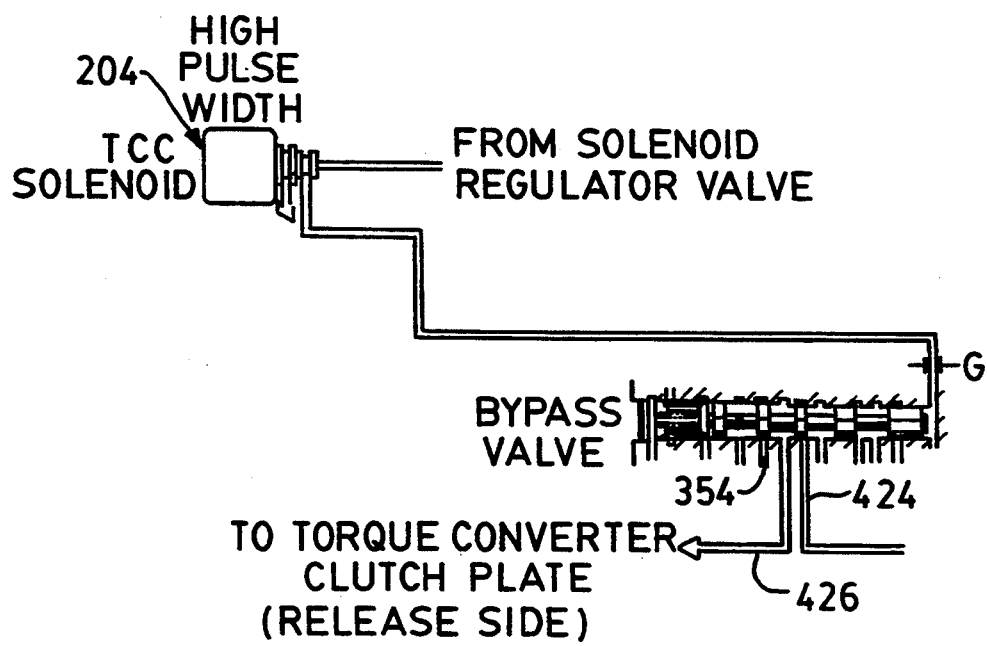

FIG. 9A shows the position of the bypass valve when the torque converter clutch is released. This corresponds to the position shown in FIG. 10. As seen in FIG. 9A, passage 424 is brought into communication with passage 426. On the other hand, when the torque converter clutch is applied as the bypass valve assumes the position shown in FIG. 9B, communication between passages 424 and 426 is restricted and passage 426 is brought into partial communication with passage 354, which is exhausted. Whenever the manual valve is in the drive range position D and 1-2 shift valve 242 is in the upshift position, it is exhausted through port 304 in the 1-2 shift valve 242.

Shift signal pressure in passage 434 is low at low pulse width of the solenoid valve 204, which results in release of the clutch. At high pulse width, the pressure in passage 434 will be higher, resulting in application of the converter clutch. At moderate and varying current available to the bypass clutch solenoid 204, the signal pressure in passage 434 will be variable, which results in a controlled slip of the torque converter clutch. If a signal is lacking in passage 434, the clutch will be released as the valve spool 404 is shifted in a right-hand direction, which ensures that the torque converter clutch will be released.

Figure 11:
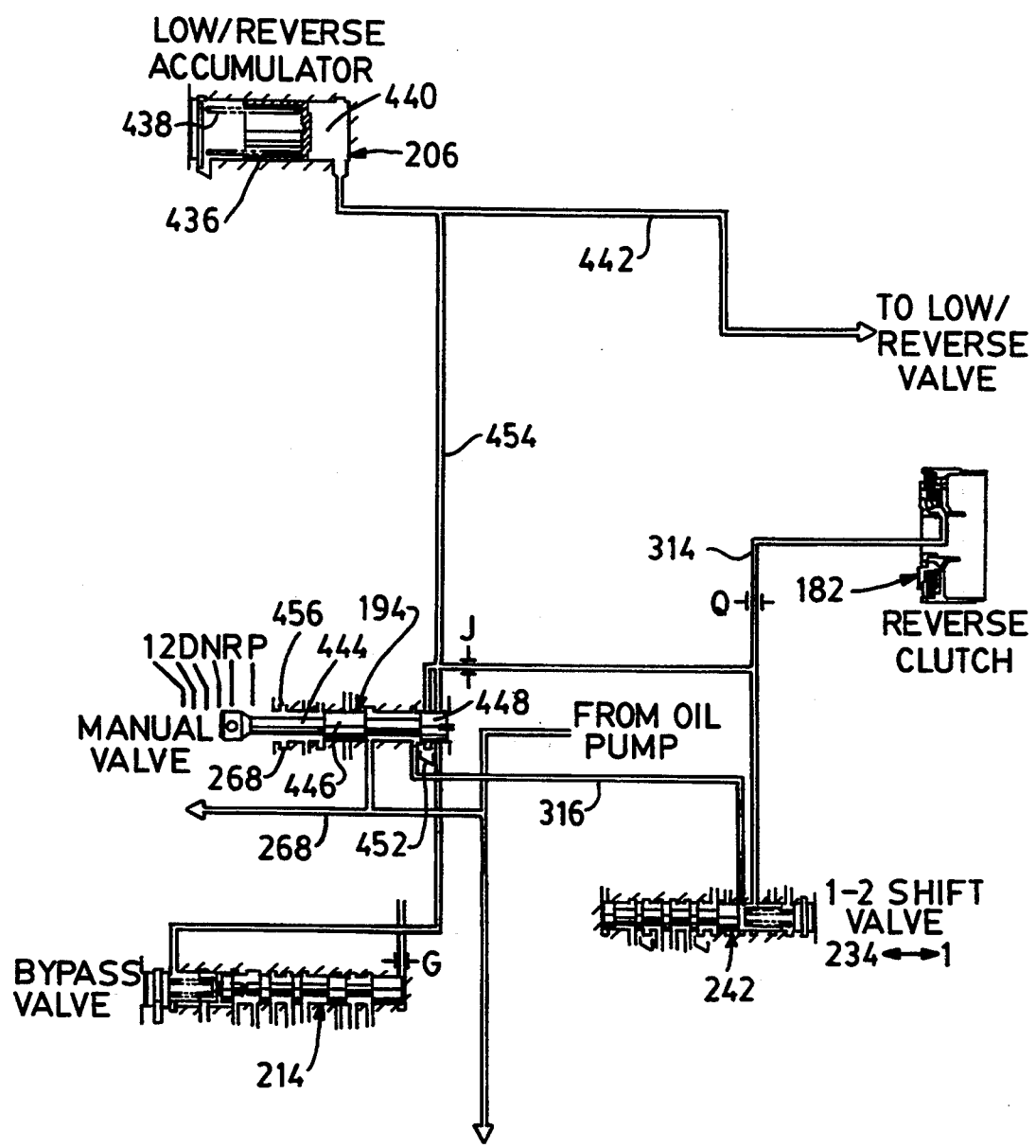
FIG. 11 is a partial valve diagram showing the reverse clutch circuit.

Referring next to FIG. 11, we have shown the reverse clutch circuit during operation in the reverse range. The circuit includes the previously discussed low reverse accumulator 206, which comprises an accumulator piston 436 situated in an accumulator cylinder. Piston 436 is biased by spring 438 against the opposing force of pressure in accumulator pressure chamber 440. Chamber 440 communicates with the low reverse valve 240 through low reverse clutch feed passage 442. The low reverse valve will be described with reference to FIG. 12.

The manual valve comprises a manual valve spool 444 with spaced lands 446 and 448. Regulated line pressure passage 268, which extends from the line pressure modulator valve 218, will be described with reference to FIGS. 13–18. When the manual valve spool 444 is shifted to the reverse drive position shown in FIG. 11, the lands 446 and 448 establish communication between passage 268 and reverse pressure passage 316, which extends to the 1-2 shift valve. The 1-2 shift valve 242 establishes communication between passage 316 and reverse clutch feed passage 314, as indicated in FIG. 11.

Passage 450 communicates also with passage 316 described previously with reference to FIG. 10, thereby shifting the bypass valve to the right and preventing the bypass valve from applying the torque converter clutch.

When the manual valve spool 444 is shifted to any position other than reverse drive position, the manual valve will provide an exhaust flow path for the reverse circuit. An exhaust port is shown at 452 directly adjacent land 448.

Passage 314, which feeds the reverse clutch 182, acts as a feed passage for the low and reverse clutch accumulator feed passage 454. Communication between passage 314 and passage 454 occurs through flow restriction orifice J, as seen in FIG. 11.

The manual valve has a split port design so that when the land 448 is positioned as shown in FIG. 11, pressurized passage 316 in reverse drive will not feed pressure across the land 448 directly to passage 454. Instead, the passage 454 must be pressurized with fluid that passes through the orifice J. Thus, the reverse clutch 182 will be applied by the pressure in passage 314 before the low and reverse clutch 152 is applied by the pressure in passage 442.

Figure 19:
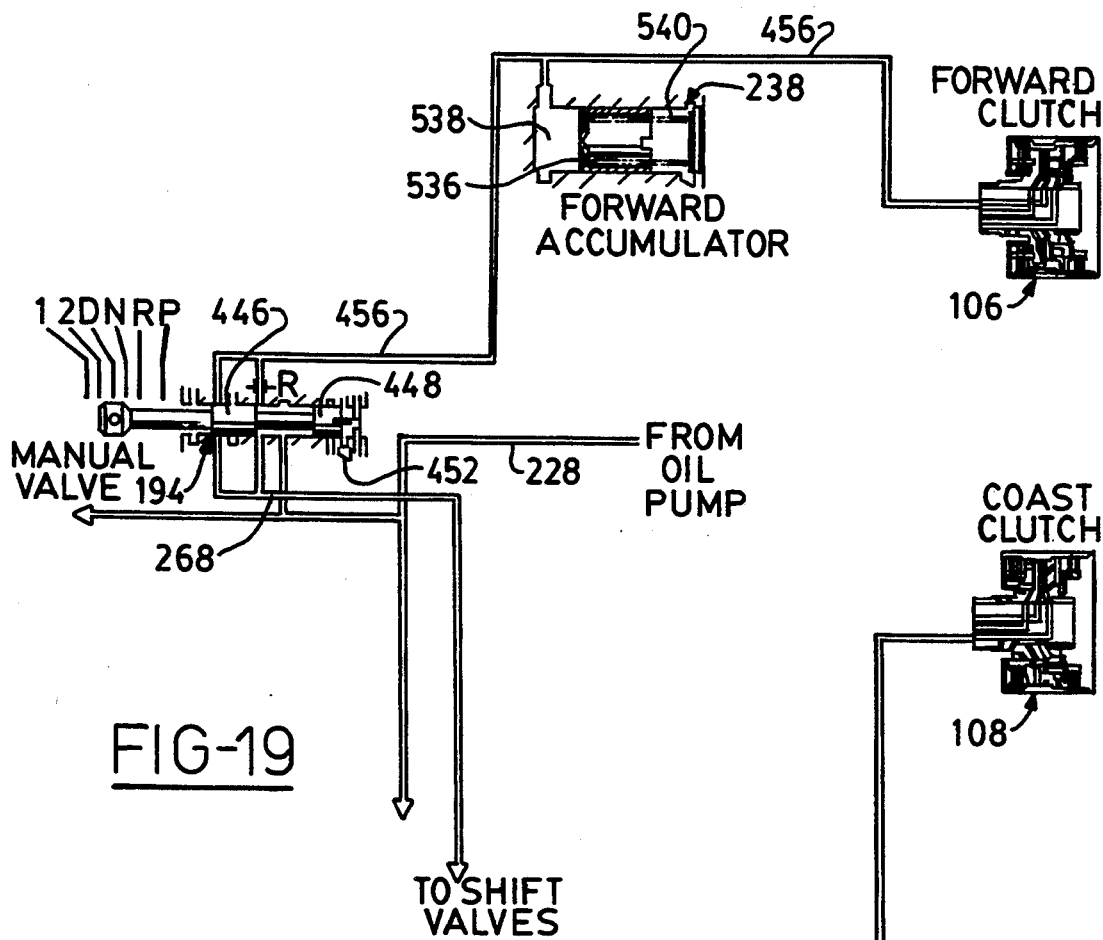
FIG. 19 is a partial valve diagram showing the forward clutch circuits when the manual valve is in the drive range, the second manual range position or the first manual range position.

The manual valve also has a split port that connects line pressure passage 268 to the forward clutch feed passage 456. As will be described with reference to FIG. 19, the forward clutch feed passage 456 may be exhausted through the manual valve when the manual valve is moved to the reverse position without passing through a flow control orifice. Line pressure in passage 268, however, is not distributed across the split port arrangement of the manual valve to the passage 456. Rather, the pressure is distributed from passage 268 through flow restricting orifice R, which is shown in FIG. 19 but not in FIG. 11. This again is consistent with the concept of providing a flow control orifice during engagement of the various friction elements while providing a direct connection with exhaust from the friction elements when the friction element is disengaged.

Figure 12:
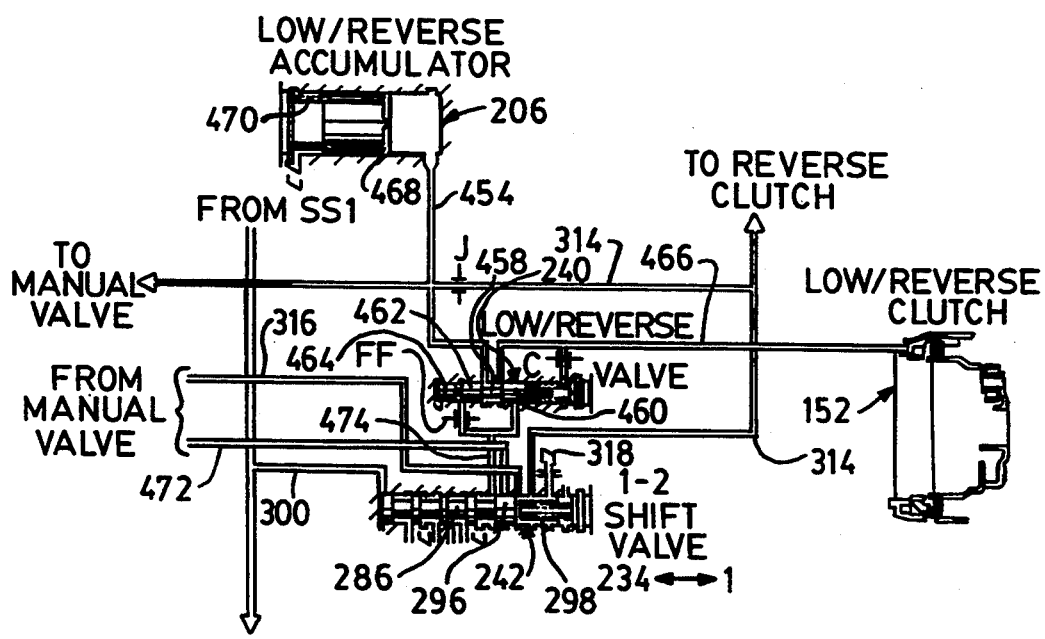
FIG. 12 is a partial valve diagram showing the low and reverse clutch circuits when the transmission is conditioned for reverse operation.

As seen in FIG. 12, the low reverse valve 240 includes a valve spool 458, which is formed with three spaced lands, the first two lands 460 and 462 having a common diameter. Land 464 has a diameter less than the diameter of land 462. When the spool 458 is positioned as shown, the low reverse clutch feed passage 466 communicates directly with the passage 454 through the space provided by lands 462 and 460.

When the manual valve is shifted to the reverse position, as explained previously, passage 314 becomes pressurized. This causes a pressure build-up in passage 454, which is controlled by the orifice J as the pressure build-up continues. The pressure in passage 466 will stroke the spool 458 in a left-hand direction, as viewed in FIG. 12. The pressure build-up causes the low reverse accumulator piston 468 to stroke against the spring force of accumulator spring 470. After a pressure build-up in passage 466, and after that pressure strokes the low reverse clutch piston, continued pressure build-up is controlled by the accumulator 206.

If the microprocessor detects that a shift into reverse range is occurring above a specified vehicle speed, a signal will be distributed to shift signal passage 300 by the shift solenoid 200. The 1-2 shift valve then will be stroked in a right-hand direction. This will block pressure distribution from the reverse line pressure passage 316 as land 296 on the 1-2 shift valve moves in a right-hand direction. Simultaneously, land 298 on the 1-2 shift valve will provide communication between reverse clutch feed passage 314 and the previously described shift valve exhaust port 318.

Reverse clutch feed passage 316, as explained previously, is exhausted through the manual valve when the manual valve is moved to a position other than the reverse drive position.

When the manual valve is moved to the low range position, fluid is delivered from the manual valve to passage 472. Passage 472 extends to passage 332 which distributes pressure to the right-hand end of the pull-in valve 208, as described with reference to FIG. 3, which conditions the pull-in valve for possible second or third gear operation. Line pressure is distributed also through the 1-2 shift valve 242 into the passage 474, which extends to the differential area of lands 462 and 464 of the low reverse valve 240. As pressure builds up in passage 474, land 460 and low and reverse valve 240 provide controlled communication between passage 474 and low and reverse feed passage 466. The valve 240 thus modulates the pressure in the low and reverse clutch 152 during first-gear operation in low range.

If the microprocessor detects that a shift into low range is occurring above a specified vehicle speed, it will respond by turning off the pressure signal in passage 300. When this occurs, passage 472 will be blocked by land 296.

When the manual valve is moved to the low range position, it provides an exhaust flow path for feed passage 472.

Figure 13:
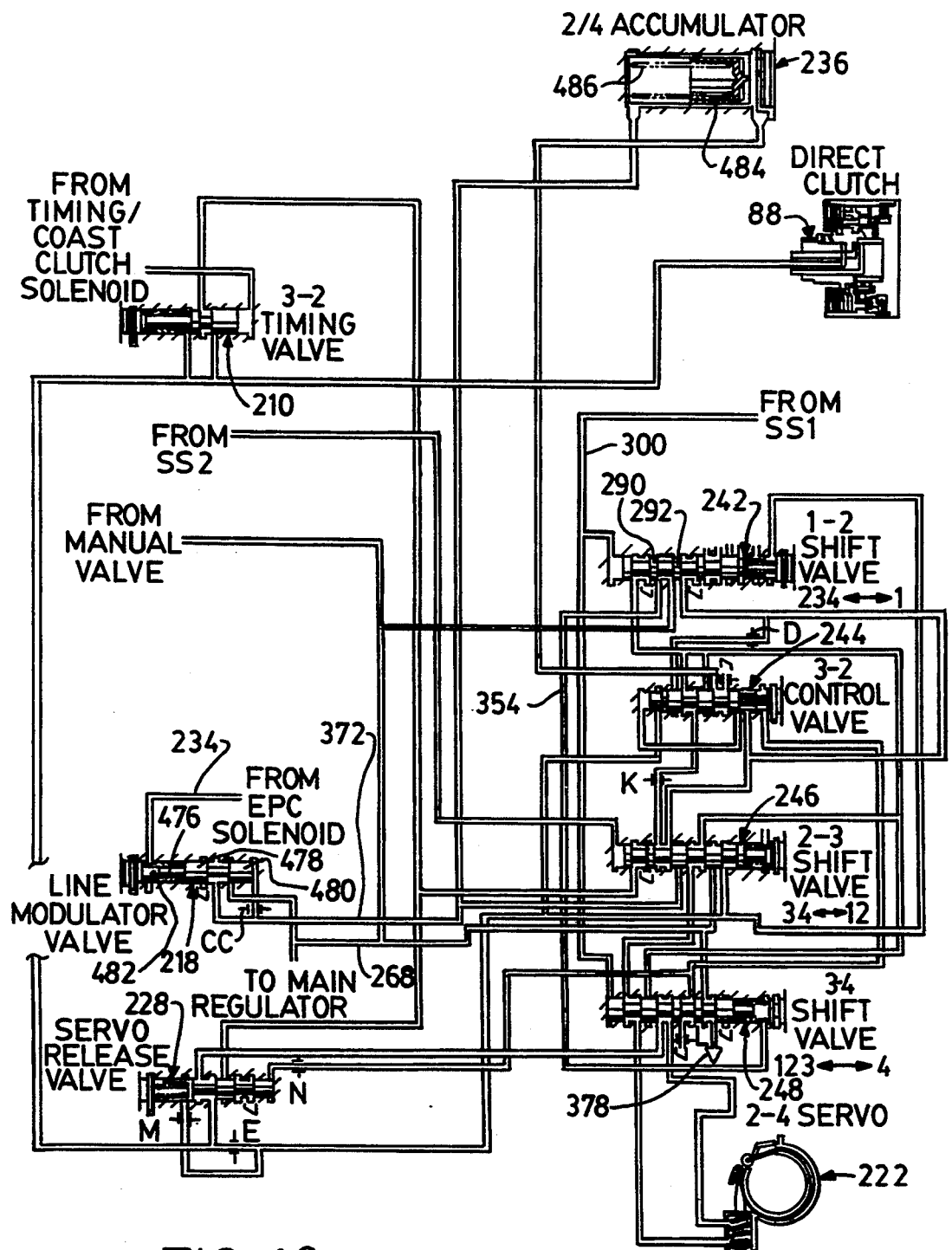
FIG. 13 is a partial valve diagram showing the 2-4 servo and direct clutch circuits during operation in the drive range or in the second manual range when the gearing is in the first gear ratio.

FIGS. 13–18 show the circuits for the 2-4 servo and the direct clutch. They illustrate the positions of the various valve elements that affect the 2-4 servo and direct clutch during ratio changes. Referring first to FIG. 13, the line pressure modulator valve 218 is shown in its pressure modulating position. It includes a modulator valve spool 476 with spaced lands 478 and 480. It is biased in a right-hand direction by valve spring 482. Throttle valve pressure in passage 234, which is developed by the variable force solenoid valve 198, acts on the valve land 478, thus providing a force that assists the valve spring. Line pressure in passage 268, which is pressurized whenever the manual valve is in the "D" position, the "2" position or the low position, is modulated by the valve 218. The output pressure of valve 281 is a modulated line pressure in passage 372, which, as explained earlier, is distributed to the 2-3 shift valve 246. Modulated line pressure in passage 372 is distributed also to the 2-4 accumulator 236 which comprises an accumulator valve piston 484 located in an accumulator cylinder. Accumulator spring 486 urges a piston 484 in a right-hand direction. Modulated line pressure in passage 372 acts on the piston 484 to assist the spring 486.

When the manual valve is in the "D" position, the "2" position and the low position, the 2-4 band is applied during second and fourth gear operation. The direct clutch is applied in third and fourth gear operation.

As seen in FIG. 13, the 1-2 shift valve is shifted to the right during first gear operation as signal pressure from the shift solenoid 200 is distributed through passage 300 to the left side of the 1-2 shift valve spool. Line pressure in passage 268 passes through the 1-2 shift valve between lands 290 and 292. Thus, line pressure is distributed through passage 354 to the right side of 3-4 shift valve 248. This locks the 3-4 shift valve in a left-hand direction, permitting line pressure to pass from passage 268 to passage 378, which leads to the coast clutch valve 224.

Shift signal pressure from the shift solenoid 202 extends to the 2-3 shift valve though passage 320 and holds the 2-3 shift valve spool in a right-hand direction, as indicated in FIG. 13. This blocks line pressure passage 268 as well as modulated line pressure passage 372.

Both the 1-2 shift valve and the 2-3 shift valve are stroked in a right-hand direction against the opposing force of their respective valve springs. The 3-4 shift valve does not move because line pressure is present in passage 354, which acts on the right-hand end of the 3-4 shift valve 248.

Figure 14:
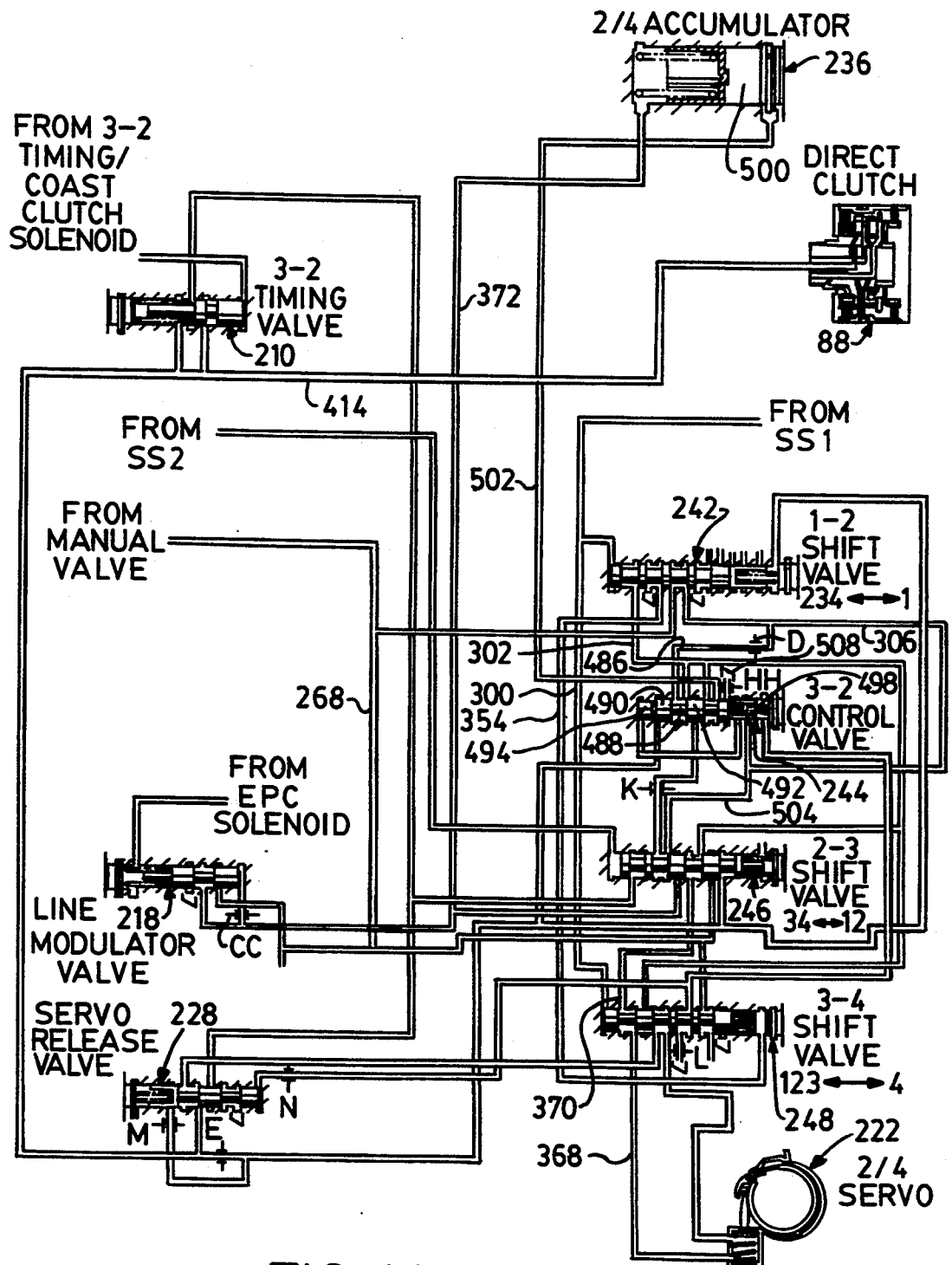
FIG. 14 is a partial valve diagram showing the 2-4 servo and direct clutch circuits when the manual valve is in the drive range or the second manual range after a 1-2 shift.

FIG. 14 shows the condition of the 2-4 servo circuit and direct clutch circuit during second gear operation. In the condition shown in FIG. 14, the shift solenoid 200 is turned off while shift solenoid 202 remains on. This causes the 1-2 shift valve to move in a left-hand direction under the force of the 1-2 shift valve spring since the pressure in passage 300 is zero. Pressurized fluid in the line pressure passage 268 then passes through the 1-2 shift valve to passage 306. Passage 306 communicates with passage 486 through orifice "D" as shown in FIG. 14. Passage 46 communicates with the 3-2 control valve 244. This valve comprises a valve spool 488 having lands 490, 492, 494 and 496. It is biased in a left-hand direction, as viewed in FIG. 14, by a valve spring 498. When the valve 244 is positioned as shown in FIG. 14, lands 490 and 492 establish communication between passage 486 and passage 302. Passage 302 extends through the 2-3 shift valve to passage 370, which communicates with the servo apply passage 368 extending to the 2-4 servo 222.

The accumulator pressure chamber 500 for the 2-4 accumulator 236 communicates with accumulator pressure passage 502. As seen in FIG. 14, the line pressure that is made available to the 1-2 shift valve, the 3-2 control valve, the 2-3 shift valve and the 3-4 shift valve acts on the right side of the accumulator 236. The spring side of the accumulator 236 is pressurized by modulated line pressure. This action assists in matching the 1-2 shift feel with vehicle operating conditions.

Line pressure in passage 306 is distributed to the 3-2 control valve. The 3-2 control valve blocks communication between passage 306 and passage 504. This prepares the 3-2 control valve for a future 3-2 downshift.

Figure 15:
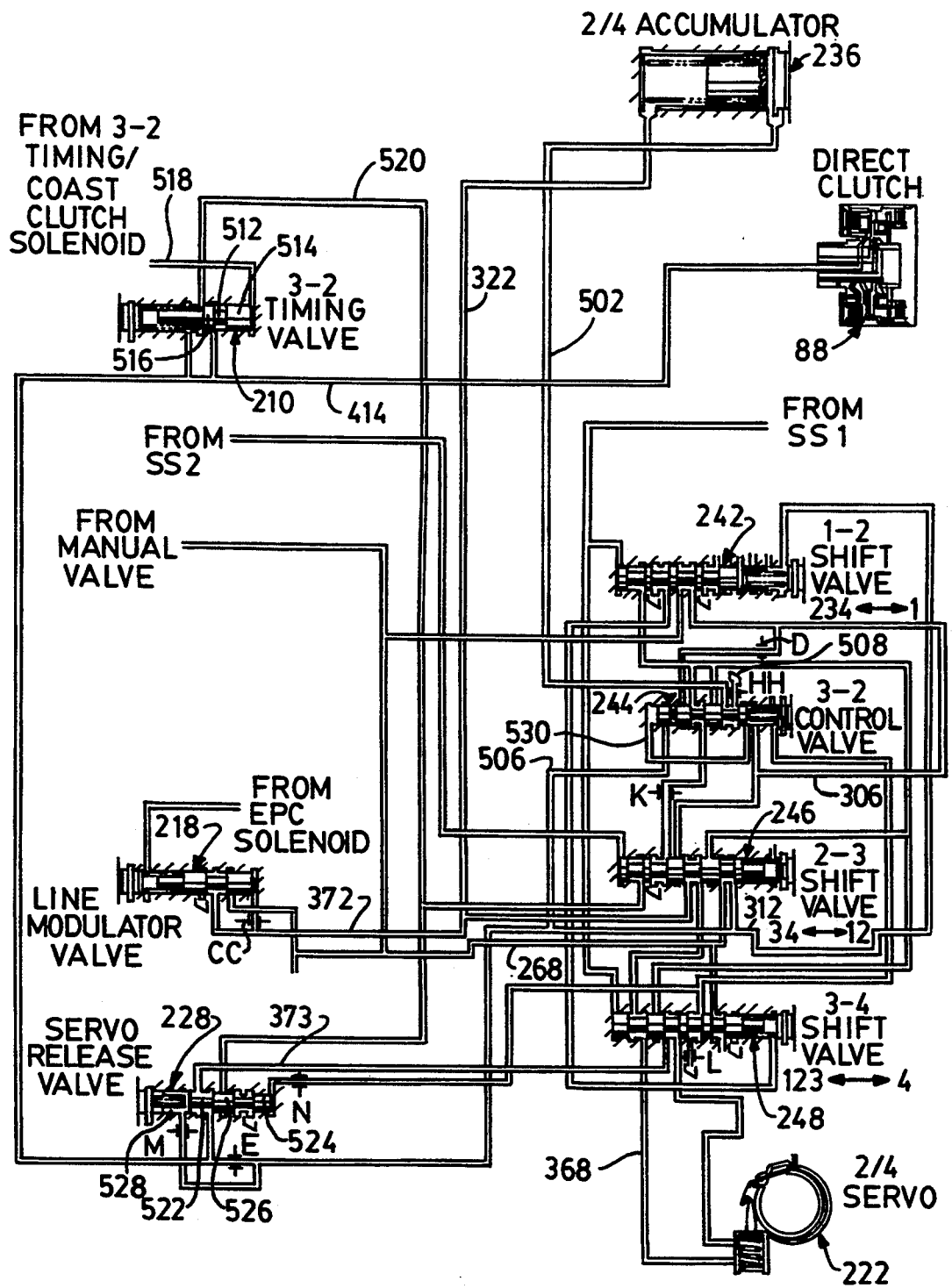
FIG. 15 is a partial valve diagram showing the 2-4 servo and direct clutch circuits with the manual valve in the drive range position or in the second manual range position, third gear operation, after a 2-3 shift.

FIG. 15 shows the positions of the valves of FIGS. 13 and 14 when they are conditioned for third gear operation. As seen in FIG. 15, the microprocessor controls a 3-2 shift by turning off shift solenoid 202 while shift solenoid 200 remains off. The pressure signals that are distributed to the 1-2 shift valve, the 2-3 shift valve and the 3-4 shift valve from the shift solenoids then are zero, and each of the shift valves is shifted in a left-hand direction. Line pressure in passage 268 then passes through the 2-3 shift valve to passage 312. Line pressure then is distributed to the right-hand side of the 1-2 shift valve, thus locking the 1-2 shift valve in a left-hand position. Pressure in passage 312 is distributed to passage 506, thus causing it to move in a right-hand direction. This exhausts the accumulator 236 through the passage 502. The exhaust port for the 3-2 control valve is shown at 508.

Pressurized passage 312 communicates also with direct clutch feed passage 414 through flow control orifice E shown in FIG. 35A and in FIG. 15.

Line pressure in the direct clutch feed passage extends to the 3-2 timing valve 210 as well as to the direct clutch. The 3-2 timing valve comprises a valve spool 512 with spaced lands 514 and 516. The right-hand side of the land 514 is acted upon by a signal pressure from the 3-2 timing coast clutch solenoid valve 196, the signal passage being shown at 518. The 3-2 timing valve spool 512 is shifted in a right-hand direction, which interrupts communication between passage 414 and passage 520 leading to the servo release valve 228.

Servo release valve 228 comprises a valve spool 522 having spaced valve lands 524, 526, 528. It is urged in the right-hand direction by a servo release valve spring. When the valve is positioned as shown in FIG. 15, direct clutch feed passage 414 is brought into communication with passage 372. That passage communicates with servo release pressure passage 370, through the space provided by lands 360 and 362 on the 3-4 shift valve. Thus, the 2-4 servo becomes released. At that time the apply side of the 2-4 servo is subjected to modulated line pressure in passage 368. Modulated line pressure is distributed to the passage 368 through the 3-4 shift valve and through the 2-3 shift valve. A modulated line pressure provides a cushion pressure at the 2-4 accumulator that is regulated by the throttle pressure in passage 234. This modulated line pressure regulated by throttle valve pressure assists in matching the 2-3 shift valve feel with vehicle operating conditions.

When the 3-2 control valve moves during the 2-3 shift, it provides an exhaust path for the accumulator circuit. This action prepares the 2-4 accumulator for the application of the 2-4 band and a shift to second or fourth gear, as indicated in FIG. 15. The 3-2 control valve is shifted in a right-hand direction thereby opening passage 502 to the exhaust port 508.

After the 3-2 control valve has been shifted, the 3-2 control valve spool establishes communication between passage 306 and a passage 530, which extends to the left-hand side of the 3-2 control valve 244 and locks the 3-2 control valve 244 in the right-hand position.

Figure 16:
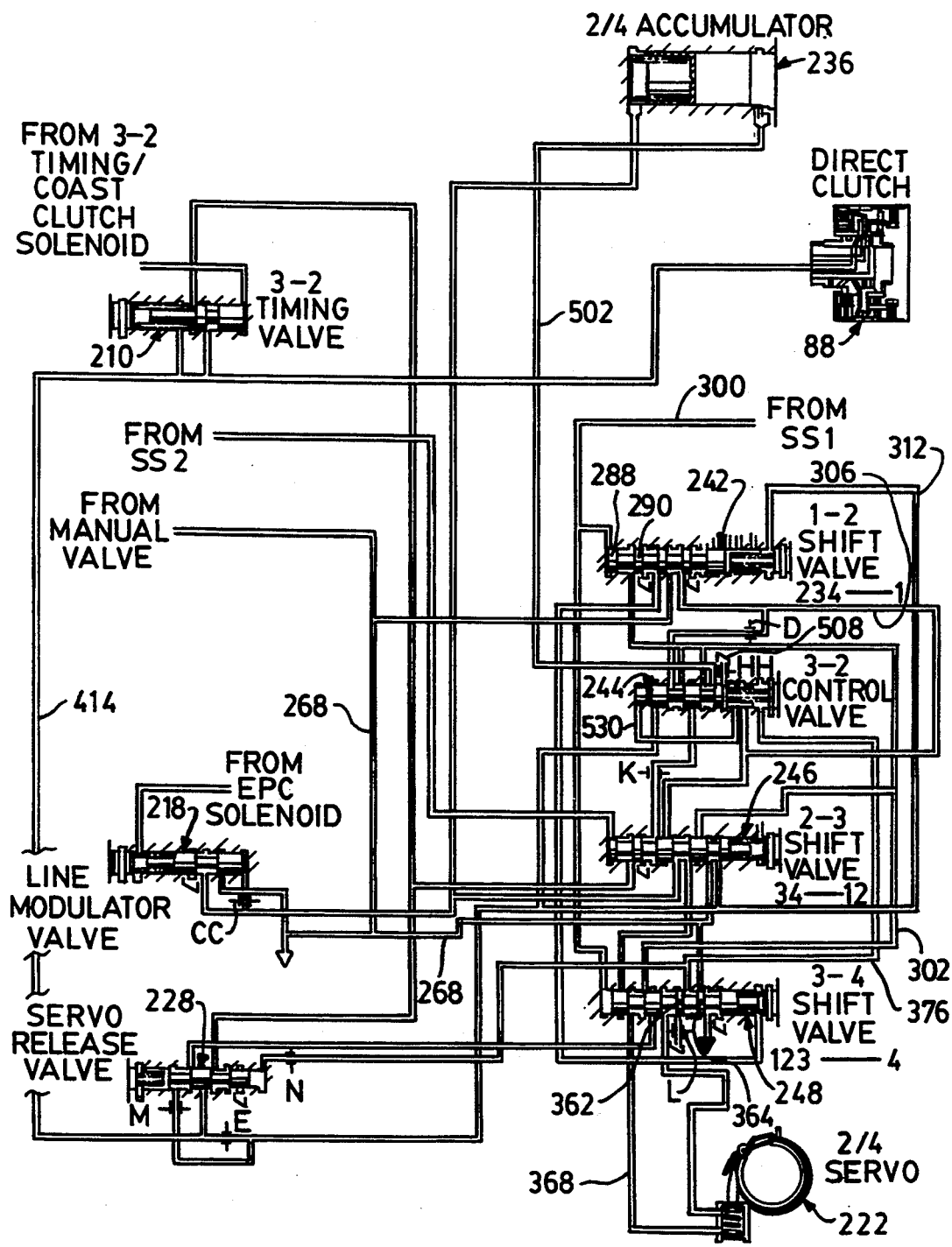
FIG. 16 is a partial valve diagram showing the 2-4 servo and direct clutch circuits with the manual valve in the D or second manual range, fourth gear operation, after a 3-4 shift.

FIG. 16 shows the 2-4 servo and direct clutch circuit, specifically, the valve positions during operation in the D range or 2 range, fourth gear operation following a 3-4 shift. To achieve a 3-4 shift, the microprocessor turns on shift solenoid 200 while shift solenoid 202 remains off. A signal then is established in shift solenoid pressure passage 300 which extends to the left side of the 3-4 shift valve, causing the 3-4 shift valve to move to the right. The 1-2 shift valve also is subjected to the shift signal pressure in passage 300, but it does not shift to the right because line pressure is established in passage 312. As mentioned earlier, passage 312 communicates with the direct clutch and feed passage 414.

The line pressure passage 268 extending from the manual valve distributes pressure to the 3-4 shift valve. Since the 3-4 shift valve is moved to the right, the passage 268 is brought into communication with passage 376. The pressure in passage 376 acts on the right-hand end of the 3-2 control valve, causing it to shift in a left-hand direction in preparation for a downshift. It extends also to the right-hand side of the servo release valve 228 where it acts on land 524 to urge the valve spool 522 in a left-hand direction thus preparing the servo release valve for a downshift.

Since the 3-4 shift valve is shifted in a right-hand direction, lands 362 and 364 establish communication between passage 268 and passage 302. Passage 302 extends to the 3-2 control valve. With the 3-2 control valve stroked in a left-hand direction, it establishes communication between passage 302 and passage 486. The 1-2 shift valve, which is shifted in the left-hand direction, establishes communication between passage 268 and passage 306. This also pressurizes passage 486 since passage 306 communicates with passage 486 through the orifice at D. Fluid then passes through the 3-2 control valve 244 from passage 486 to passage 302. This causes line pressure to be distributed to the 1-2 shift valve between lands 288 and 290. Pressure in passage 302 passes through the 3-2 control valve to the accumulator passage 502 and to the apply side of the 2-4 accumulator. Line pressure passes also from passage 306 to the 2-3 shift valve and through the 3-4 shift valve 248. During application of the 2-4 servo, the modulated line pressure provides a cushion at the 2-4 accumulator which, as explained previously, is controlled by the throttle valve pressure in passage 234. This action assists in matching the 3-4 shift feel with vehicle operating conditions.

The movement of the servo release valve in a left-hand direction under the influence of line pressure in passage 376 provides a continuous application of the direct clutch while the servo release side of the 2-4 servo is exhausted. The movement of the 3-4 shift valve provides an exhaust flow path for the release side of the 2-4 servo.

Movement of the 3-2 control valve causes the passage 530 at the 3-2 control valve to be exhausted through exhaust port 508.

Figure 17:
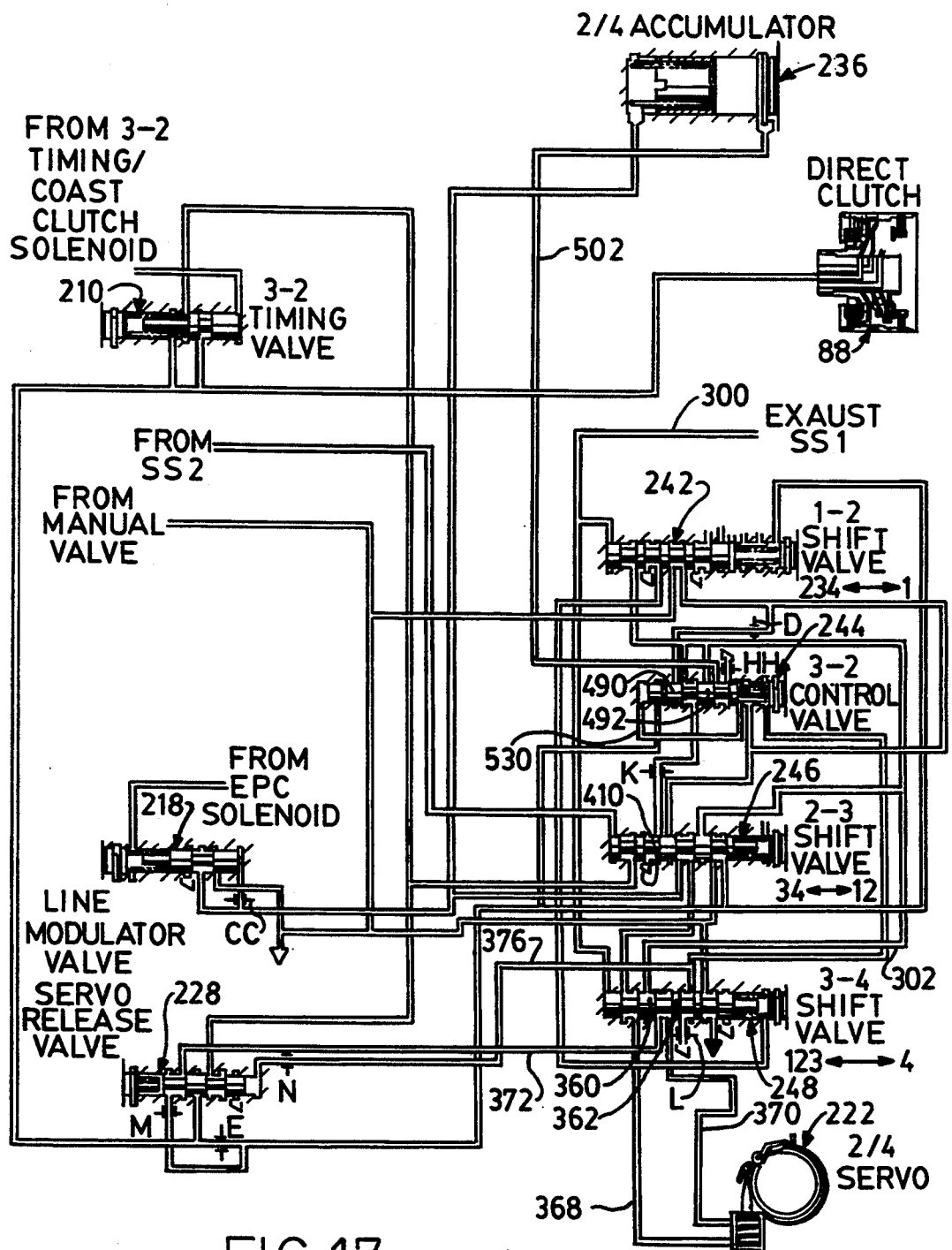
FIG. 17 is a partial valve diagram showing the 2-4 servo and direct clutch circuits when the manual valve is in the D position or in the second manual range position during a 4-3 shift.

FIG. 17 shows the 2-4 servo and direct clutch circuits during a 4-3 downshift. The microprocessor at this time controls a 4-3 downshift by turning off shift solenoid 200 while shift solenoid 202 remains off. This causes the circuit pressure in passage 300 to become zero, thus allowing the 3-4 shift valve 248 to move in a left-hand direction. Upon movement of the 3-4 shift valve in a left-hand direction, line pressure passage 372 becomes connected to the servo release circuit as passage 370 communicates with passage 372 through the space between lands 360 and 362 on the 3-4 shift valve spool. This causes the release of the 2-4 servo. Similarly, passage 370 becomes connected to servo apply feed passage 368 through the 3-4 shift valve, specifically, through the 3-4 shift valve lands 360 and 358. This provides a cushion during the 2-4 servo release as the 2-4 servo piston is stroked to its release position.

As the 3-4 shift valve is shifted in a left-hand direction, passage 376 is connected to exhaust port 534 in the 3-4 shift valve.

Passage 520 remains pressurized with line pressure. Thus, the servo release valve remains in its left-hand position as indicated in FIG. 17 because of the differential area of lands 524 and 526.

Passage 376 is exhausted through port 374 of the 3-4 shift valve as explained. Thus, the 3-2 control valve moves in a right-hand direction since it is no longer biased in a left-hand direction by pressure acting on its right side. Thus, the accumulator passage 502 now becomes connected to exhaust port 508 in the 3-2 control valve. After the 3-2 control valve moves, pressure in passage 306 is admitted into passage 530, thus latching the 3-2 control valve in a right-hand direction.

Passage 302 communicates at this time with exhaust port 410 in the 2-3 shift valve through passage 536 and orifice K and through the space provided by lands 490 and 492 on the 3-2 control valve 244.

Figure 18:
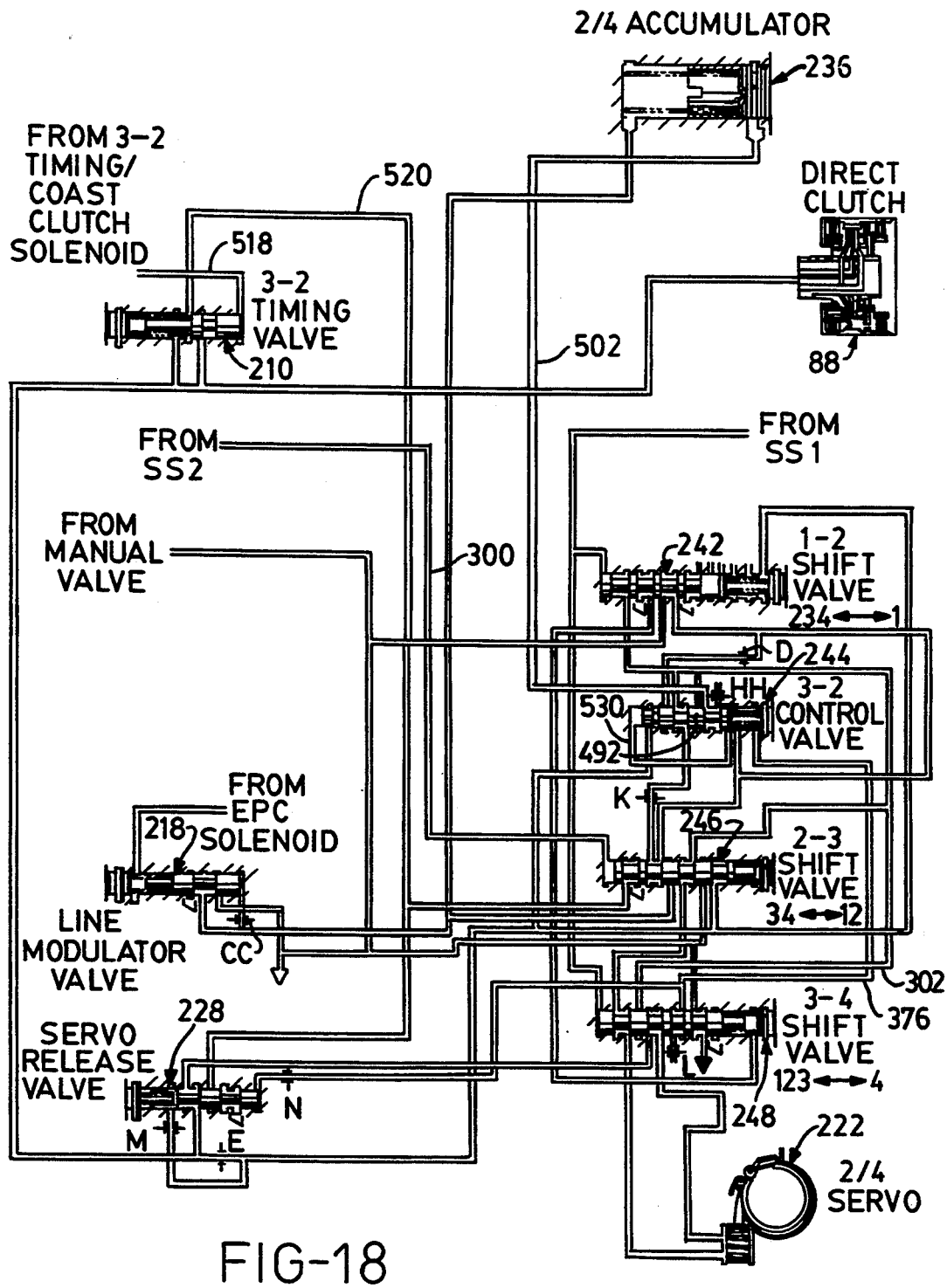
FIG. 18 is a partial valve diagram showing the 2-4 servo and direct clutch circuits when the manual valve is in the drive range position or the second manual range position during a 3-2 shift.

FIG. 18 shows the 2-4 servo and direct clutch circuits in the valve positions during a 3-2 shift. To achieve a 3-2 downshift, the microprocessor turns on shift solenoid 202 while shift solenoid 200 remains off. This causes a signal pressure in passage 300, which is distributed to the left side of the 2-3 shift valve 246, causing the shift valve to move in the right-hand direction as shown in FIG. 18. Movement of the 2-3 shift valve causes the passage 408 to be connected to the direct clutch feed passage 414, which is connected to passage 372 through the 3-4 shift valve to the servo release passage 370.

The position of the 3-2 timing valve is controlled by the microprocessor. The 3-2 timing valve is urged in a left-hand direction by the signal pressure in passage 518, which is developed by 3-2 control coast clutch solenoid 196. This allows a variable fluid flow through the passage 520 to the exhaust port 410 in the 2-3 shift valve, the latter being stroked in a right-hand direction, as explained previously. As this flow path is established, the servo apply and the direct clutch release are synchronized.

As seen in FIG. 18, the passage 530 is pressurized, causing the 3-2 control valve to be kept in a right-hand direction. This allows the 2-4 servo to become applied without a connection to the 2-4 accumulator because the land 492 on the 3-2 control valve 244 blocks communication between passage 302 and passage 502 leading to the accumulator 236.

FIG. 19 shows the portion of the hydraulic circuit that controls the application and release of the forward clutch 106. The forward clutch is applied when the manual valve is in the D position, the 2 position or the low position during operation in the first, second, third and fourth gear. Although the forward clutch is applied in fourth gear, it does not transmit torque.

Line pressure is distributed from the pump through passage 228 to the space between manual valve lines 446 and 448. Pressure is distributed through the manual valve 194 to the forward clutch feed passage 456 and to the line pressure passage 268, which extends to the shift valve as explained previously. It also extends to the main regulator valve 226 and the line pressure modulator valve 218, as seen in FIG. 35A.

The forward clutch accumulator 238 comprises an accumulator piston 536 located in an accumulator cylinder, which defines an accumulator pressure chamber 538. An accumulator spring 540 urges the piston 536 in a left-hand direction. As pressure builds up in the feed passage 456, the accumulator piston is stroked, thereby providing a gradual pressure buildup in the forward clutch and achieving a smooth clutch engagement on start-up. When the manual valve is moved to the neutral position, the park position or the reverse position, the manual valve 194 provides an exhaust flow path for the forward clutch and the forward accumulator.

Figure 20:
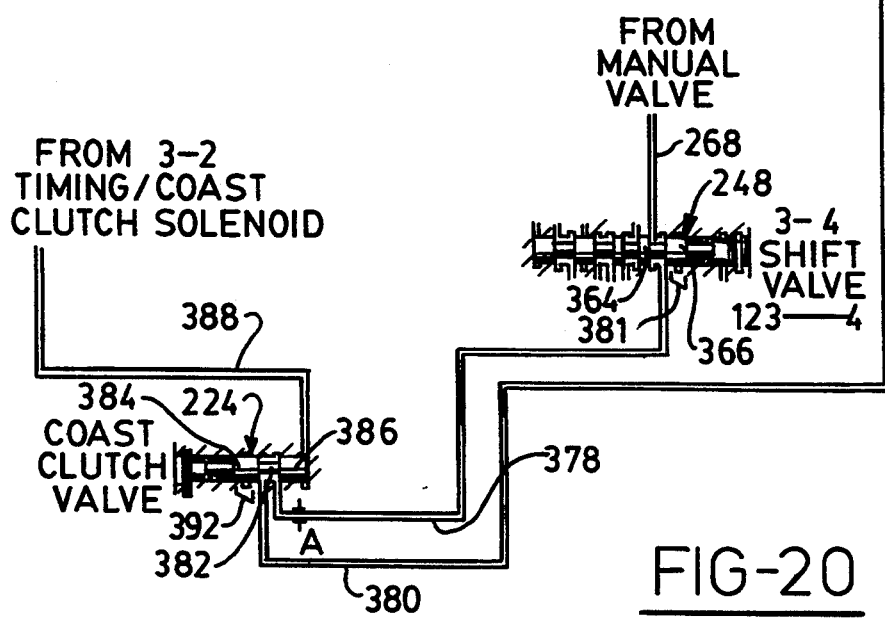
FIG. 20 is a partial valve diagram showing the coast clutch circuits.

FIG. 20 shows the coast clutch hydraulic circuit; specifically, the valve elements that have control of the application and release of the coast clutch. The coast clutch is applied during operation in the D range, second and third gear operation. It is applied also in second and third gear operation and in low range, first, second and third gear operation. This provides for coast braking during operation in those gears. Fourth gear operation always has coast braking without the need for applying the coast clutch.

The 3-2 control/coast clutch solenoid 196 controls the application of the coast clutch by changing the current to establish and disestablish a signal pressure in passage 388. When the current is zero, the pressure in passage 388 is too low to move the coast clutch, thus causing the coast clutch to become applied as passage 378 is connected to passage 380 through the space between lands 384 and 386. When the current is moderate to high, the pressure in passage 388 is high enough to move the coast clutch causing the coast clutch to release as passage 380 becomes connected to exhaust port 392.

When the clutch is applied, pressure is distributed to the manual valve through line 268 to the 3-4 shift valve 248. The shift valve distributes pressure in passage 268 to passage 378 through the space between lands 364 and 366, which is connected to the coast clutch as explained previously. When the coast clutch valve moves to the release position, it blocks passage 378 and provides an exhaust path for the clutch. During fourth gear operation in the D range, movement of the 3-4 shift valve to the right exhausts passage 378 regardless of the position of the coast clutch valve, the exhaust port being shown at 380.

Figure 1B:
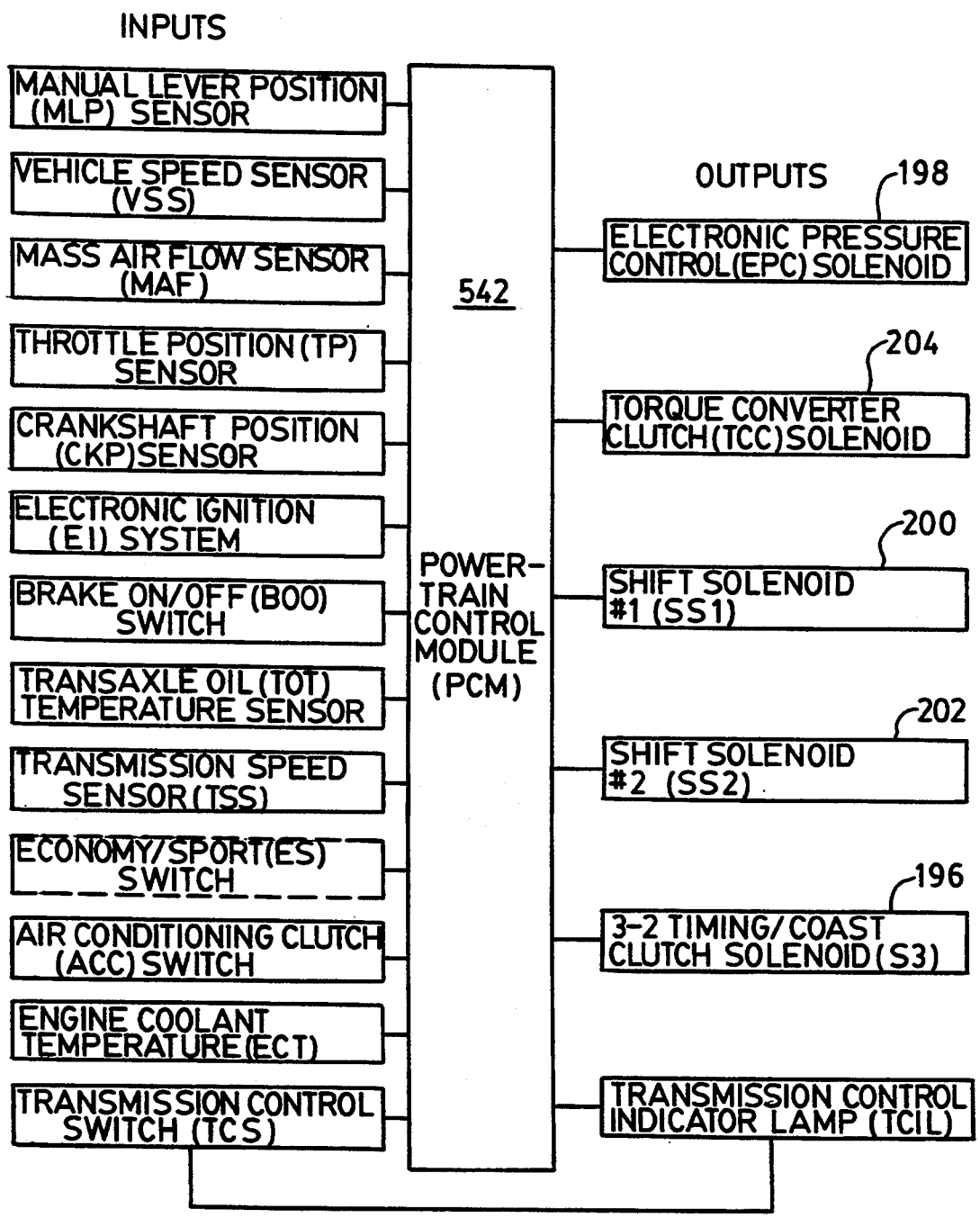
FIG. 1B is a schematic block diagram overview of the controls for the engine, the microprocessor and the electrohydraulic controls, as well as the transmission itself.

Shown in FIG. 1B is a schematic diagram of the input signals and the output signals for the microprocessor powertrain control module 542. The microprocessor receives input signals representing the position of the manual valve, the vehicle speed, the engine intake mass air flow, the engine throttle position, ignition signals comprising a crank shaft position sensor output and an ignition timing signal, a signal indicating whether the brake is on or off, a transmission oil temperature signal, a transmission turbine speed signal, an engine coolant signal and an air conditioning clutch on-off signal. The outputs of the microprocessor 542 comprise an electronic pressure control signal for the solenoid valve 198, a torque converter clutch solenoid signal for the solenoid valve 204, a signal for shift solenoid 200, a signal for shift solenoid 202 and a signal for the 3-2 control/coast clutch solenoid valve 196.

The powertrain control module 542 controls the various engine functions as well as the control of the transmission solenoid valves. This establishes control of line pressure, shift scheduling, application and release of the torque converter clutch, and engine braking during coasting.

The Microprocessor

The microprocessor 542, as shown in FIG. 1B, is a typical commercial microprocessor for controlling automotive vehicle engine timing, fuel delivery, transmission circuit pressure and transmission speed ratio, among other variables. It includes two main portions; i.e., a register section and a control section. The actual operations that are performed by the microprocessor in response to the input signals mentioned above are accomplished in the register section. The specific operations of the processor are performed during the execution of each of several steps in the program. This is done under the control of signals from an instruction decoder in known fashion.

During each program step, an instruction, usually in the form of a 16-bit word, is decoded using appropriate logic circuits. The processor, during the decoding process, creates electrical control signals that are transferred to the register section. These are involved in the instruction that is being executed.

Data is fetched from memory as the memory registers are sequentially addressed. This data is transferred from memory to a data buffer or temporary storage area in the memory. The data then is transferred to the desired element in the register section for execution during the operation of the program steps.

The register section includes a conventional arithmetic and logic unit. The results of the arithmetic and logic operations are transferred to an accumulator where they are temporarily stored until fetched upon being addressed by the index register. A program counter holds the contents of the information that is fetched and transfers it through an internal address bus to the address buffer register. The address bus can address any of the locations of memory, which may be 16K.

The processor converts the signals from the vehicle speed sensor, an engine throttle position sensor, an engine temperature sensor, a turbine speed sensor and a manual valve selector lever position. It develops electrical signals for the shift solenoid valves as well as for the solenoid valve for the bypass clutch and the solenoid valve, usually a variable force solenoid, for developing a torque sensitive throttle valve pressure described earlier. The signals are operated on in accordance with program control strategy, which will be described subsequently with reference to FIGS. 1C–1K. The electrical signals that are developed during the performance of the program steps are delivered to an output driver circuit, which delivers signals to the hydraulic valve assembly.

Internal busses connect in known fashion the random access memory portion (RAM) and the read only memory portion (ROM) in an interactive manner with the central processor unit. The ROM stores the control logic, and the RAM temporarily stores data sensed by the driveline sensors. For example, the data that is stored in ROM may be a shift time delay value, or shift schedule information, or functions in which two variables such as throttle position and vehicle speed are functionally related, one to the other, in accordance with the shift functions. The data may also be in the form of a table containing three variables or data, such as a timer value and values of two other pieces of data or variables.

The control strategy is divided into several routines or control modules which are executed sequentially in known fashion. During each background pass, the strategy for each module is also executed in sequential fashion.

The data registers are initialized during the operation of a start-up program, which is permanently stored in the computer. All the registers of the processor are set during the initializing step with the correct values, and all information in the memory is cleared before the results of the operation of the programs are loaded into the memory. Each instruction is read from memory in sequence and sent through the data bus into the instruction register for decoding.

The information that results from the inputting of the sensor data, together with information that is stored in memory and learned from a previous background pass, is used to carry out the control functions of the shift solenoid valves, the throttle pressure solenoid valve and the bypass clutch solenoid valve.

The Solenoid Valves

Figure 21:
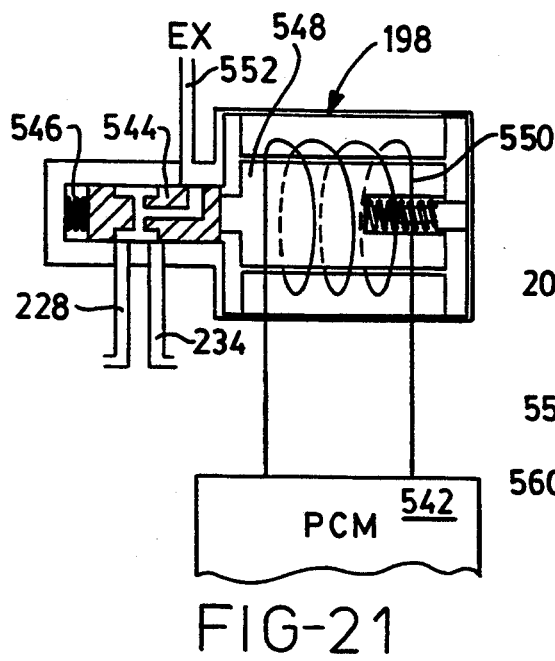
FIG. 21 is a schematic representation of an electronic pressure control solenoid valve used for establishing a so-called TV pressure.

Shown in FIG. 21 is a schematic representation of the electronic pressure control solenoid 198. This is a variable force solenoid which produces a signal in passage 234 by varying the current to the solenoid output pressure when passage 518 is controlled. This in turn varies the pressure in the line pressure circuit. In controlling the solenoid 198, the microprocessor uses information from the manual lever position sensor, the transmission oil sensor, the throttle position sensor, the electronic ignition system sensor and the vehicle speed sensor.

The solenoid valve 198 comprises a movable valve spool 544 located in a valve chamber. It is biased in one direction by valve spring 546. It is biased in the opposite direction by the armature 548 of the variable force solenoid comprising solenoid windings 550 when the windings are energized. When the solenoid current is zero, the valve spool assumes its position shown in FIG. 21 so that line pressure passage 228 becomes connected to throttle valve passage 234.

When the valve spool 544 is positioned as shown, valve lands on the spool 544 connect passages 228 and 234. When the current in the solenoid is high, the valve is shifted in a left-hand direction, thereby connecting exhaust passage 552 to passage 228 and restricting communication between passages 228 and 234. This provides a minimum throttle valve pressure.

Figure 22:
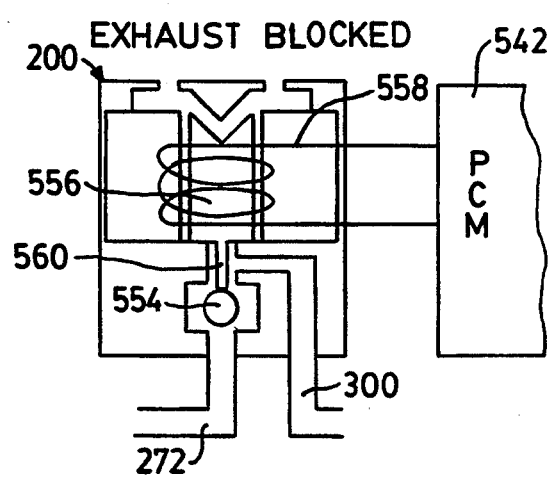
FIG. 22 is a schematic representation of a shift solenoid valve for controlling the operation of shift valves that in turn control the gearing ratio.

The shift solenoids 200 and 202 are similar, one to the other. Therefore, only one of them will be described. FIG. 22 shows shift solenoid 200. It comprises a ball valve 554 located in the solenoid feed pressure passage 272. The solenoid has an armature 556, solenoid windings 558 and a valve actuator stem 562. When the solenoid is energized, the armature and the stem move downwardly, thereby unseating the valve 544 and blocking communication between signal passage 300 and exhaust ports 560. When the solenoid is turned off, the armature moves up and the ball valve 544 seals against its valve seat, thereby interrupting communication between passages 272 and 300 while opening passage 300 to the exhaust ports 560.

Figure 23:
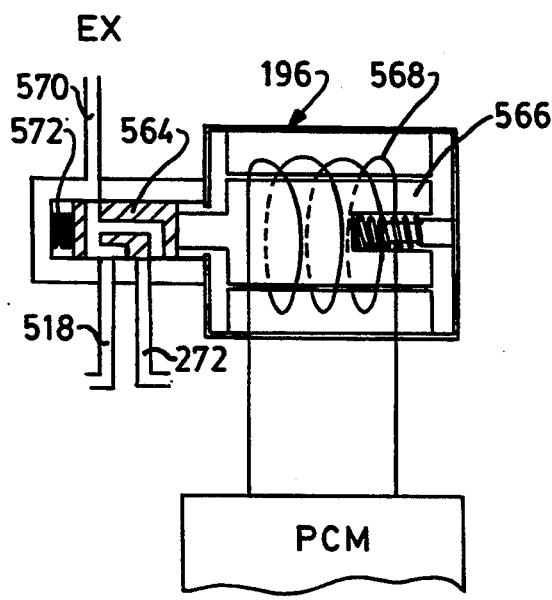
FIG. 23 is a schematic representation of the 3-2 timing coast clutch PWM solenoid valve.

FIG. 23 is a schematic view of the 3-2 control/coast clutch solenoid valve 196. It comprises a valve spool 564 and an armature 566. Solenoid windings 568 surround the armature. When the solenoid windings have zero current, signal passage 518 is connected by the valve spool 564 to the exhaust port 570. The valve spool 564 normally is urged in a right-hand direction by valve spring 572. The servo feed pressure in passage 272 is blocked by a land on the valve spool 564.

When the current in the windings 568 is high, the solenoid force shifts the valve spool 564 in a left-hand direction, thereby increasing communication between passages 518 and 272 while decreasing communication between passage 272 and the exhaust port 570.

Solenoid 196 is a variable force solenoid which develops a variable pressure in passage 518 depending upon the current in windings 568.

Figure 24:
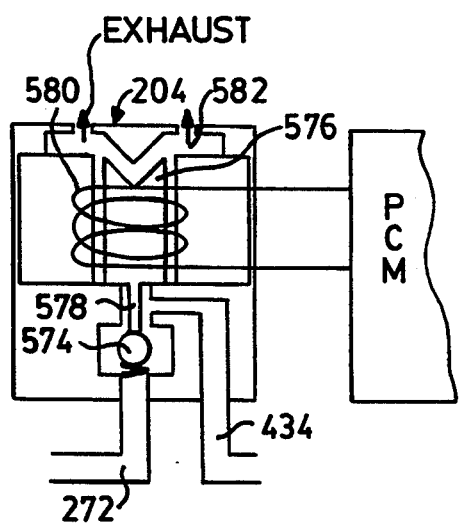
FIG. 24 is a schematic representation of a torque converter clutch solenoid valve.

FIG. 24 is a schematic representation of the torque converter clutch solenoid valve. This is a pulse width modulated solenoid valve. By varying the pulse width of the solenoid circuit, the pressure in signal passage 434 is varied.

The bypass clutch solenoid valve 204 shares the same solenoid feed passage 272 with the other solenoid valves. It includes a ball valve 574 located in the feed passage 272. The armature 576 for the valve 204 has a stem 578 that unseats the valve when the pulse width is high. Solenoid windings 580 are energized with a pulse width signal to establish controlled communication between passages 272 and 434.

When the solenoid valve 204 is off, passage 434 communicates directly with exhaust ports 582 as the ball valve 574 becomes seated.

FIG. 35C shows in more detail the construction of the 2-4 servo. It comprises a cylinder 584 which receives servo piston 586. The piston and the cylinder cooperate to define a servo apply pressure chamber 588 and the servo release pressure chamber 590. A brake band actuator 592 extends through housing portion 594 and is received in central opening 596 in the piston 586. The piston is urged in a left-hand direction by a low rate spring 598 seated on the housing portion 594. A high rate spring 600 seated on spring seat 602 supplements the force of spring 598. Spring seat 602 is fixed to the actuator 592. Initial build-up of pressure in serve apply chamber 588 compresses the spring 598 and takes up slack in the brake band assembly. Continued pressure build-up will cause compression of the spring 600 as the piston 586 moves relative to the spring seat 602.

Summary of the Shift Logic

When the manual valve is moved from park or neutral to the reverse position, the manual valve connects line pressure passage 228 with the reverse passage 316. The split port design on the manual valve, as previously explained, allows the reverse clutch to be applied before application of the low and reverse clutch. This is accomplished by feeding the reverse clutch through the 1-2 shift valve and through passage 314 directly to the reverse clutch without any intervening flow control orifice. The oil flow path to the low and reverse clutch, on the other hand, includes orifice J adjacent the manual valve. Oil flow is controlled by orifice J. It then passes through the low and reverse modulator valve 240 to the low and reverse clutch. At the same time, the low and reverse clutch accumulator 206 becomes pressurized since it is connected directly to the low and reverse clutch through the low and reverse modulator valve 240.

The application of the low and reverse clutch follows application of the reverse clutch also by reason of the calibration of the volume of the low reverse accumulator. This provides shift cushioning during reverse engagement. FIG. 34A is a schematic diagram of the flow path for the actuating pressure for the reverse clutch and the low and reverse clutch. Fluid pressure from passage 228 is distributed directly to the reverse clutch, but it must pass through the orifice J before reaching low and reverse clutch.

FIG. 34B shows the flow path during reverse disengagement. The low and reverse accumulator is exhausted through passage 454 and through the exhaust port in the manual valve. The orifice J is not involved in this flow path. The reverse clutch also is exhausted through the passage 316 and through the exhaust port in the manual valve.

If the reverse position of the manual valve is selected when the vehicle is moving at a high speed, the reverse clutch 182 is exhausted through exhaust port 318 in the 1-2 shift valve as the processor develops a signal in passage 300 that will shift the 1-2 shift valve in a right-hand direction under this condition. Thus both the low and reverse clutch 152 and the reverse accumulator 206 will be exhausted through the orifice J and then through the exhaust port 318 in the 1-2 shift valve. This is seen in FIG. 34C.

Above a calibratable vehicle speed, the reverse engagement is locked out. This is accomplished by routing the reverse and low feed passage and the reverse clutch feed passage through the 1-2 shift valve. The valve is downshifted at this time by the processor as the vehicle speed exceeds the calibratable value, thus exhausting the clutches in the accumulator while blocking the feed passages to these elements.

If the manual valve is moved from the park or neutral position to the D position, the overdrive ratio and the drive ratios are obtained. The split port 604 in the manual valve 194, as seen in FIG. 35A, will permit a transfer of line pressure from passage 222 to passage 268 without pressurizing passage 456. The split port 604 will permit exhausting of the passage 268 through the manual valve and exhausting of passage 456 through the manual valve when the manual valve is in the neutral position, as shown in FIG. 35A. The corresponding split port for the reverse line pressure passage and the low and reverse clutch feed passages 316 and 454, respectively, is shown in FIG. 35A at 606. This port, as explained previously, will permit exhausting of passages 454 and 316 through the exhaust port of the manual valve, but will prevent communication between passage 316 and passage 454 when the manual valve is moved from the neutral position to the reverse position.

When the manual valve is moved to the drive position, line pressure in passage 228 will be transferred to the forward clutch feed passage 456 through the orifice R located next to the manual valve spool. Also passage 268 will be connected to the line pressure passage 228 through the manual valve. Passage 268 is connected to passage 378 through the 3-4 shift valve and through the coast clutch control valve 224 to the coast clutch feed passage 380. Orifice A located next to the coast clutch control valve 224 is in this feed passage so that the rate of fill of the coast clutch is controlled by the orifice.

Figures 33A, 33B:
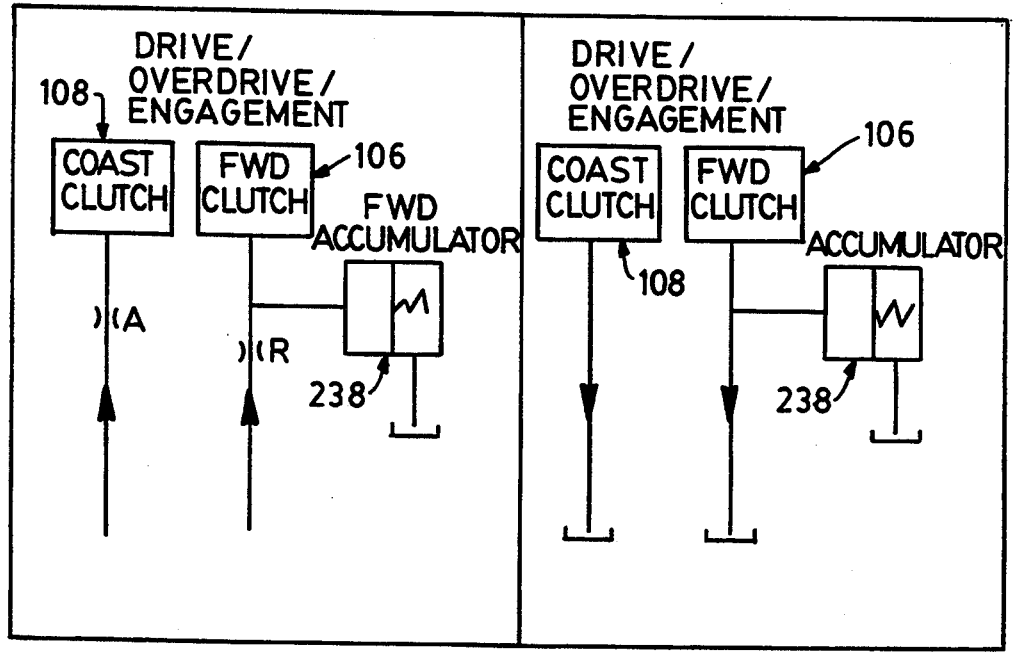
FIGS. 33A and 33B show the shift feel logic for the drive/overdrive engagement and the drive/overdrive disengagement.

Forward clutch engagement is controlled also by the forward clutch accumulator 238 as well as the orifice R, as indicated in FIG. 33A.

When the manual valve is moved from the D position to the neutral position, the coast clutch 108 is exhausted directly through the line 380 and to the exhaust port 392 in the coast clutch valve 224 since a signal is present in the signal passage 518. Under these conditions, the forward clutch is exhausted directly through the split exhaust port 604 in the manual valve without passing through orifice R.

The control system includes an overdrive cancel switch which can be selected by the operator. If the overdrive cancel switch is activated, the microprocessor will respond by causing the 3-2 coast clutch control solenoid valve 196 to eliminate the pressure signal in passage 518, allowing the coast clutch valve 224 to shift to the right. This connects the coast clutch to the passage 378 through the passage 380, which cushions the clutch application. The application of the coast clutch thus is delayed to ensure that the forward clutch is applied before the coast clutch is applied.

Figures 32A, 32B:
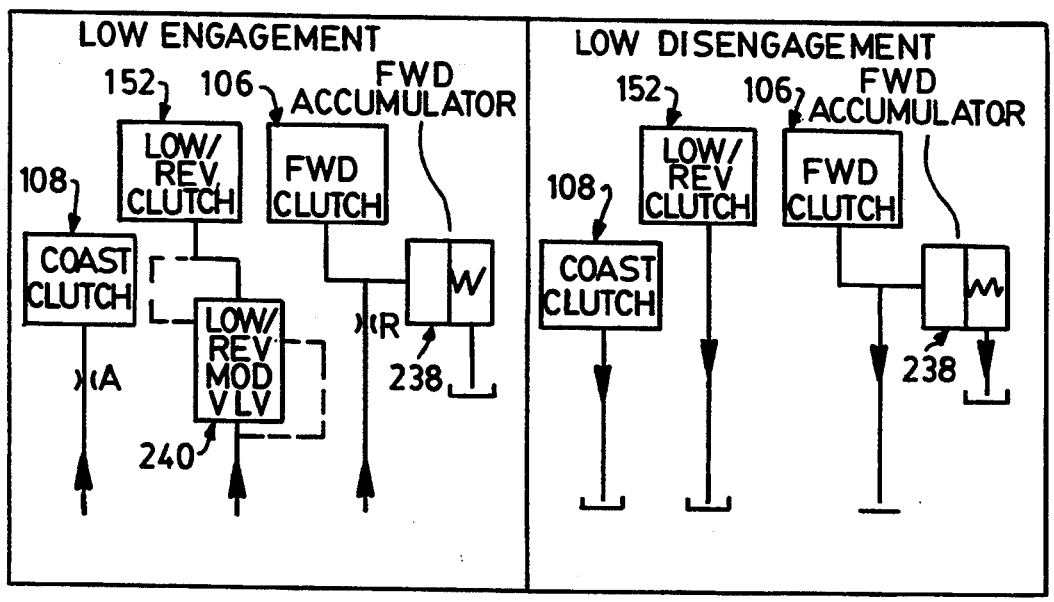
FIGS. 32A and 32B show the shift feel logic for a low engagement of the forward clutch and the reverse and low clutch and the low disengagement of the forward clutch and the low and reverse clutch, respectively.

FIGS. 32A and 32B show the shift logic for low engagement and low disengagement, respectively. This is similar to the logic shown in FIGS. 33A and 33B, except that the flow circuit for the pressurized fluid for the low and reverse clutch is illustrated. During low engagement, fluid pressure passes through passage 442 and through the low and reverse valve 240. Passage 442 communicates with the low and reverse clutch 152 through the valve 240. Low disengagement occurs as the low and reverse clutch is exhausted through the low and reverse valve and through the exhaust port in the manual valve. This is indicated in FIG. 32B. When the manual valve is moved from the D position to the park or neutral position, the forward clutch, the forward clutch accumulator 238 and passage 268 are exhausted rapidly through the manual valve.

The reverse lockout feature that was described previously occurs upon movement of the manual valve to the reverse position from the overdrive position or the 2 position or the low position. This activates a signal in passage 300 which downshifts the 1-2 shift valve. This closes the reverse and low reverse circuit and opens the low reverse and reverse circuit to exhaust, thus causing the transmission to assume a neutral condition. This prevents overloading of the low reverse and reverse friction elements.

When the manual valve is in the D range, an upshift from the first to the second ratio occurs as shift solenoid 200 is turned off, thereby allowing the 1-2 shift valve to upshift by action of its valve spring. Passage 306 then becomes connected to line pressure passage 308 through the 1-2 shift valve. Passage 306 feeds pressure to passage 486 through orifice D located near the 3-2 control valve.

Figures 31A, 31B:
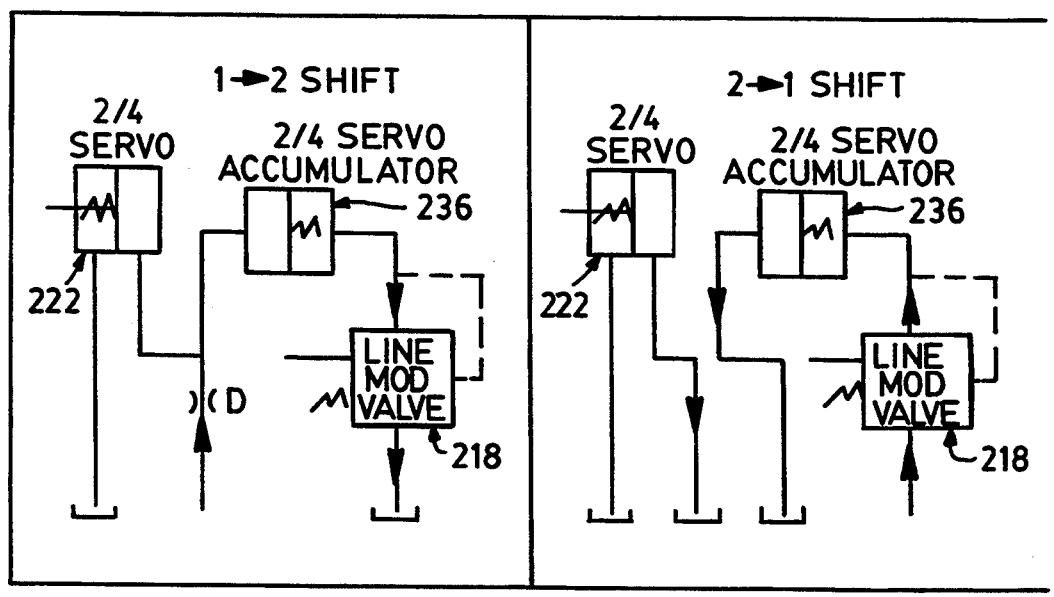
FIGS. 31A and 31B show the hydraulic shift feel logic for a 1-2 shift and a 2-1 shift, respectively.

The 3-2 control valve connects passage 486 to passage 302. Passage 302 pressurizes the 2-4 accumulator and the apply side of the 2-4 servo, which cushions the application of the 2-4 brake band by a control pressure rise. The back pressure on the 2-4 accumulator is controlled by the line modulator valve output pressure in passage 372, which is calibrated as a function of engine torque and is determined by the value of the throttle pressure in passage 234. Passage 302 is connected to passage 370 and to the apply side of the 2-4 servo through passage 370. This hydraulic logic is illustrated in FIGS. 31A and 31B.

When the manual valve is in the D range, a 2-3 shift is initiated when the solenoid 202 is turned off. This allows the 2-3 shift valve 246 to upshift because the signal pressure in passage 320 is zero. The upshifting of the 2-3 shift valve pressurizes passage 312 as passage 268 becomes connected through the 2-3 shift valve to the passage 312. The servo apply feed passage 368 becomes connected to passage 372 through the upshift at the 2-3 shift valve. The pressure in passage 372 is calibratable to a level just high enough to hold the brake band from slipping and yet allow enough braking action to allow the servo release area to release the brake band in synchronism with the application of the direct clutch.

The direct clutch and the servo release chamber of the 2-4 servo are filled by the pressure in passage 312, which is connected to the servo release area through the servo release valve, through passage 372 and through passage 370. Orifice E is in that flow circuit. The servo release valve 220 is held in the position shown by its valve spring, which ensures that the direct clutch and the servo release pressures rise simultaneously. As the servo release pressure rises, it gradually releases the brake band for the 2-4 servo in synchronism with the direct clutch application.

When the pressure in passage 312 rises above the spring load of the 3-2 control valve, the force acting on the differential area of the 3-2 control valve lands 490 and 494, it causes the 3-2 control valve to shift. This pressurizes passage 530, as passage 530 is brought into communication with passage 306. This holds the 3-2 control valve in the right-hand position against the force of the valve spring for a 3-2 downshift. The 2-4 accumulator also is exhausted when the 3-2 control valve is shifted in preparation for a 3-4 upshift. This shift logic is schematically illustrated in FIGS. 30A, 30B and 30C. In the case of FIG. 30C, the downshift occurs at a high speed initially. The processor will distribute a control signal to passage 518 under these circumstances, thereby causing the direct clutch and the release side of the 2-4 servo to exhaust through the timing valve 210 as flow from passage 414 is restricted as it passes through the timing valve to passage 520. A flow path to the apply side of the servo 222 includes orifice K which is located adjacent the 2-3 shift valve as seen in FIG. 35B.

When the manual valve is in the D range, a 3-4 shift is initiated when solenoid 200 is energized, thereby moving the 3-4 shift valve to the right from the position shown in FIG. 35B. Line pressure in passage 312 prevents the 1-2 shift valve from shifting, notwithstanding the fact that a pressure signal in passage 300 then exists.

The 3-4 shift valve connects the servo apply passage 368 to passage 302 and connects a servo release passage 370 to exhaust port 534 in the 3-4 shift valve. Orifice L is located in the exhaust flow path adjacent the 3-4 shift valve. Passage 376 also becomes pressurized as line pressure passage 268 becomes connected to passage 376 through the 3-4 shift valve. Passage 376 extends to the 3-2 control valve, which shifts the 3-2 control valve to connect passage 302 to the 2-4 servo accumulator feed passage 502. This flow path includes orifice D located directly adjacent the 3-2 control valve. During the repositioning of the 3-4 shift valve and the 3-2 control valve, the servo apply pressure is allowed to fall so that it can be brought to line pressure with the 2-4 accumulator valve, thus cushioning the 3-4 upshift.

The servo release shuttle valve, which connects and disconnects the direct clutch to the servo release area, is shifted to the disconnect position by pressure in passage 376. This prevents the loss of direct clutch pressure during the exhaust of the servo release area, thus avoiding a momentary downshift in second gear rather than an upshift in fourth gear.

Figures 27A, 27B:
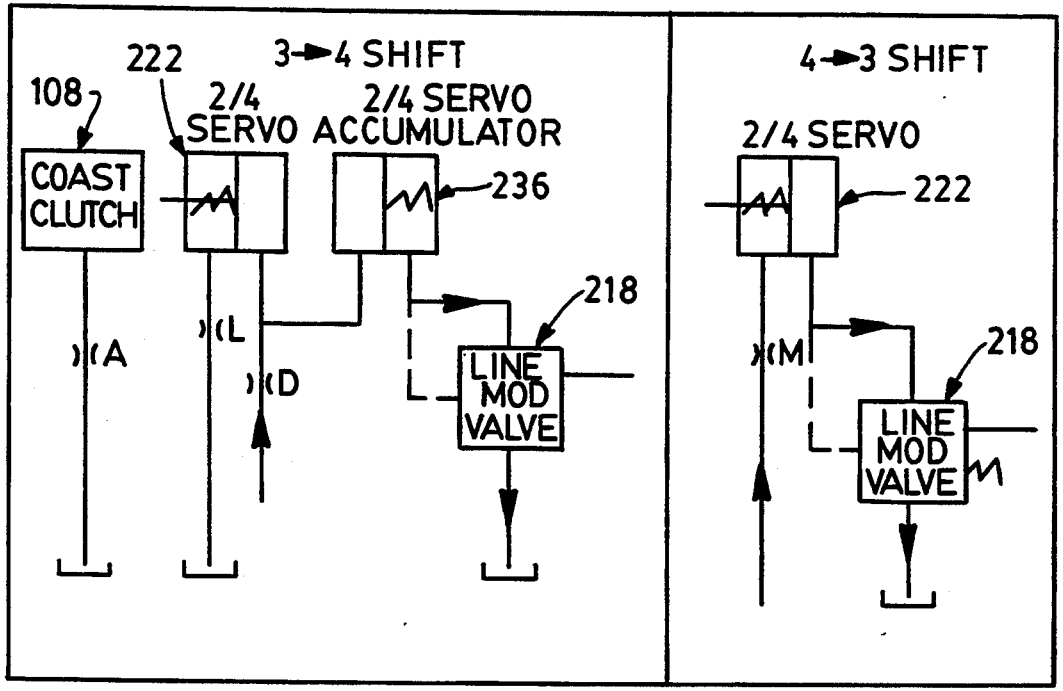
FIGS. 27A and 27B show in schematic form the hydraulic shift feel logic for a 3-4 shift and a 4-3 shift, respectively.

Pressure in passage 408 acts on the differential areas of the shuttle valve lands when the shuttle valve is shifted against the force of the spring by pressure in passage 376, which holds the servo release shuttle valve in its disconnect position during a 4-3 downshift. Upshifting of the 3-4 shift valve also exhausts passage 378 through exhaust port 380 in the 3-4 shift valve. This prevents application of the coast clutch in fourth gear, which would cause a driveline tie-up. This shift logic for a 3-4 upshift and a 4-3 downshift is illustrated in FIGS. 27A and 27B where the functions of the orifices A, L, D and M are indicated. Orifice A, as mentioned earlier, is located next to the coast clutch valve. Orifice L is located next to the 3-4 shift valve. Orifice D is located next to the 3-2 control valve, and orifice M is located directly adjacent the servo release shuttle valve.

On a 4-3 downshift with the manual valve in the D range, the shift is initiated when the shift solenoid 200 is de-energized. This causes the 3-4 shift valve to downshift under spring load. Downshift of the 3-4 shift valve connects the servo apply area to passage 370 and to passage 372, which is the output pressure passage for the line modulator valve. Also, the servo release area of the 2-4 servo is connected to passage 372, which in turn is connected to line pressure passage 312 through orifice M located directly adjacent the servo release valve. The rising pressure in the servo release area gradually releases the brake band, thus completing the shift. The quality of the shift is controlled by the calibrated orifice M.

The servo release valve is held in its left-hand position by the pressure in passage 408, which pressurizes the differential area on the lands of the servo release valve. This prevents loss of pressure in the direct clutch and prevents an unwanted 4-2/2-3 shift.

Passage 376 is exhausted through orifice 534 of the 3-4 shift valve on a 4-3 downshift, thereby allowing the 3-2 control valve to shift against its spring by the pressure that exists in passage 530 and by the pressure in passage 506. This exhausts the 2-4 accumulator as passage 502 becomes connected to 3-2 control valve orifice 508. This prepares the 3-2 control valve for a 3-4 upshift.

This shift logic for 3-4 upshifts and 4-3 downshifts is illustrated in schematic form in FIGS. 27A and 27B.

Figures 28A, 28B:
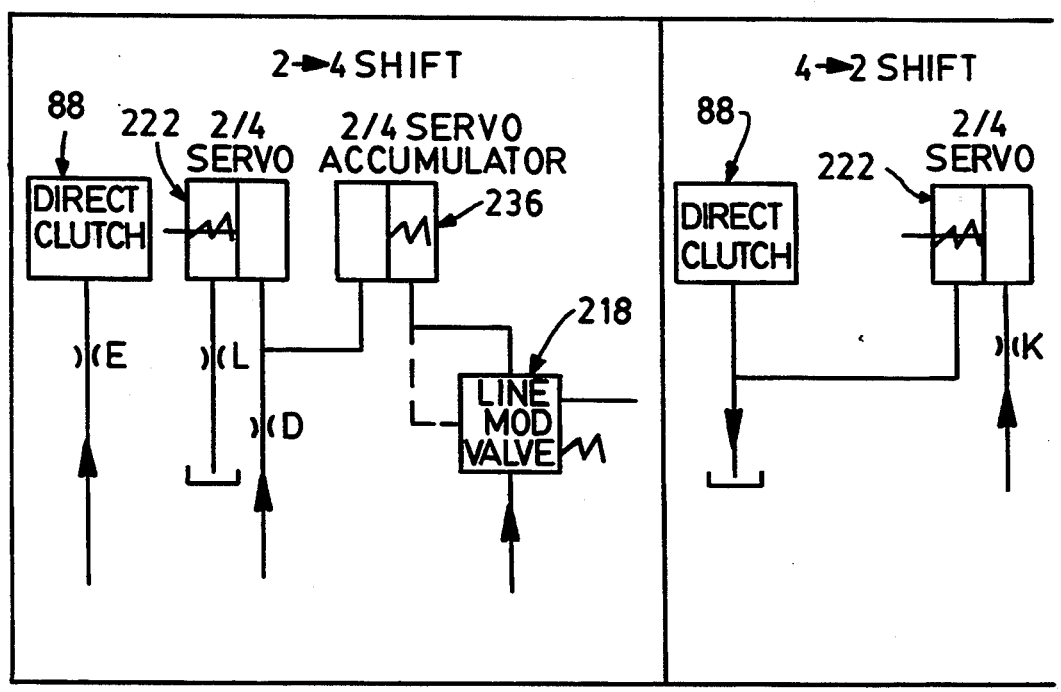
FIGS. 28A and 28B show the hydraulic shift feel logic for a 2-4 shift and a 4-2 shift, respectively.

If the manual valve is in the D range and the overdrive cancel switch is off, a 4-2 downshift is accomplished by commanding a partial 4-3 downshift and then commanding a 3-2 downshift. The shift is initiated when solenoid 200 is off. This causes the 3-4 shift valve to move in a left-hand direction. The 4-3 downshift is interrupted when the servo release pressure in passage 370 falls sufficiently to cause the servo release piston to stroke and to release the band. The partially stroked servo then is used as an accumulator to maintain direct clutch pressure during the 3-2 downshift phase of the shift. This allows the cushioning of the brake band application for the 2-4 servo as in a normal 3-2 shift. The 3-2 downshift portion of the 4-2 downshift function is initiated when shift solenoid 202 is energized, which causes the 2-3 shift valve to shift in a right-hand direction. This allows the 2-3 shift valve to exhaust the direct clutch and the servo release area as passage 302 is brought into communication with exhaust port 508 of the 3-2 control valve. The release of the direct clutch completes the shift. This shift feel logic is illustrated in schematic form for a 2-4 shift in FIG. 28A and for a 4-2 shift in FIG. 28B.

A 3-2 downshift in the D range with the overdrive cancel switch off is initiated when shift solenoid 202 is energized. This causes the 2-3 shift valve to shift in a right-hand direction. The downshifting of the 2-3 shift valve exhausts passage 408 through 2-3 shift valve exhaust port 410. The servo apply area is connected to passage 302 through passage 370 and the 2-3 shift valve. Passage 536 communicates with passage 306 through the 2-3 shift valve and is pressurized. Passage 306 becomes pressurized as it is brought into communication with passage 376 through the 3-2 control valve. The 3-2 control valve is held in its left-hand position by pressure in passage 530. The 3-2 downshift quality is controlled by line pressure and the regulated direct clutch pressure.

Direct clutch pressure is regulated as servo release pressure from servo 222 and direct clutch pressure are exhausted during the downshift. Direct clutch pressure is regulated to a calibrated level that is determined by the commanded signal pressure in passage 518 from the 3-2 control/coast clutch control solenoid valve 196, which acts on the 3-2 timing valve 210 shown in FIG. 35A.

Orifice K, which is located adjacent the 2-3 shift valve as seen in FIG. 35B, is in the pressure flow path to the 2-4 servo as indicated in FIGS. 30B and 30C. The 3-2 timing valve is functional during the beginning of the 3-2 downshift at high speeds. After the speed falls below a calibratable value, the flow path is as indicated in FIG. 30B.

As indicated in FIG. 30A, the orifice E located next to the servo release valve is in the flow path to the direct clutch, but it is not in the flow path during the exhaust of the direct clutch as shown in FIG. 30B.

A 3-1 downshift, when the manual valve is in the D range and the overdrive cancel switch is off, is initiated when solenoids 202 and 200 are energized simultaneously. This causes the 2-3 shift valve 246 and the 1-2 shift valve 242 to downshift as signal pressures in passages 320 and 300 are developed. The direct clutch and the servo release area are exhausted rapidly through passage 408. The 2-4 servo is not applied because it is held off by the servo spring and the pressure in the release side of the servo. The servo apply area is exhausted through the exhaust port 304 in the 1-2 shift valve and through passage 302, so the servo is not applied. No cushioning nor special circuitry is required for this shift.

Figures 29A, 29B:
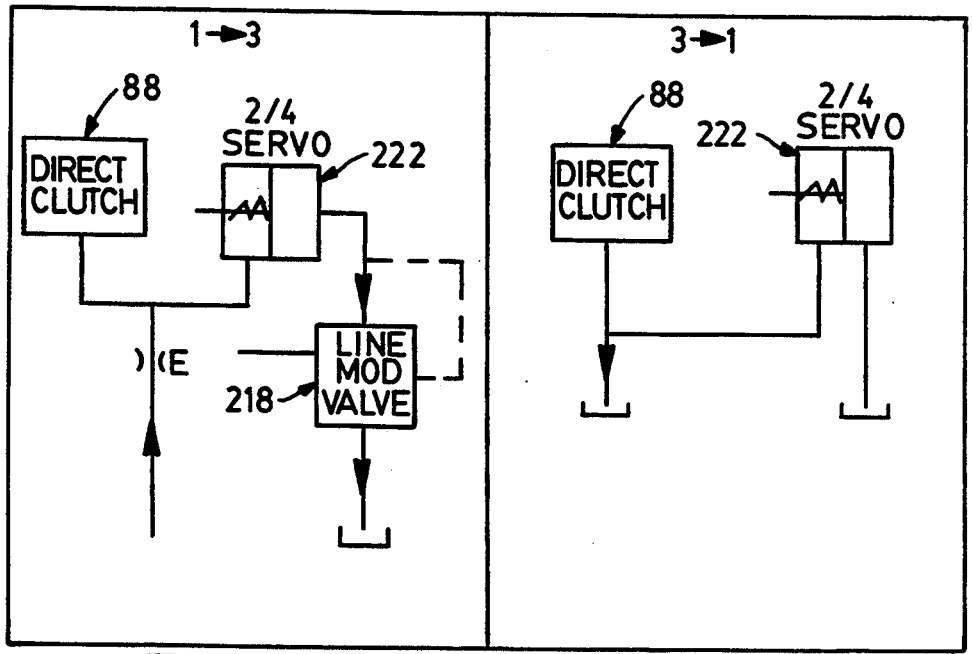
FIGS. 29A and 29B show the hydraulic shift feel logic for a 1-3 shift and a 3-1 shift, respectively.

The fluid logic for the 1-3 shift and the 3-1 shift, as described above, is illustrated schematically in FIGS. 29A and 29B, respectively.

A 2-1 downshift, when the manual valve is in the D position and the overdrive cancel switch is off, is initiated when shift solenoid valve 200 is on. This creates a pressure in passage 300, which shifts the 1-2 shift valve in a right-hand direction. The servo apply area is exhausted, as explained previously, through the passage 302 and the exhaust port 304 of the 1-2 shift valve. A nonsynchronous 2-1 downshift takes place when the servo is released. The servo is released under the influence of the spring pressure in the servo. The fluid logic for the 2-1 shift is shown in FIG. 31B and corresponding logic for the 1-2 shift is shown in FIG. 31A. Only orifice D located near the 3-2 control valve, as seen in FIG. 35B, enters into the flow path in the case of the 1-2 upshift, but it does not enter into the exhaust flow path for the servo or the 2-4 accumulator during a 2-1 downshift.

If the overdrive cancel switch is on, the shifts are similar except that the coast clutch is applied. The application of the coast clutch occurs by reducing the pressure in passage 518, which connects passages 378 and 380 through the coast clutch valve 224. This allows the coast clutch to be pressurized by the pressure in passage 378. The application of the coast clutch is controlled by orifice A next to the coast clutch valve 224.

If the manual valve is in the D range with the overdrive cancel switch off and a shift of the first, second or third ratio is desired, the processor will exhaust the coast clutch, thereby commanding a 3-2 coast clutch solenoid pressure in passage 518. This exhausts the passage 380 through the orifice 392 at the coast clutch valve 224.

When the transmission manual valve is in the D range and the operator "pulls in" the manual valve to the low speed ratio position, a computer controlled shift calibrated with vehicle speed will occur. The overdrive cancel switch is off. In these circumstances, the low range line pressure passage 472 will be pressurized as explained previously. This pressure acts on the right end of the pull-in valve 208, which shifts the valve, thereby connecting the solenoid feed passage 272 to signal passage 320. This also connects passage 334 to signal passage 336. The 2-3 shift valve is downshifted whenever shift solenoid 202 is de-energized. Simultaneously with the manual valve pull-in, the microprocessor switches the logic of the shift solenoids in the ratio selection. For example, the second gear logic then will require solenoids 200 and 202 to be energized rather than both shift solenoids 200 and 202 to be de-energized. The microprocessor under the manual valve pulling conditions would sequence a 3-2/2-1 downshift or a 2-1 downshift if the vehicle speed is above that in which a manual low first gear shift would be permitted.

If the manual valve is moved from the drive position to the manual low position and the transmission is in first gear, that shift is initiated when the manual valve pressurizes the manual low pressure passage 332. The processor will de-energize shift solenoid 202 because of the manual low shift logic mentioned above. This does not affect the shift because the 1-2 shift valve already is in the downshift position. Thus, manual low pressure passage 472 and the connecting passage 332 communicate through the 1-2 shift valve with passage 474, which feeds the low reverse clutch by way of the low reverse regulator valve 240. This shift is completed when the low reverse clutch is applied. The shift quality is controlled by the low reverse regulator valve output pressure.

If the vehicle is travelling at a high speed and the transmission is in the drive range D, the manual low pull-in shift is initiated when the manual valve is moved to the low position. The processor then will determine whether the shift will be a 3-2 shift followed by a 2-1 shift or a 2-1 shift, as mentioned above.

If the processor commands third gear under these conditions, solenoid 202 is energized. This prevents the 2-3 shift valve from downshifting because signal pressure passage 332 is connected through the pull-in valve to passage 336, which pressurizes the right-hand end of the 2-3 shift valve. If the transmission is in the overdrive range at the time of the manual low pull-in shift, solenoid 200 is de-energized and solenoid 202 is energized simultaneously. This causes a 3-4 shift valve to downshift since signal pressure in passage 300 is exhausted. After the vehicle speed drops sufficiently, the processor then commands a 3-2 shift followed by a 2-1 shift.

If the manual valve is moved to the pull-in position and the vehicle speed is moderate rather than high, second gear will be commanded initially during the overdrive pull-in shift. Shift solenoid 200 will be de-energized causing a 4-2 shift since the signal pressure in passage 300 acts on both the 1-2 shift valve and the 3-4 shift valve, causing both shift valves to move to the left.

If the pull-in shift is made from a third gear ratio, the computer logic will automatically command a 3-2 downshift without affecting the shift solenoid status. A 2-1 downshift then will be commanded when the vehicle speed drops to the calibrated lower level. In the event of a loss of signal due to an interruption of voltage to the solenoid valves, the transmission will default to the third gear and the coast clutch automatically will be applied because of a loss of the signal pressure in passage 518. Because of the logic change in the gear selection in the manual low range, second gear can be obtained rather than third gear. This feature provides limp-home capability for the vehicle in the event of a loss of voltage.

The 2-4 accumulator is used for two different ratio changes; namely, the shift from first to second and the shift from third to fourth. This is made possible, as explained previously, by the 3-2 control valve. If a shift is made from third to second, the accumulator should not stroke. Thus, the 3-2 control valve blocks the accumulator feed passage 502 and exhausts the accumulator through port 508. This allows the accumulator to stroke to the right and condition it for a 3-4 upshift. This is accomplished since the 3-4 shift valve will connect the line pressure passage 268 to passage 376, which strokes the 3-2 control valve to the left.

The 3-2 control valve is stroked to the right whenever passage 506 is pressurized. That will cause passage 530 to be pressurized which latches the 3-2 control valve in a right-hand direction. This latching feature is needed because if the transmission returns to the second gear ratio, passage 506 no longer is pressurized; but it is necessary nonetheless for the 3-2 control valve to remain in the right-hand position. Thus, there is a need for both pressure areas at the left-hand end of the 3-2 control valve to be pressurized to hold the valve in its right-hand position so that it is ready to provide an accumulator action on a shift to the fourth ratio.

As previously explained, the line modulator valve 218 provides shift feel quality for all three upshifts. In the case of a 1-2 shift and a 3-4 shift, it provides a regulated pressure in passage 372 for the accumulator 236. In the case of the 2-3 shift, it provides a regulated pressure in passage 372, which is distributed through the 2-3 shift valve to passage 370 and through the 3-4 shift valve to the apply side of the 2-4 servo. Thus, the back pressure on the servo is controlled by the line modulator valve which influences the 2-3 shift.

The servo regulator valve 220 controls a 4-3 downshift. Since the apply side of the 2-4 servo is connected to passage 370 through the 3-4 shift valve and through the upshifted 2-3 shift valve to passage 372, the pressure in passage 372 is modulated by the valve 218, as was explained previously.

Electronic Control Strategy For A 4-2 Downshift And A 3-2 Downshift For The Transmission Structure of FIG. 1A For purposes of describing in the electronic control strategy that is involved in a 4-2 downshift and a 3-2 downshift, reference now will be made to the flow charts of FIGS. 1C through 1K.

After the processor is initialized, as indicated by the functional action block 620 in FIG. 1C, the routine is started as shown at 622. The first process step shown at 624 involves an inquiry as to whether a 3-2 shift is desired. The processor pointer, which was described earlier, would address a register called SS3L_MODE, the eight-state register that controls the variable force solenoid output pressure for solenoid valve 196 of FIG. 35A. That pressure control occurs during a 3-2 downshift or a 4-2 downshift. The eight states are identified as Mode 0 through Mode 8 in the control strategy to be described with reference to FIGS. 1C through 1K.

When the mode equals zero, the processor is not commanding or verifying a 3-2 shift or 4-2 shift. If the mode is one, the processor is verifying a 3-2 shift, and the pressure output of the solenoid valve 196 is raised. If the mode is two, the processor will command a 3-2 shift and will hold the output pressure of solenoid valve 196 at a high value. If the mode is three, the processor controls the pressure so that it will begin to ramp down the pressure output of solenoid valve 196. If the mode is four, the processor will hold the pressure until the end of the shift.

If the mode is five, that indicates that the processor will command a 4-2 downshift and will raise the pressure output of the solenoid valve 196. Mode 6 corresponds to the beginning of a ramp-down of the pressure. Mode 7 corresponds to the holding of the pressure until the end of the shift. Mode 8 indicates that the shift has been completed, at which time the pressure output of the solenoid valve 196 drops to zero. The 3-2 timing valve shown in FIG. 35 then will be allowed to stroke in the right-hand direction, thereby exhausting the direct-drive clutch and the servo release chamber of the 2-4 servo through passage 520 and through exhaust port 410 in the 2-3 shift valve shown in FIG. 35B.

In determining whether a 3-2 shift is desired at action block 624, a test is made to see if register SSL_MODE=ZERO, whether gear command register GR_CM=3, whether desired gear register GR_DS has been verified as being equal to 3, whether the initial gear desired register IGR_DS=2, and whether the 4-2 shift flag FLG_42SYNDS has been cleared. If all of those conditions are met, register SS3L_MODE=1, indicating that this register has changed state. This condition is indicated in step 626 of FIG. 1C. The mode_change register now equals 1, which indicates that the SS3L_MODE register has changed state.

If the register mode_change equals zero, that would indicate that there has been no change in the state of the register SS3L_MODE. The register mode_change is zero whenever the register SS3L_MODE=0. If the register SS3L_MODE is any value that is different than zero, the mode_change register will equal 1.

If the register SS3L_MODE=1, the routine will proceed to action block 628.

If the result of the inquiry that occurs at action block 624 is negative, a test is made at action block 630 to determine whether a 4-2 shift is desired. This involves a test of whether the SS3L_MODE register equals 0 or equals 1, whether the flag FLG_FRST CM=1, which would indicate that a shift is being commanded for the first time, whether the register GR_OLD=4, which would indicate that the previous gear commanded was fourth ratio, whether flag FLG_42SYNDS=1, which would mean that the processor should treat the 4-3/3-2 shifts as a 4-3-2 shift and that it should use the 4-2 shift tables stored in memory for establishing the shift points, and whether the register GR_DS is less than or equal to 2, which would indicate that the desired gear is either 2 or 1. If all of those conditions are present, the module SS3L_MODE will change to state 5.

If the fifth state is present, timer SS3L_END_TMR, which is the watchdog timer, is set at action block 718, as will be described subsequently, allowing the processor to hold the pressure output of the solenoid valve 196 for the duration of the shift as the 4-2 shift is commanded. If the inquiry at 630 is negative, the routine will then move to action block 632 and the processor pointer will address register SS3L_MODE and determine whether state 8 is present, which would indicate the end of a shift. It also tests the timer SS3L_END_TMR to determine whether it has run down.

Register SS3L_END_TMR is a timer that will allow only a calibrated time for the shift to occur. If for some reason the shift does not occur within the calibrated time, the routine will proceed to the next step and skip the present step that had been commanded earlier.

If the inquiry at step 632 is negative, the register mode_change then is 0, as shown at step 634, which would indicate there has been no change in state of the SS3L_MODE register.

A positive response to the inquiry at step 632 results in the setting of the SS3L_MODE register=0 and a change in state of the mode_change register, as indicated at step 636. The completion of the action indicated at action block 636 or 634, whichever is the case, will cause the routine to proceed action block 628 shown in FIG. 1D.

Figure 1D:
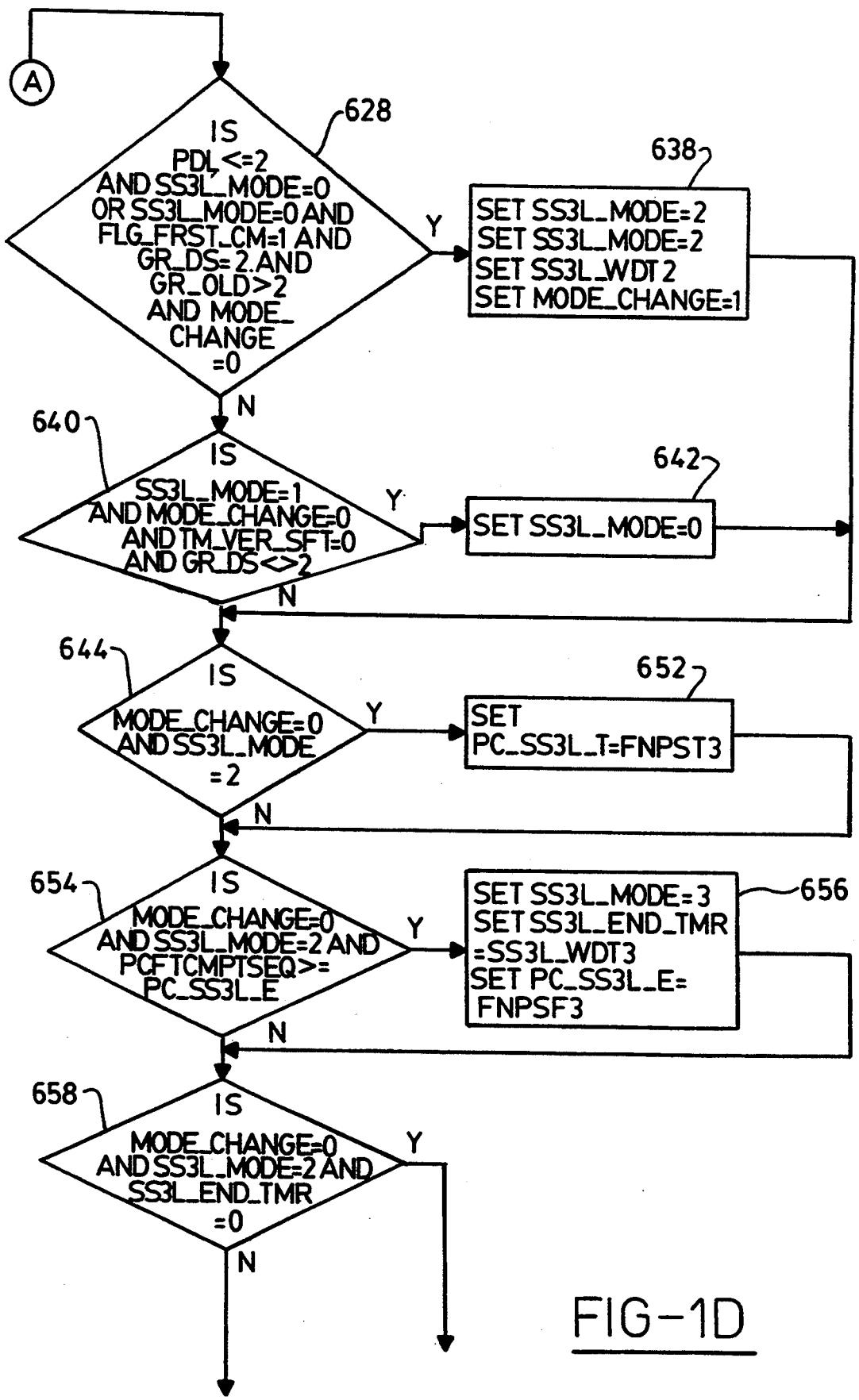

Step 628 is present to cover the possibility that even though there is no 3-2 automatic downshift taking place, there might be a "pull-in shift" as the vehicle operator pulls the manual valve to the low position or manual second range position. The action with respect to a pull-in shift is made by the processor by addressing the SS3L_MODE register to determine whether it equals 1 or whether it equals 0 with the manual lever position being either 2 or 1. It also checks the flag register FLG_FRST_CM to determine if it equals 1. It also checks the desired gear register GR_DS=2 and the register GR_OLD to determine whether it is greater than 2. If all of those conditions are met and if the register mode_change equals 0, indicating no change in the state of the register SS3L_MODE, the routine will proceed to action block 638 where the SS3L_MODE register is set equal to 2. At the same time, the watchdog timer SS3L_END_TMR, previously described, will be set to a new value which, as indicated in FIG. 1D, is SS3L_WDT2. The mode_change register is set at the same time to 1 to indicate a change in state.

If the inquiry at action block 628 is negative, the routine will skip the steps indicated in action block 638 and will proceed directly to action block 640 where it is determined whether register SS3L_MODE=1. It also is determined at that time whether there has been a state change by checking register mode_change. The processor also will check the timer register to determine whether the timer TM_VER_SFT has run down. A check is made also of register GR_DS to determine whether the desired gear is either less than 2 or greater than 2. If all the conditions tested at action block 640 are true, the register SS3L_MODE is set equal to 0, indicating that no state change has occurred.

The routine will proceed from either step 638 or step 642 to action block 644. If the response to the inquiry at 640 is negative, the step at 642 is skipped and the routine will proceed directly to action block 644.

At action block 640, the timer TM_VER_SFT is held for a short time to cover the possibility that the operator may change his or her mind about making the shift after the shift is started while register SSL_MO-DE=1. Then the 3-2 downshift is not being commanded.

At action block 644, it is determined whether mode_change=0 and whether register SS3L_MODE =2. If both conditions are met, a percent shift complete register is set to a functional value FNPST4 (VSBAR-T_RT), as indicated at action block 642. The percent shift complete value for various engine speeds (VSBART_RT) is shown in the chart of FIG. 1Q. The value determined at action block 642 is the point 646 shown at FIG. 1Q. That is the point at which a rampdown in pressure begins. The point at which rampdown of the pressure ends is identified in FIG. 1Q by reference numeral 648. The line connecting points 646 and 648 represents the result of the solution of the functional equation in memory, and the value shown at 650 actually is an intripolated value obtained by dimensional intripolation of values between two points on a curve. The value at any point on the line 650 is a function of speed.

The action block where the percent shift complete value is set is shown in FIG. 1D at 652. After the percent shift complete value is determined, the routine will proceed to action block 654 where an inquiry is made as to whether there has been a state change. This is done by determining whether mode_change register is zero, whether the register SS3L_MODE=2 and whether the percent shift complete sequence register PCSFTCMPTSEQ is greater than or equal to the percent complete point shown at 646 in FIG. 1Q. If those conditions are met, register SS3L_MODE=3 as shown at action block 656 in FIG. 1D.

The timer SS3L_END_TMR is set to the value SS3L_WDT3 as shown in action block 656. That is the same timer discussed above with reference to action block 632 in FIG. 1C, but it is loaded with a different time; namely, a time value SS3L_WDT3. At this instant, the ramp down in pressure is triggered. The processor also picks up the end value for the percent shift complete. That value, which also is a function of vehicle speed, is shown in action block 656 of FIG. 1D where the register PC_SS3L_E is set equal to FNPF3.

The routine then proceeds to action block 658 of FIG. 1D where inquiry is made as to whether there has been a state change by determining whether mode_change=0 and whether register SS3L MODE=2 and whether the timer SS3L_END_TMR has run down. If those conditions are met, the routine proceeds to action block 660 of FIG. 1E where the register SS3L_MODE is set equal to 4 and the timer SS3L_END_TMR is set to a new value that determines the time at which the pressure should be held until the end of the shift. This value can be seen by referring to the direct clutch pressure graph of FIG. 1M where the pressure shown at the end of the shift is maintained for a short time before the pressure is allowed to drop to zero.

Figure 1E:
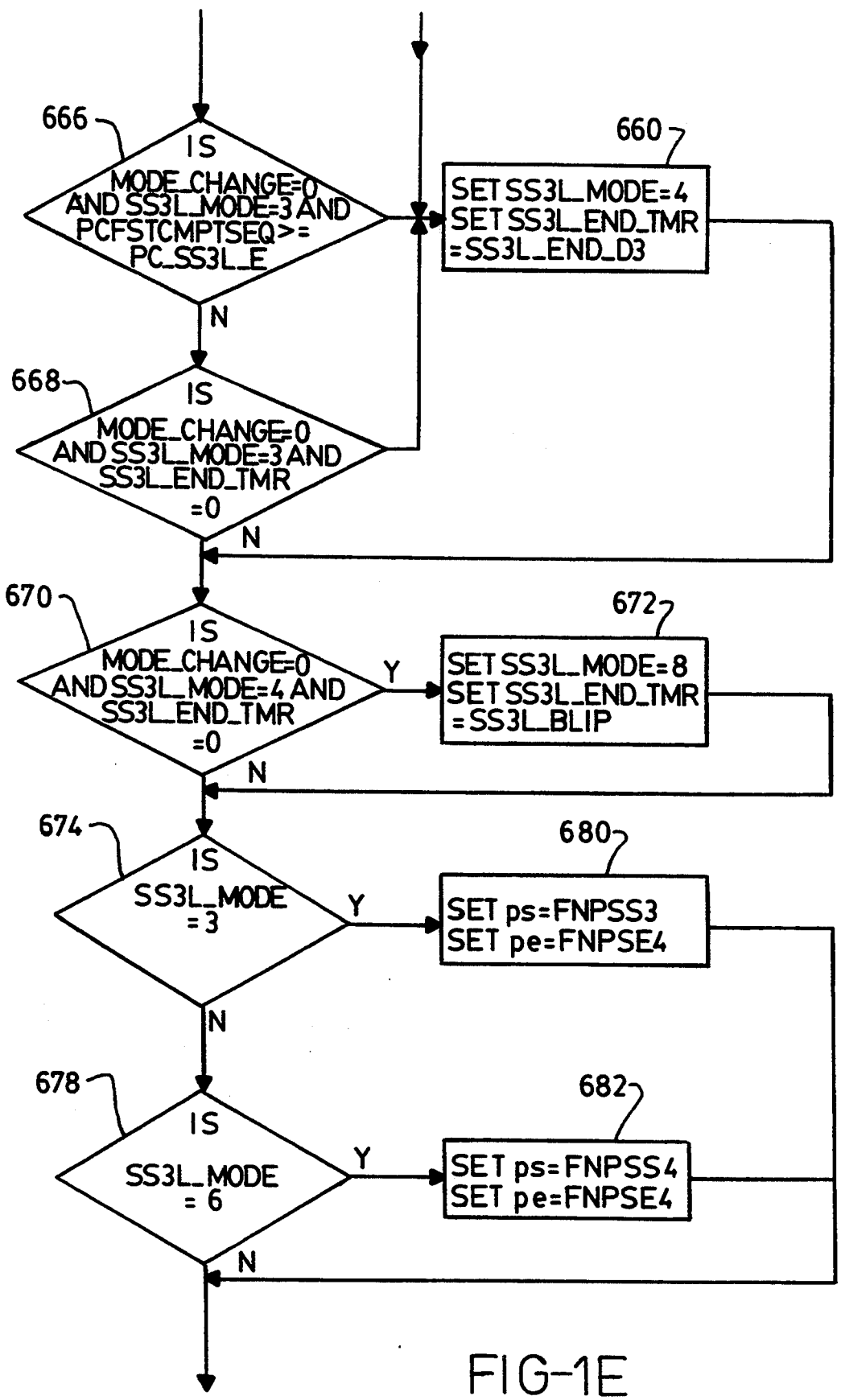
Figure 1F:
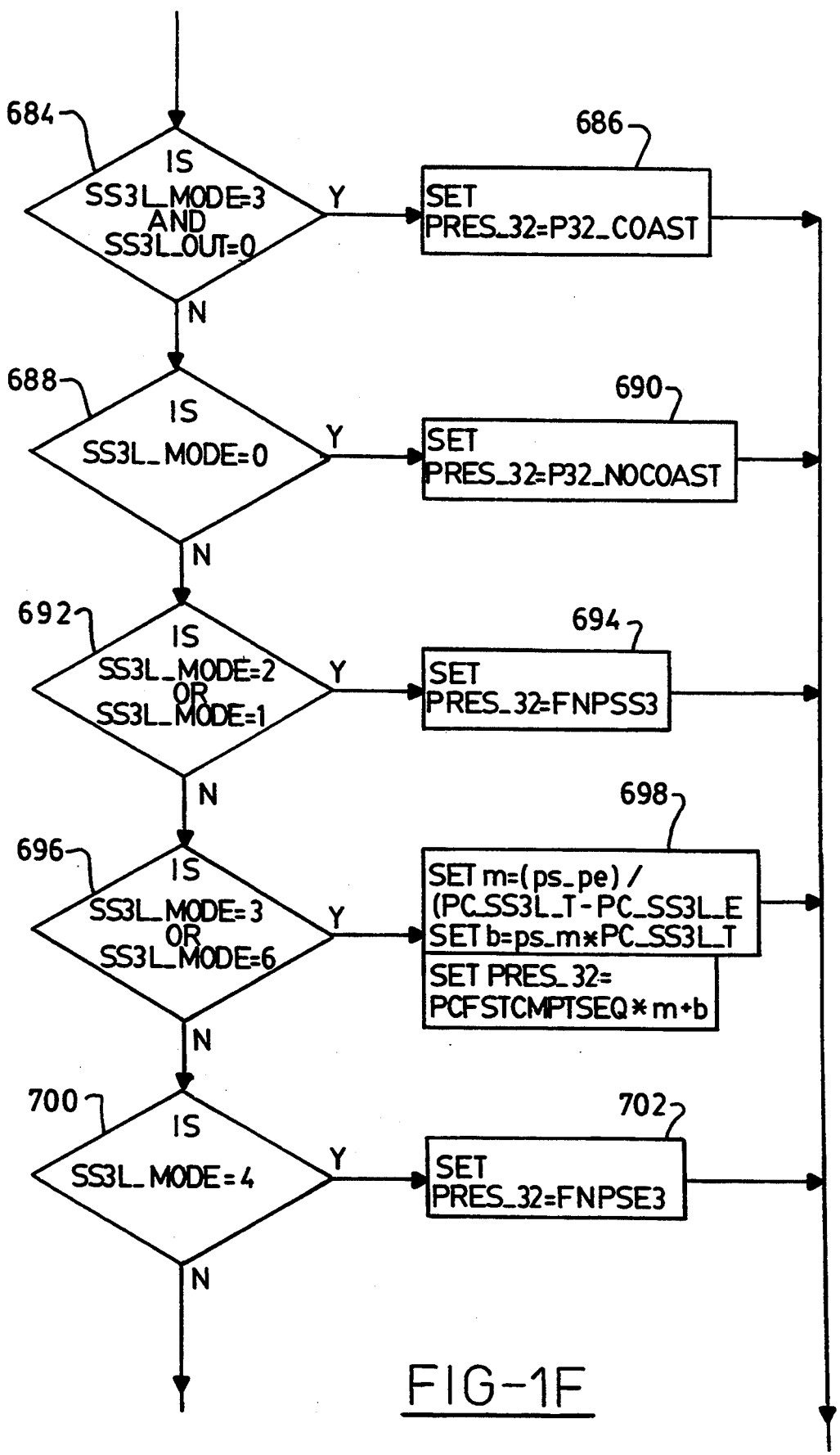
Figure 1G:
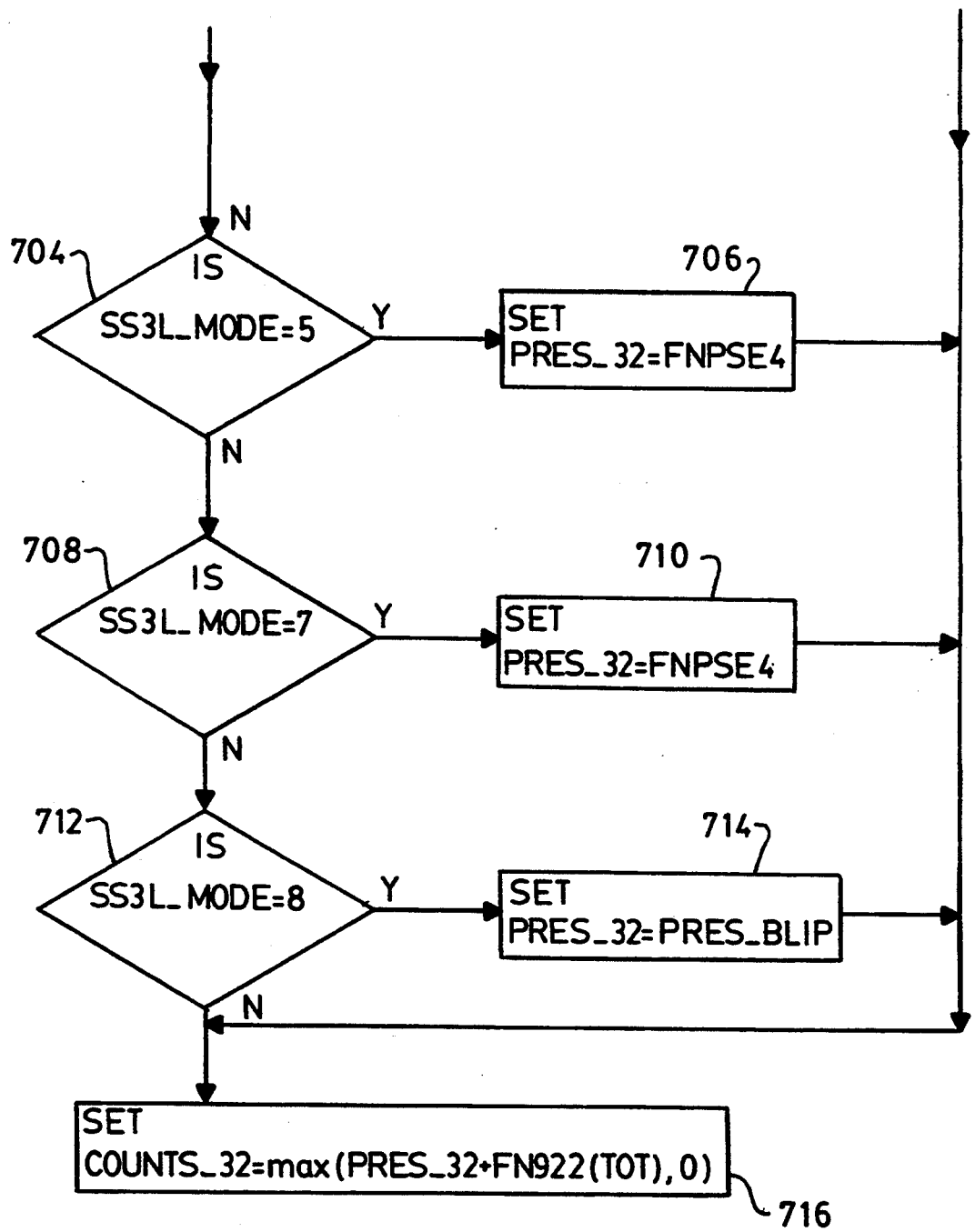
Figure 1H:
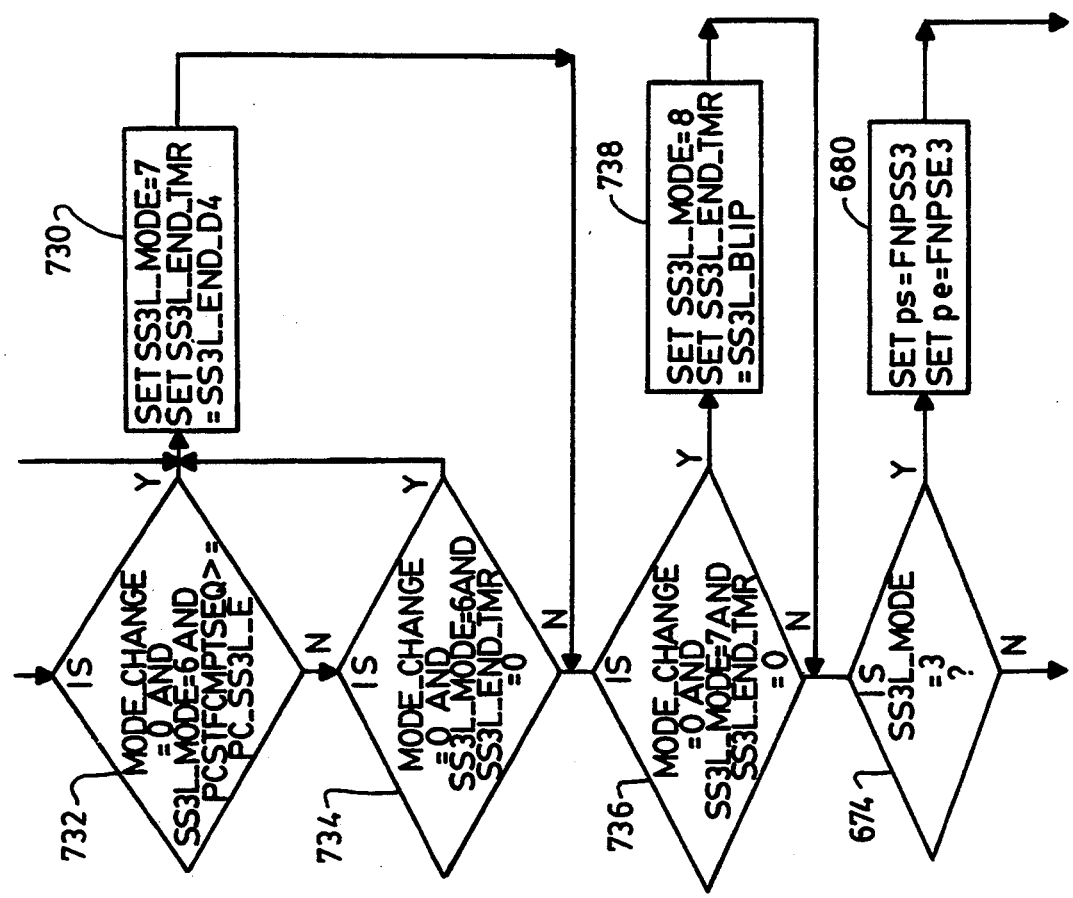
Figure 1J:
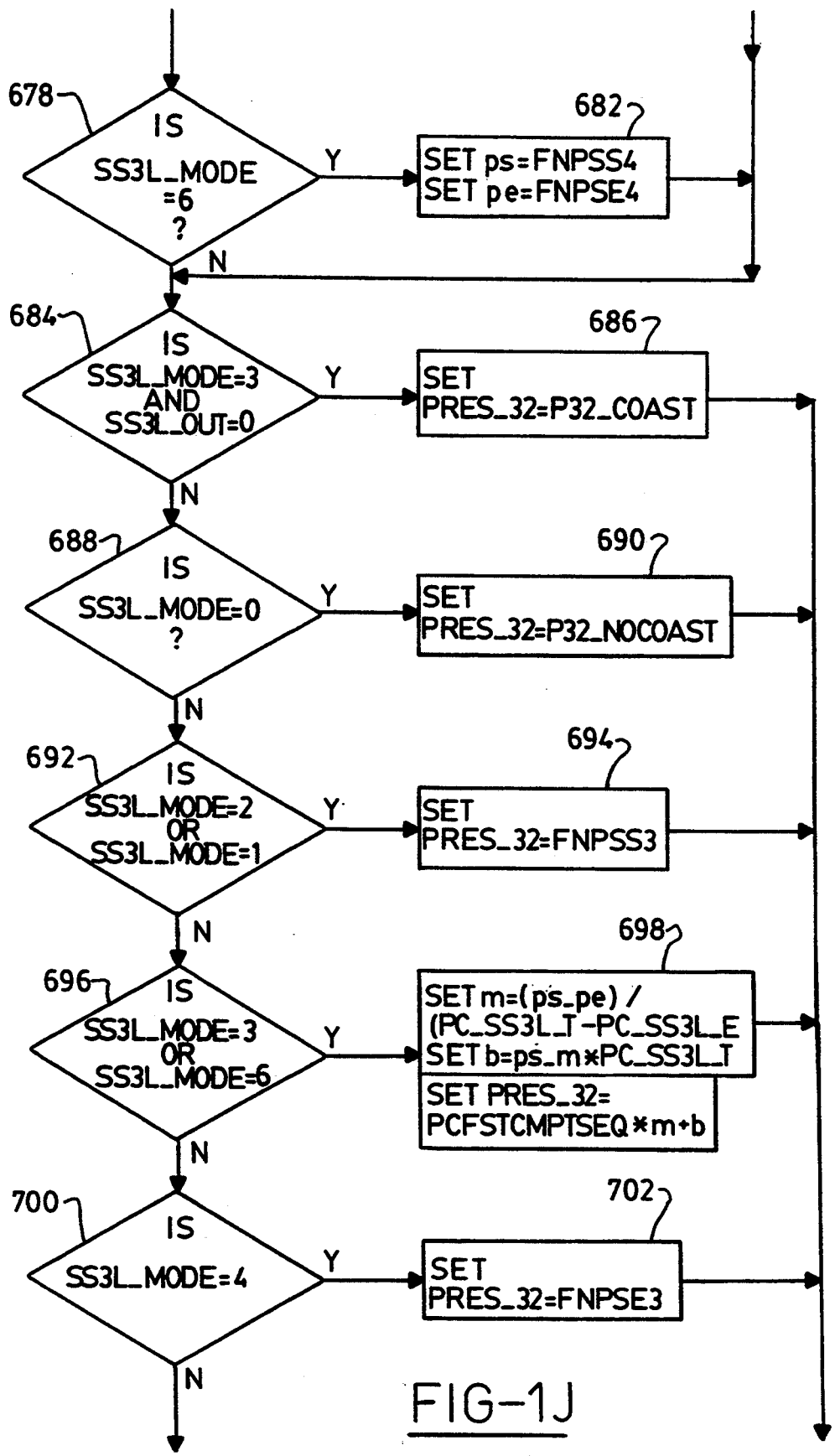
Figure 1K:
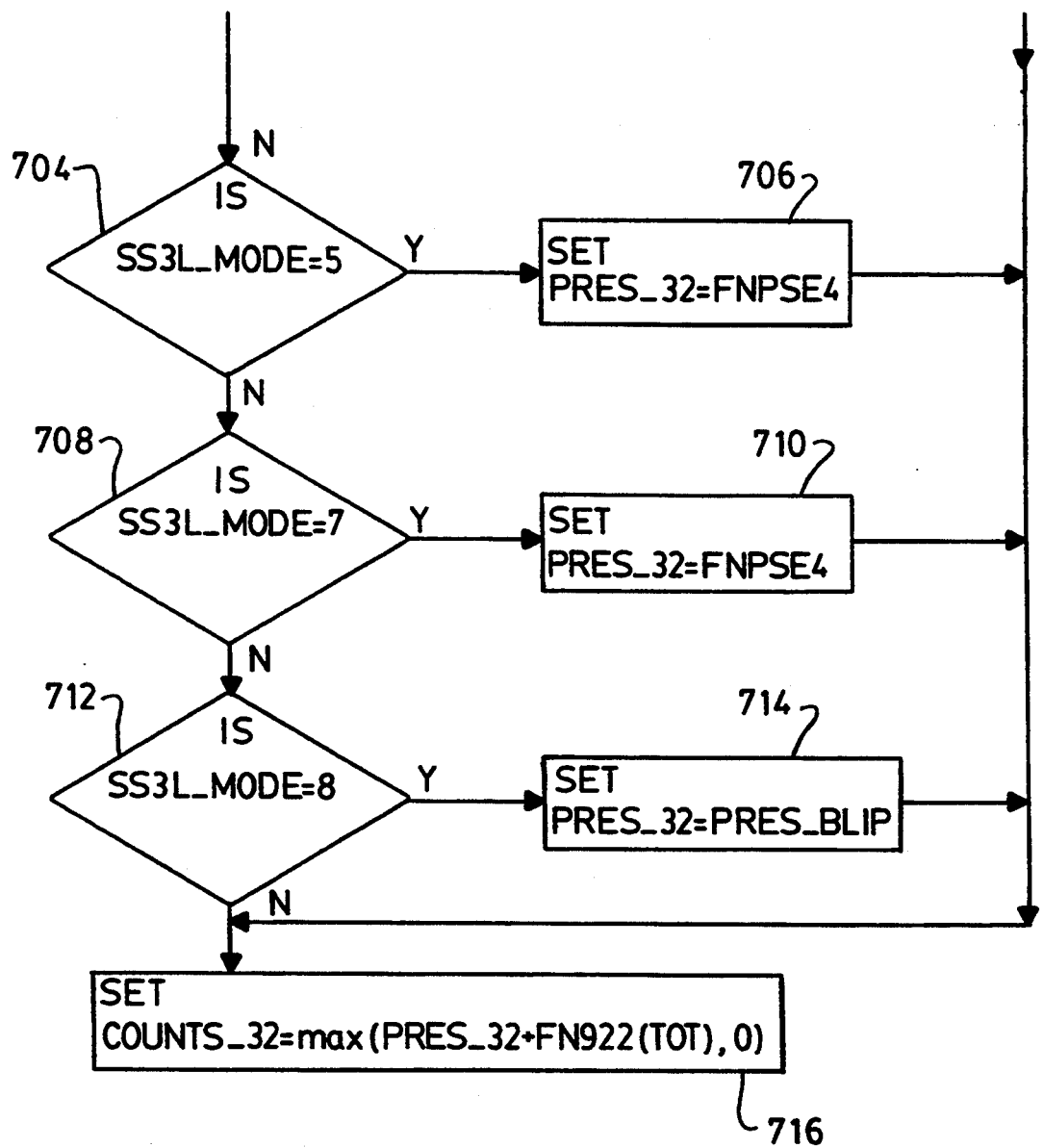
Figure 1L:
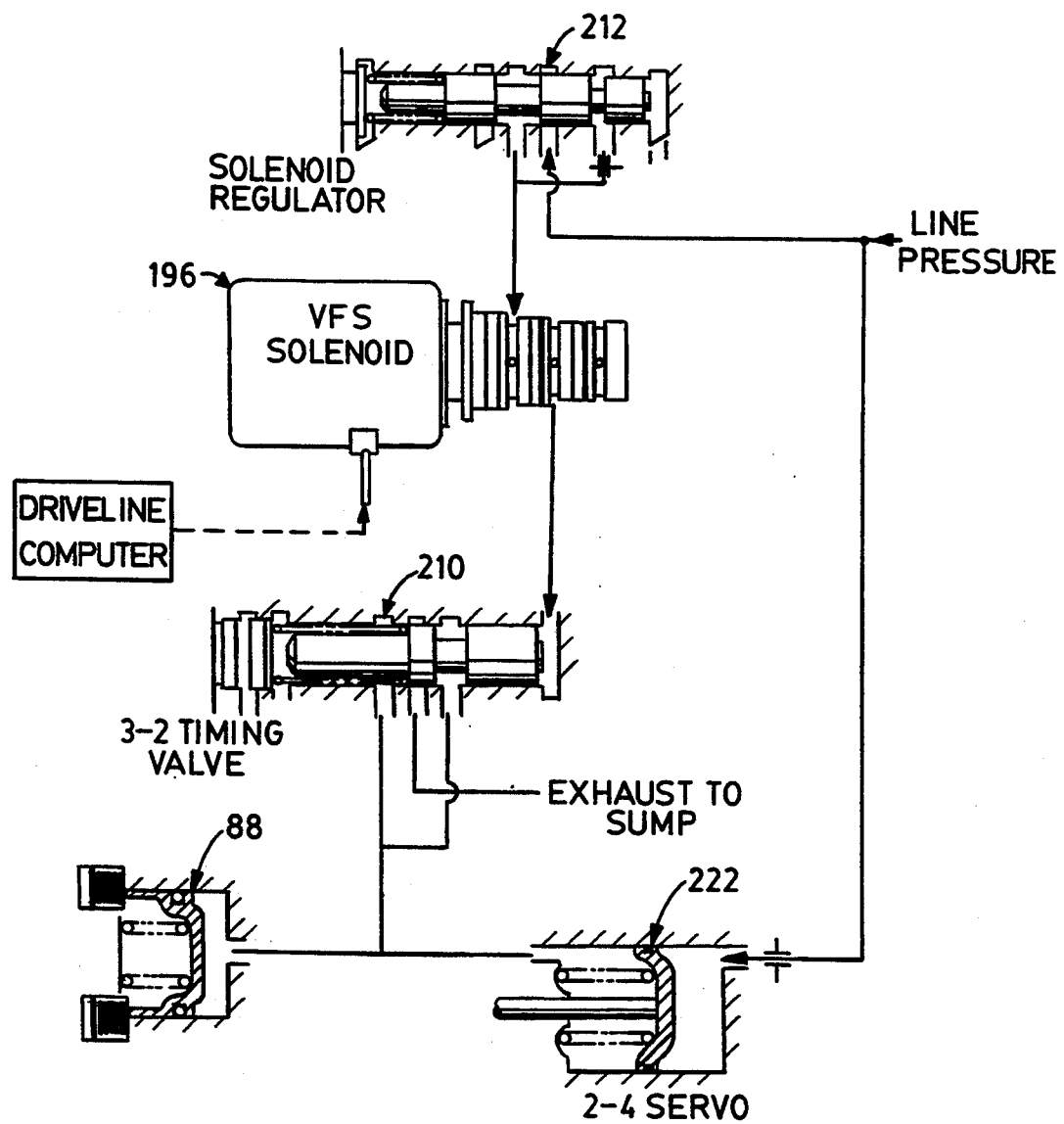
FIG. 1L is a subassembly view of the valve system including the direct clutch, the 2-4 servo, the solenoid regulator and the VFS solenoid for controlling 3-2 and 4-2 downshifts.
Figure 1N:
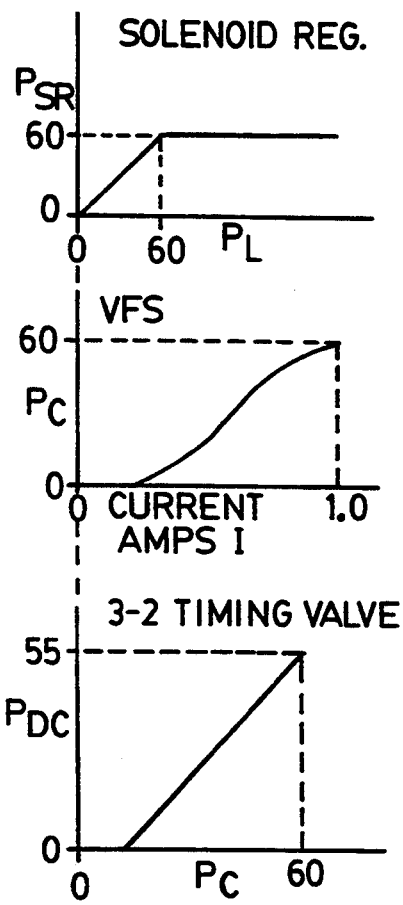
FIG. 1N is a chart showing the characteristics of the solenoid valve, the pressure control solenoid valve and the 3-2 timing valve during a 3-2 downshift.
Figure 1M:
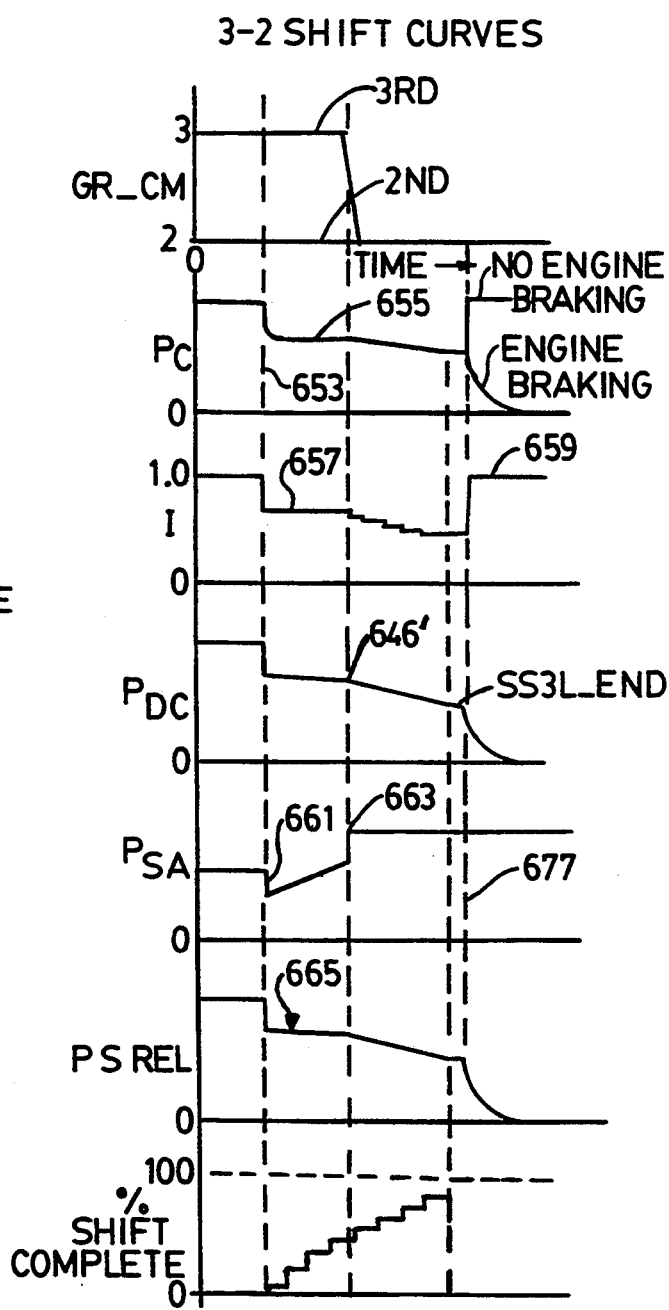
FIG. 1M is a chart showing the relationship between time and several variables comprising servo release pressure ($P_{sr}$), direct clutch apply pressure ($P_{dc}$), servo apply pressure ($P_{sa}$), solenoid valve output pressure (pc), and commanded gear ratio (GR—CM) during a 3-2 downshift.

Shown also in the plot of the direct clutch pressure in FIG. 1M is a value corresponding to point 646 in FIG. 1Q. In order to correlate the two values, numeral 646 with a prime notation (646') has been added to FIG. 1M. In FIG. 1M, the commanded gear is shown in the plot at the top of the figure. At time zero, the gear is in third ratio as indicated. That third ratio continues to the time corresponding to point 646'. The solenoid output pressure at time 653 is reduced in FIG. 1M and thereafter is held constant as shown at 655 until point 646' is reached, at which time the pressure is ramped down as explained previously. A corresponding change in the current of the solenoid 196 occurs, as indicated by reference numeral 656. At the end of the shift, as indicated at 659, the current value rises as does the solenoid output pressure, and thereafter is maintained at a sustained value.

Also seen in FIG. 1M is a plot of the servo apply pressure versus time. When a shift first is commanded, the pressure in the servo drops as shown at 661, and thereafter it increases to its maximum value at point 663 corresponding to the point 646'. Thereafter, it maintains a steady value during the shift.

The pressure in the servo release chamber as shown by reference numeral 665 has a shape that corresponds to the shape of the direct clutch pressure relationship, indicated in the chart of direct clutch pressure versus time.

If the conditions set at action block 658 in FIG. 1D are not met, the routine will proceed directly to action block 666 in FIG. 1E where it is determined once more whether mode_change=0, whether register SS3L_MODE=3 and whether the timer value for timer PCSFTCMPTSEQ is greater than or equal to PC_SS3L_E. If those conditions are true and the conditions in previous action block 658 are not true, the routine will proceed at that point to action block 660, as described earlier.

If the conditions at both action block 658 and 666 are not true, the routine will proceed then to action block 668 where the state change again is checked by determining whether mode_change still is equal to 0, whether register SS3L_MODE still equals 3 and whether the timer SS3L_END-TMR has run down. If those conditions are met, then the routine at action block 660 is carried out. After completion of the steps at action block 660, or if that action block has been bypassed due to negative responses at action block 658, 666 and 668, the routine will proceed to action block 670 where the state change again is tested by determining whether mode_change is still equal to 0 and whether register SS3L_MODE=4 and whether the timer SS3L_END_TMR has run down. If all those conditions are met, the routine will proceed to action block 672. Otherwise, the routine will proceed to action block 674. At action block 672, the register SS3L_MODE is set to 8 and the timer SS3L_END_TMR is set to a new value called SS3L_BLIP, which calls for a drop of pressure at the end of the shift. This drop in pressure is indicated in FIG. 1M beginning at time 677.

The preceding description of the flow chart of FIG. 1C sets forth the method for establishing the state of the SS3L_MODE register. That register can be set at any one of eight states. The following description of the remaining portion of the flow chart for a 3-2 downshift describes the method steps involved in setting the pressures for the particular state that has been set.

After the action at the appropriate action block 642, 652, 656, 660 or 672 is completed, the routine proceeds to action block 674 where an inquiry is made as to whether register SS3L_MODE=3. If it is, the pressures at the start of the ramp-down and the pressure at the end of the ramp-down are determined from a table stored in memory (ROM). This is done as the processor pointer addresses functional values in the table. The functional values are the function of vehicle speed (VSBART_RT) and throttle position (TP_REL). A schematic representation of such a table is shown in FIG. 1R where the variables on the ordinate and on the abscissa of the table are TP_REL and VSBART_RT, respectively. Each block of the table contains an address and a data value.

At action block 674 and 678 in FIG. 1E, the processor will determine whether the SS3L_MODE register is 3 or 6. If it is 3, the pressure will start to ramp down as explained previously. This involves a setting of the starting pressure and the ending pressure as indicated in action block 680 if the SS3L_MODE register is 3. The values for the starting pressure and the ending pressure are indicated to be FNPSS3 and FNPSE3, respectively.

If the SS3L MODE register is 6 rather than 3, that indicates that the 4-2 shift has been commanded rather than the 3-2 shift. If in fact the SS3L_MODE register is 6, the starting pressure and the ending pressure, as shown in register 682 of FIG. 1E, will be set to the beginning and ending pressures appropriate for a 4-2 shift as indicated by the symbols FNPSS4 and FNPSE4, respectively. Following the setting of the pressures at action block 680 or 682, the routine will proceed to action block 684 of FIG. 1F. If it is determined at step 684 that the SS3L_MODE register is 3 and that the flag SS3L_OUT is zero, the pressure required from the solenoid valve 196 is set to a value P32 COAST if coast braking has been enabled. This occurs at action block 686. If the inquiry at step 684 is negative, it is determined at step 688 whether the register SS3L_MODE=0, in which case the pressure PRE-S_32, which is the pressure required from the solenoid valve 196, is set equal to P32_NOCOAST, which is the pressure required of the solenoid valve 196 when coast braking is disabled. This action occurs at action block 690. If the inquiry at step 688 is negative, it is determined at step 692 whether the register SS3L_MODE=2 or 1. If either is the case, the pressure is set at action block 694 to a value equal to FNPSS3. This raises the pressure before the shift starts after the 3-2 shift has been verified or commanded.

If the inquiry at step 692 is negative, the routine will determine at step 696 whether the register SS3L_MODE is 3 or 6. If it is 6, as explained previously, there will be a start of a ramp-down of pressure if the 4-2 shift has been commanded. If it is 3, the same ramp-down begins but a 3-2 shift is in place rather than a 4-2 shift.

If the inquiry at step 696 is true, the pressure PRE-S_32 is calculated by first determining the slope of the ramp-down and the intercept value.

The slope, designated as "m", equals the starting pressure (PS) minus the ending pressure (PE) divided by the contents of the register PC_SS3L_T (the percent shift complete to begin the ramp-down in pressure) less the value in register PC_SS3L_E (the percent shift complete to end the ramp-down in pressure). The intercept value, which is identified in action block 698 by the symbol "b", equals ps−m×PC_SS3L_T. This relationship between time and pressure P32 is represented in FIG. 1S by the stepped characteristic in which each break point, one of which is shown at b, is represented by a point on the ramp-down curve. The slope m is calculated from the corresponding break point b. During each background pass of the microprocessor, a new intercept point b is determined, as well as a new slope m associated with that brake point. This produces the stepped relationship shown in FIG. 1S.

If the register SS3L_MODE=4 rather than 2, 1 or 6, as confirmed at step 700 of FIG. 1J, the routine will set the pressure PRES_32=FNPSE3, as shown at action block 702, which is the ending pressure for the solenoid valve 196.

If the shift that has been commanded is a 4-2 shift rather than a 3-2 shift, the responses at action blocks 684, 688, 692, 696 and 700 will be negative. The routine then will determine at step 704 whether the SS3L—MODE=5, in which case the pressure PRES—32 is set at a different value (i.e., FNPSS4) which is a starting output pressure of the solenoid valve 196 for a 4-2 shift. This is indicated at action block 706.

The relationships between time and the pressure $P_S$ REL, $P_{SA}$, $P_{DC}$, I (current) and $P_L$ that are characteristic of a 4-2 shift are shown in FIG. 1P. These relationships correspond to those shown in FIG. 1M for a 3-2 shift. Thus, similar reference numerals are added to FIG. 1P although prime notations are added.

If it is determined at step 708 in FIG. 1K that the SS3L—MODE register equals 7 rather than 5, the pressure will be set at the same value PRES—32 at action block 710.

If the routine proceeds to step 712 in response to a negative inquiry at step 708, the register SS3L—MODE will be equal to 8, which means that the pressure PRES—32 will be set to the final zero ramp-down value. That final value, as indicated at action block 714, is PRES—BLIP.

At the next action block 716, the register COUNTS—32 is set to a pressure value for solenoid valve 196 which corrects for transmission oil temperature. Thus, the actual pressure is equal to PRES—32 plus the value called FN922 (TOT) which is a transfer function multiplier that takes into account the transmission oil temperature.

At the beginning of the routine that described the 3-2 shift, an inquiry was made at step 630 in FIG. 1C as to whether a 4-2 shift was desired. In the preceding description of the 3-2 shift, it was assumed that the response to the inquiry at step 630 was negative. On the other hand, if the response at step 630 is positive, the routine will proceed immediately to the 4-2 shift strategy where at action block 718 in FIG. 1C the register SS3L—MODE is set equal to 5 and the timer SS3L—END—TMR, previously described, is set to the value SS3L—WDT5, which is the maximum time for holding the register SS3L—MODE=5. If the shift is not completed before the timer runs down, the routine will skip the commanded shift and will proceed to the next step.

The routine will proceed then to step 720 where it is confirmed again that there has been no state change by checking whether the register MODE—CHANGE still equals zero. If that is the case and if the register SS3L—MODE=5, the register PC—SS3L—T is set equal to the value FNPST4, which is a value in memory that depends upon the vehicle speed, as indicted at action block 722 in FIG. 1C. Following the completion of the operation at action block 722, or in response to a negative response at step 720, the routine will proceed to step 724 where it is again verified that MODE—CHANGE still equals zero and that the register SS3L—MODE still equals 5, which triggers the ramp-down for a 4-2 shift routine. As shown at step 724, an inquiry is made as to whether the percent shift complete is greater than the percent shift complete that is necessary to begin a ramp-down in pressure, namely, PC—SS3L—T. If the three inquiries at step 724 are positive, the routine will set SS3L—MODE=6 at action block 726. The timer SS3L—END—TMR is set equal to SS3L—WDT6 as the ramp-down is triggered, and the register PC—SS3L—E is set to a value for percent shift complete that is needed to end the ramp-down in pressure.

The routine proceeds then to step 728 where the state again is tested to determine whether mode—change still equals zero. An inquiry is made also as to whether register SS3L—MODE=5 and whether the timer SS3L—END—TMR has run down. If the inquiries at step 728 are true, the routine will proceed to action block 730 where the register SS3L—MODE is set equal to 7 and the timer is set to a value equal to SS3L—END—D4, thus holding the pressure until the end of the shift during the interval for which the timer is set.

If the three conditions at step 728 in FIG. 1C are not met, the routine will proceed to step 732 in FIG. 1H where, after a check is made of the state of the SS3L—MODE module, it is determined whether the SS3L MODE=6 and whether the percent shift complete is greater than or equal to the value PC—SS3L—E, which is the time needed to hold the pressure at the end of the shift. A positive response at step 732 will result in the action described previously with respect to action block 730. A negative response will cause the routine to proceed to step 734 in FIG. 1H where again the state of the SS3L—MODE register is checked to see if there has been a change in state. It is determined also whether SS3L—MODE=6 and whether the timer has expired. If those conditions are met, the routine will proceed to the previously described action block 730.

Following completion of the operation at action block 730, the routine proceeds to step 736 where the state of the SS3L—MODE register again is checked and the SS3L—MODE is set equal to 7. Again, the timer is checked to see if it has run down. If all of the inquiries at step 732 are true, the routine proceeds to action block 738 where the register SS3L—MODE is set equal to 8, thus triggering the final pressure reduction following completion of the shift. Timer SS3L—END—TMR is set equal to its final value, SS3L—BLIP, indicating a drop in pressure at the end of the shift.

The routine then proceeds to the previously described step 674. The 4-2 shift routine and the 3-2 shift routine are common beginning at step 674 and continuing to step 712. The portions of the routine beginning at step 674 and ending at step 712 that are specific to a 4-2 downshift will be skipped if the 3-2 shift has been commanded. Conversely, the portions of the common routine that are characteristic of the 3-2 shift will be skipped if the shift that has been commanded is a 4-2 downshift.

Having described a preferred embodiment of our invention, what we claim and desire to secure by U.S. Letters Patent is:

We claim:

1. An electronic control system for a multiple ratio automatic transmission for use in an automotive vehicle driveline having a throttle controlled internal combustion engine, said transmission having gearing elements defining a first speed ratio and a second speed ratio;
fluid pressure actuated clutch and brake means for controlling the relative speeds of said gearing elements to effect speed ratio changes between said first and second speed ratios;
said clutch and brake means including a friction brake adapted to anchor a reaction element of said gearing that is common to both of said speed ratios and a friction clutch adapted to connect two of said gearing elements together to effect said second speed ratio, said friction clutch being released and said friction brake being applied to effect a speed ratio downshift;

a fluid pressure operated brake servo means for applying and releasing said brake and a fluid pressure operated actuator for applying and releasing said clutch, said brake servo having a pressure actuated piston defining in part a brake apply pressure chamber and a brake release pressure chamber; and means for regulating the rate of exhaust of pressure from said clutch actuator and from said brake release pressure chamber in response to changes in vehicle driveline operating variables thereby achieving smooth speed ratio changes.

2. The combination as set forth in claim 1 wherein said gearing elements define first, second and third speed ratios with successively increasing speed ratio values;

said friction brake being adapted to anchor a reaction element of said gearing during operation in said first and said third ratio, said clutch being applied during operation in said second ratio.

3. The combination as set forth in claim 1 wherein said gearing elements define first, second, third and fourth speed ratio with successively increasing speed ratio values, said first speed ratio being a low speed underdrive ratio, said second speed ratio being an intermediate underdrive ratio, said third speed ratio being a direct drive ratio and said fourth speed ratio being an overdrive ratio;

said clutch being adapted to connect together two of said gearing elements to establish a gearing speed ratio of unity during direct drive.

4. An automatic power transmission mechanism comprising multiple ratio gearing elements adapted to establish plural torque flow paths between a throttle controlled engine and a driven shaft, said gearing elements being adapted to establish a first speed ratio and a second speed ratio, said second speed ratio being higher than said second speed ratio;

fluid pressure actuated clutch means and brake means for controlling the relative speeds of said gearing elements to effect upshifts and downshifts between said first and second speed ratios;

a hydraulic control system including a source of control pressure, a fluid pressure operated clutch actuator and a fluid pressure operated brake servo, said brake servo having a brake piston defining in part a servo apply pressure chamber and a servo release pressure chamber and a valve circuit connecting said pressure source to said clutch actuator and said brake servo;

said valve circuit comprising shift valve means for connecting said source to said servo and said actuator, an electronic processor means responsive to operating variables of said transmission for shifting said shift valve means;

a downshift timing valve means communicating with said clutch and said servo release pressure chamber, a solenoid operated control pressure valve means having a control signal output port communicating with said timing valve means for actuating the latter thereby controlling the rate of release of fluid pressure from said clutch actuator and said servo release pressure chamber during a downshift from said second speed ratio to said first speed ratio;

said electronic processor including means for developing a control pressure signal adapted to act on said timing valve means, said processor being adapted to respond to control variables for said transmission for developing said control pressure signal whereby smoothness in a downshift is achieved for each set of operating conditions.

5. The combination as set forth in claim 4 wherein said gearing elements are adapted to establish a low underdrive ratio, an intermediate underdrive ratio, a direct drive ratio and an overdrive ratio, said overdrive ratio and said intermediate ratio being defined by torque flow paths through said gearing elements in which one of said gearing elements is a common reaction element, said brake servo being operatively connected to said brake means to anchor said common reaction element during a downshift from said direct drive ratio to said intermediate underdrive ratio.

6. The combination as set forth in claim 5 wherein said valve circuit includes a common pressure accumulator valve means for cushioning the application of said brake means on both a downshift from said direct drive ratio to said intermediate underdrive ratio and an upshift from said direct drive ratio to said overdrive ratio.

7. The combination as set forth in claim 4 wherein said valve circuit includes a servo pressure regulator valve means for modulating pressure supplied by said control pressure source to produce a pressure supply for said solenoid operated valve means, shift solenoid valve means for developing shift signal pressure on said shift valve means;

said pressure being adapted to respond to said operating variables of said transmission mechanism to produce electronic control signals for said shift solenoid valve means and said control pressure valve means whereby the pressure at said clutch and at said servo release pressure chamber is ramped down following initiation of said downshift so that said clutch pressure and said servo release pressure at any instant during the shift interval is determined as a function of the percent shift complete.

8. The combination as set forth in claim 5 wherein said valve circuit includes a servo pressure regulator valve means for modulating pressure supplied by said control pressure source to produce a pressure supply for said solenoid operated valve means, shift solenoid valve means for developing shift signal pressure on said shift valve means;

said pressure being adapted to respond to said operating variables of said transmission mechanism to produce electronic control signals for said shift solenoid valve means and said control pressure valve means whereby the pressure at said clutch and at said servo release pressure chamber is ramped down, following initiation of said downshift, so that said clutch pressure and said servo release pressure at any instant during the shift interval is determined as a function of the percent shift complete.

9. The combination as set forth in claim 6 wherein said valve circuit includes a servo pressure regulator valve means for modulating pressure supplied by said control pressure source to produce a pressure supply for said solenoid operated valve means, shift solenoid valve means for developing shift signal pressure on said shift valve means;

said pressure being adapted to respond to said operating variables of said transmission mechanism to produce electronic control signals for said shift solenoid valve means and said control pressure valve means whereby the pressure at said clutch and at said servo release pressure chamber is ramped down, following initiation of said downshift, so that said clutch pressure and said servo release pressure at any instant during the shift interval is determined as a function of the percent shift complete.

10. The combination as set forth in claim 7 wherein said circuit and said processor includes means for maintaining a modified clutch pressure for an initial time period following initiation of said downshift, for terminating said ramping down of said pressure for a time that depends upon transmission driven shift speed and engine throttle position and for thereafter maintaining a steady value of said pressure after terminating said ramping down until the completion of said downshift.

11. The combination as set forth in claim 5 wherein said circuit and said processor includes means for maintaining a modified clutch pressure for an initial time period following initiation of said downshift, for terminating said ramping down of said pressure for a time that depends upon transmission driven shift speed and engine throttle position and for thereafter maintaining a steady value of said pressure after terminating said ramping down until the completion of said downshift.

12. A method for controlling multiple ratio gearing elements in an automatic power transmission mechanism, said gearing elements being controlled by fluid pressure actuated clutch means and brake means to establish plural torque flow paths between a throttle controlled engine and a driven shaft, said torque flow paths defining a first speed ratio and a second speed ratio;

controlling the relative speeds of said gearing elements to effect upshifts and downshifts between said first and second speed ratios;

controlling the rate of release of fluid pressure from said clutch means and the application of said brake means upon a downshift from said second speed ratio to said first speed ratio in response to changes in operating variables of said transmission including engine throttle position changes and changes in the speed of said driven shaft;

ramping down pressure of said clutch means following initiation of said downshift, the ratio of said ramping down being determined by percent of shift completion, terminating said ramping down of clutch pressure during the downshift interval and maintaining a lower steady clutch pressure thereafter during said downshift interval until completion of said downshift.

* * * * *